US012790019B1

(12) United States Patent
Darr et al.

(10) Patent No.: US 12,790,019 B1
(45) Date of Patent: Nov. 10, 2026

(54) SYSTEM AND METHOD FOR EVACUATING AND PREVENTING PENETRATION OF SMOKE FROM A CARGO COMPARTMENT TO OCCUPIED COMPARTMENTS OF AN AIRCRAFT

(71) Applicant: The Boeing Company, Arlington, VA (US)

(72) Inventors: Rachel M. Darr, Maple Valley, WA (US); Eric J. Lim, Kent, WA (US); Joseph G. Davidson, Renton, WA (US); David J. Shaw, Maple Valley, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/385,050

(22) Filed: Nov. 10, 2025

(51) Int. Cl.
*B64D 45/00* (2006.01)

(52) U.S. Cl.
CPC ........ *B64D 45/00* (2013.01); *B64D 2045/009* (2013.01)

(58) Field of Classification Search
CPC ............................ B64D 2045/009; A62C 3/08
USPC ...................... 244/129.2; 454/71; 169/53, 62
See application file for complete search history.

(56) References Cited

U.S. PATENT DOCUMENTS

| | | | | |
|---|---|---|---|---|
| 4,351,394 | A * | 9/1982 | Enk | A62C 3/08 169/61 |
| 7,510,022 | B2 * | 3/2009 | Lazzarini | B64D 25/00 239/54 |
| 7,849,931 | B2 * | 12/2010 | Ng | A62C 3/08 454/258 |
| 8,925,642 | B2 * | 1/2015 | Meier | B05B 7/2472 169/56 |
| 9,526,931 | B2 * | 12/2016 | Ferguson | A62C 37/36 |
| 10,195,469 | B2 * | 2/2019 | Smith | B64D 45/00 |
| 10,220,228 | B2 * | 3/2019 | Rennie | A62C 37/44 |
| 11,318,337 | B2 * | 5/2022 | Diaz | A62C 37/04 |
| 2014/0353427 | A1 * | 12/2014 | Meckes | B64D 37/32 244/129.2 |
| 2017/0014655 | A1 * | 1/2017 | Gatsonides | B64D 45/00 |

* cited by examiner

*Primary Examiner* — Arfan Y. Sinaki

(57) ABSTRACT

There is provided a system for evacuating and preventing penetration of smoke from a cargo compartment to one or more occupied compartments in an aircraft. The system includes a smoke vent valve assembly installed external to the cargo compartment. The assembly includes a smoke vent valve, a mounting assembly, a first coupling assembly, and a first duct. The system includes a valve control system to control the smoke vent valve, and a pressure equalization valve in the cargo compartment. The system provides a direct smoke path for the smoke caused by a fire event in the cargo compartment, to flow the smoke directly from the cargo compartment, through the pressure equalization valve, and through the smoke vent valve assembly which exhausts the smoke directly overboard the aircraft, to result in the system evacuating and preventing penetration of the smoke from the cargo compartment to the one or more occupied compartments.

20 Claims, 26 Drawing Sheets

SYSTEM AND METHOD FOR EVACUATING AND PREVENTING PENETRATION OF SMOKE FROM A CARGO COMPARTMENT TO OCCUPIED COMPARTMENTS OF AN AIRCRAFT

FIELD

The present disclosure relates generally to a system and a method for preventing penetration of smoke from a fire event in an air vehicle, and more particularly, to a system and a method for evacuating and preventing penetration of smoke from a cargo compartment to occupied compartments in an air vehicle, such as a commercial transport aircraft.

BACKGROUND

Typical fire protection system provisions for large commercial transport aircraft are based on compartment classifications and requirements as defined in Title 14 of the U.S. Code of Federal Regulations (CFR) Parts 25.855, 25.857 and 25.858. Most large commercial transport aircraft are designed for lower lobe Class C compartments, are equipped with smoke detection and fire suppression or extinguishing systems, and are required by regulation to prevent smoke, fire suppression agents, and/or fire byproducts from penetrating from a fire event in a cargo compartment into occupied compartments of the aircraft, such as the flight deck or the main passenger cabin compartments. Even when a cargo compartment fire is suppressed, some smoke from the cargo compartment may still be present and remain a threat throughout the remainder of a flight.

Known systems and methods for preventing penetration of smoke from a fire event in a cargo compartment to occupied compartments in large commercial transport aircraft include the use of cargo compartment liners, tape, and other types of seals to seal up a boundary of the cargo compartment, the floors, the bilge area, i.e., the location at the bottom interior of the fuselage, and other areas. However, due to the complexity of a typical cargo compartment and all of the interfacing systems, it may be difficult to seal every single gap or opening, and some amount of smoke may end up penetrating the lining system or sealing system of the cargo compartment.

Known systems and methods for preventing any smoke that may have escaped outside the cargo compartment, such as below the passenger floor, from moving up into the occupied compartments, include use of an airflow management system in large commercial transport aircraft. Conditioned air is flowed into the occupied compartments, which generally creates a slightly higher pressure in those compartments and maintains continual outward or downward airflow through return air grilles or other paths between the main passenger cabin and the lower lobe compartments. This airflow is drawn to an outflow valve installed in the aircraft and exhausted outside the aircraft. In some cases, this constant stream of air is sufficient to keep any smoke from penetrating the occupied compartments. However, in some instances, the airflow management system may not provide sufficient air pressure or airflow, or the airflow may not be adequately balanced throughout the main passenger cabin to prevent smoke penetration in all locations. These issues may be amplified during transient flight conditions or periods of transient air inflow, such as changes in aircraft and/or cabin altitude, or transitioning from cruise to descent profiles.

Accordingly, there is a need in the art for an improved system and method for evacuating and preventing penetration of smoke, as well as fire suppression agents, and/or fire byproducts, from a fire event in a cargo compartment, from exiting the cargo compartment and entering occupied compartments of the aircraft, such as the flight deck or the main passenger cabin compartments, that use a smoke vent valve to create a direct smoke path and an improved leakage path for smoke to exit the cargo compartment and flow directly overboard the aircraft, rather than relying solely on cargo compartment liners, tape, and other types of seals and airflow management to prevent smoke from penetrating into occupied compartments, that is simple and inexpensive to manufacture, install, and use, that in one version may use control logic to maximize the benefits of additional leakage to vent smoke while minimizing a risk of cabin fly through (defined below) due to such additional leakage, and that provide advantages over known systems and methods.

SUMMARY

Example implementations of the present disclosure provide for an improved system and method for evacuating and preventing penetration of smoke from a cargo compartment to occupied compartments of an aircraft. As discussed in the below detailed description, versions of the improved system and method may provide significant advantages over known systems and methods.

In a version of the disclosure, there is provided a system for evacuating and preventing penetration of smoke from a cargo compartment to one or more occupied compartments in an aircraft. The system comprises a smoke vent valve assembly installed in a location in the aircraft external to the cargo compartment.

The smoke vent valve assembly comprises a smoke vent valve. The smoke vent valve assembly further comprises a mounting assembly attached to the smoke vent valve. The smoke vent valve assembly further comprises a first coupling assembly coupling the smoke vent valve and the mounting assembly together. The smoke vent valve assembly further comprises a first duct coupled to the smoke vent valve, and the first duct terminating at an exhaust opening through an exterior portion of the aircraft.

The system further comprises a valve control system coupled to the smoke vent valve, to control opening and closing of the smoke vent valve. The system further comprises a pressure equalization valve installed in a wall of the cargo compartment. The pressure equalization valve has an inlet end in the cargo compartment, and an outlet end external to the cargo compartment and in proximity to the smoke vent valve assembly.

The system provides a direct smoke path for the smoke caused by a fire event in the cargo compartment, to flow the smoke directly from the cargo compartment, through the pressure equalization valve, and through the smoke vent valve assembly which exhausts the smoke directly overboard the aircraft, to result in the system evacuating and preventing penetration of the smoke from the cargo compartment to the one or more occupied compartments.

In another version of the disclosure, there is provided an aircraft. The aircraft comprises a fuselage. The aircraft further comprises a plurality of occupied compartments located in an interior upper portion of the fuselage. The aircraft further comprises a lower lobe compartment area located in an interior lower portion of the fuselage. The lower lobe compartment area is separated from, and positioned below, the plurality of occupied compartments, and the lower lobe compartment area comprises at least one cargo compartment and an adjacent compartment adjacent to the at least one cargo compartment.

The aircraft further comprises a system for evacuating and preventing penetration of smoke caused by a fire event in the at least one cargo compartment, wherein the system evacuates the smoke from the at least one cargo compartment and prevents penetration of the smoke into one or more of the plurality of occupied compartments.

The system comprises a smoke vent valve assembly installed in the adjacent compartment external to the at least one cargo compartment. The smoke vent valve assembly comprises a smoke vent valve, a mounting assembly attached to the smoke vent valve, a first coupling assembly coupling the smoke vent valve and the mounting assembly together, and a first duct coupled to the smoke vent valve. The first duct terminates at an exhaust opening through an exterior portion of the aircraft.

The system further comprises a valve control system coupled to the smoke vent valve, to control opening and closing of the smoke vent valve. The system further comprises a pressure equalization valve installed in a wall of the at least one cargo compartment. The pressure equalization valve has an inlet end in the at least one cargo compartment, and an outlet end in the adjacent compartment and in proximity to the smoke vent valve assembly.

The system provides a direct smoke path for the smoke to flow directly from the at least one cargo compartment, through the pressure equalization valve, and through the smoke vent valve assembly which exhausts the smoke directly overboard the aircraft, to result in the system evacuating and preventing penetration of the smoke from the at least one cargo compartment to one or more of the plurality of occupied compartments.

In another version of the disclosure, there is provided a method of using a system installed in an aircraft for evacuating and preventing penetration of smoke from a cargo compartment to one or more occupied compartments in the aircraft. The method comprises the step of providing the system. The system comprises a smoke vent valve assembly. The smoke vent valve assembly comprises a smoke vent valve, a mounting assembly attached to the smoke vent valve, a first coupling assembly coupling the smoke vent valve and the mounting assembly together, and a first duct coupled to the smoke vent valve. The first duct terminates at an exhaust opening through an exterior portion of the aircraft.

The system further comprises a valve control system coupled to the smoke vent valve, to control opening and closing of the smoke vent valve. The system further comprises a pressure equalization valve installed in a wall of the cargo compartment. The pressure equalization valve has an inlet end in the cargo compartment, and an outlet end external to the cargo compartment and in proximity to the smoke vent valve assembly.

The method further comprises the step of coupling the smoke vent valve assembly to an adjacent compartment in the aircraft adjacent to the cargo compartment, so that the smoke vent valve assembly is in proximity to the pressure equalization valve and external to the cargo compartment.

The method further comprises the step of using the system to direct smoke caused by a fire event in the cargo compartment, to flow in a direct smoke path directly from the cargo compartment, through the pressure equalization valve, and through the smoke vent valve assembly which exhausts the smoke directly overboard the aircraft, to result in the system evacuating and preventing penetration of the smoke from the cargo compartment to the one or more occupied compartments.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
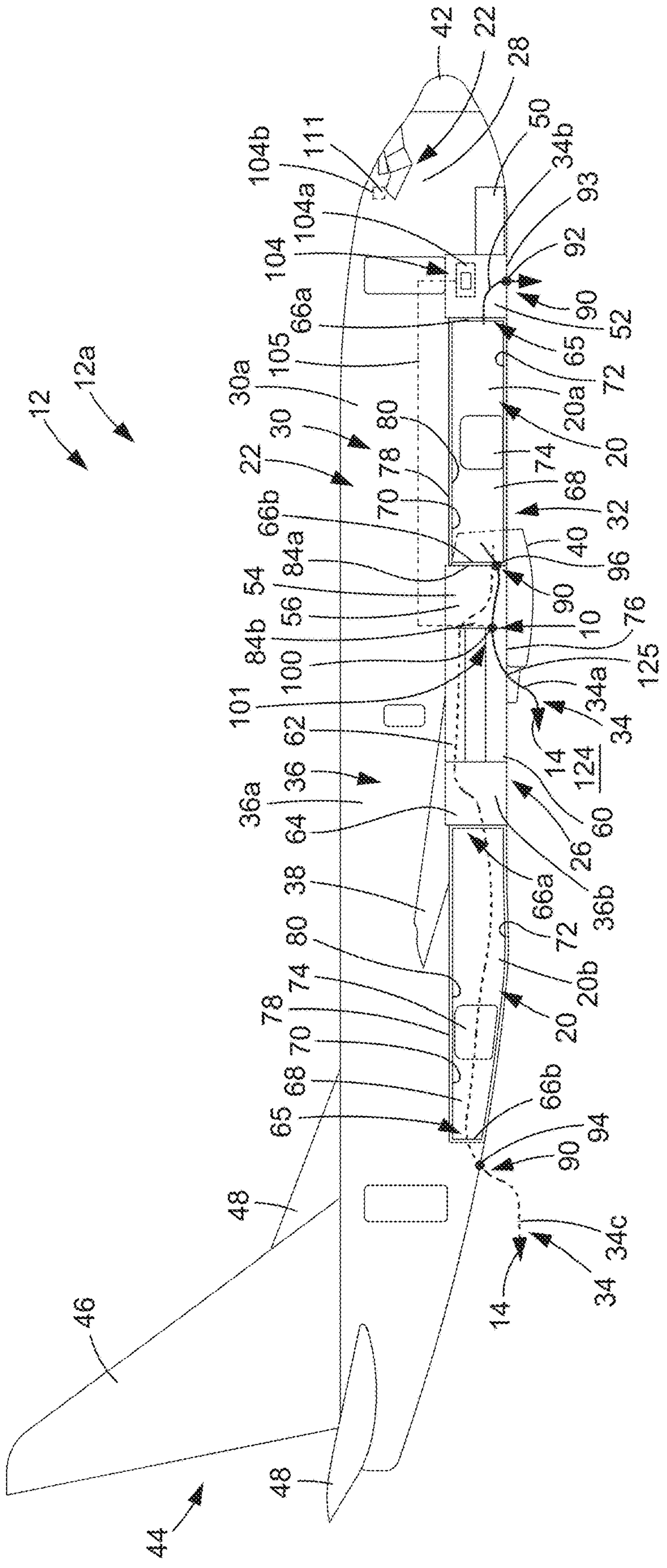
FIG. 1 is an illustration of a right side view of an aircraft with an exemplary compartment configuration incorporating a version of a system of the disclosure, and showing a direct smoke path for smoke evacuation via the system.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Versions of a system 10 (see FIGS. 1, 2A-2B, 3A, 4A, 7), such as a smoke penetration prevention system 10*a* (see FIGS. 2A, 3A, 7), and a smoke penetration prevention system 10*b* (see FIGS. 2B, 4A, 7), for incorporation or installation in an aircraft 12 (see FIG. 1), such as a commercial transport aircraft 12*a* (see FIG. 1), a freighter aircraft 12*b* (see FIG. 7), or another suitable aircraft 12 or air vehicle, are disclosed herein. The system 10 is designed for evacuating and preventing penetration of smoke 14 (see FIG. 7), as well as fire suppression agents 16 (see FIG. 7), and/or fire byproducts 18 (see FIG. 7), from exiting one or more cargo compartments 20 (see FIG. 1) and entering into one or more occupied compartments 22 (see FIG. 1) in the aircraft 12, where the one or more occupied compartments 22 can house or seat a plurality of occupants 23 (see FIG. 7). Examples of fire suppression agents 16 can include bromotrifluoromethane ($CBrF_3$), and other suitable fire suppression agents 16. Examples of fire byproducts 18 can include acid gas, byproducts of the combustion of hydrogen fluoride (HF) and hydrogen bromide (HBr), such as fluoride (F) and bromide (Br), and other types of fire byproducts 18. The smoke 14, fire suppression agents 16, and/or fire byproducts 18 may be present when a fire event 24 (see FIG. 7) occurs in one or more of the cargo compartments 20 (see FIG. 1), such as a forward cargo compartment 20*a* (see FIG. 1), and/or an aft cargo compartment 20*b* (see FIG. 1), or another type of cargo compartment 20 located in a lower lobe compartment area 26 (see FIG. 1) in the aircraft 12. The one or more occupied compartments 22 comprise a flight deck 28 with flight crew occupants, a cabin 30, such as a main passenger cabin 30*a*, with passenger occupants, or another suitable occupied compartment 22 of the aircraft 12.

Now referring to FIG. 1, FIG. 1 is an illustration of a right side view of an aircraft 12, such as a commercial transport aircraft 12*a*, that is a typical large transport-category aircraft, and that has an exemplary compartment configuration 32 in the lower lobe compartment area 26 incorporating a version of the system 10 of the disclosure. FIG. 1 further shows a smoke path 34, such as a direct smoke path 34*a*, for smoke evacuation via the system 10.

As shown in FIG. 1, the aircraft 12 comprises a fuselage 36, wings 38, engines 40, a nose 42, and tail 44. As shown in FIG. 1, the tail 44 comprises a vertical stabilizer 46 and horizontal stabilizers 48. Although the aircraft 12 shown in FIG. 1 is a commercial transport aircraft 12*a* for passengers, the teachings of the disclosed versions of the system 10 may be applied to other passenger aircraft, freighter aircraft 12*b* (see FIG. 7), or other suitable aircraft 12 or air vehicles.

As further shown in FIG. 1, the aircraft 12 comprises a plurality of occupied compartments 22, including at least the flight deck 28, and the cabin 30, such as the main passenger cabin 30*a*. The plurality of occupied compartments 22, or occupant compartments, are designed to house or seat a plurality of occupants 23 (see FIG. 7), such as passengers and/or flight crew members.

As further shown in FIG. 1, the aircraft 12 comprises the lower lobe compartment area 26 with at least one cargo compartment 20, and for example, cargo compartments 20, including the forward cargo compartment 20*a* and the aft cargo compartment 20*b*. The cargo compartments 20 may also be referred to as a cargo hold. The cargo compartments 20 of the aircraft 12 are designed to typically hold and transport suitcases, luggage, and other cargo items of passengers and/flight crew. One or more of the cargo compartments 20 can be pressurized and heated to transport live animals and/or items that requires a temperature control such as perishable foods, flowers, or other temperature sensitive items.

As further shown in FIG. 1, the lower lobe compartment area 26 has a nose wheel well 50 and an electronic equipment bay 52 located between the nose wheel well 50 and the forward cargo compartment 20*a*. As further shown in FIG. 1, the lower lobe compartment area 26 has an adjacent compartment 54 adjacent to, and positioned aft of, the forward cargo compartment 20*a*. The adjacent compartment 54 may comprise an air conditioning mix bay 56, a cheek area 58 (see FIG. 2A), a bilge area 59 (see FIG. 7), or another suitable adjacent compartment 54 adjacent to the forward cargo compartment 20*a*.

As further shown in FIG. 1, the lower lobe compartment area 26 has a pack bay 60 adjacent to, and positioned aft of, the adjacent compartment 54. As further shown in FIG. 1, the lower lobe compartment area 26 has a wing box 62, and a main wheel well 64. As further shown in FIG. 1, the lower lobe compartment area 26 has the aft cargo compartment 20*b* adjacent to, and positioned aft of, the main wheel well 64.

As further shown in FIG. 1, the forward cargo compartment 20*a* and the aft cargo compartment 20*b* each has a plurality of walls 65, including a forward endwall 66*a*, an aft endwall 66*b*, and sidewalls 68, and each has a ceiling panel 70, a floor panel 72, and a door 74. The floor panel 72 is in proximity to, or adjacent to, a fuselage skin 76 of the fuselage 36. As further shown in FIG. 1, the forward cargo compartment 20*a* and the aft cargo compartment 20*b* each has a boundary 78 that is lined with a lining system 80 of cargo compartment liners, tape, and/or other types of seals to seal up the boundary 78 of each cargo compartment 20 to aid in smoke penetration prevention 82 (see FIG. 7), and to limit oxygen to smother a fire and ensure that a fire suppression system can be effective.

The adjacent compartment 54 has endwalls 84 (see FIGS. 5A-5B), such as a first endwall 84*a* (see FIGS. 1, 5A-5B) adjacent to, and/or coextensive with, the aft endwall 66*b* of the forward cargo compartment 20*a*, and a second endwall 84*b* (see FIGS. 1, 5A-5B) opposite the first endwall 84*a*. As further shown in FIG. 5A-5B, the adjacent compartment has sidewalls 85, a ceiling 86, and a floor 88 adjacent the fuselage skin 76.

As further shown in FIG. 1, the aircraft 12 includes a plurality of valves 90. FIG. 1 shows one of the plurality of valves 90 comprising an overboard exhaust valve 92 coupled to a floor 93 of the electronic equipment bay 52 and exhausts outside the aircraft 12 through the fuselage skin 76. The overboard exhaust valve 92 is typically part of a cooling system of the electronic equipment bay 52, and the overboard exhaust valve 92 helps to exhaust warm air from equipment racks in the electronic equipment bay 52 overboard and outside the aircraft 12. The overboard exhaust valve 92 has a specific control mechanism for when it is open and when it is closed. Typically, in flight, the overboard exhaust valve 92 is closed. However, during a fire event 24 that produces smoke 14, the overboard exhaust valve 92 is open to assist with a small amount of smoke clearance. As shown in FIG. 1, a smoke path 34, such as a limited smoke path 34*b*, is exhausted from the forward cargo compartment 20*a*, through the electronic equipment bay 52, through the overboard exhaust valve 92, and out of the aircraft 12.

FIG. 1 further shows another of the plurality of valves 90 comprising an outflow valve 94 coupled to a portion 76*a* of the fuselage skin 76 of the aircraft 12. In this version of the aircraft 12, as shown in FIG. 1, there is one outflow valve 94. In other versions, there may be more than one outflow valve 94. The outflow valve 94 is part of the cabin pressurization system of the aircraft 12. The primary function of the outflow valve 94 is to control the cabin pressure for comfort, adequate pressurization, and safety. The outflow valve 94 exhausts air from the aircraft 12 and modulates as required to maintain an appropriate cabin pressure of the cabin 30. FIG. 1 shows a smoke path 34, such as an indirect smoke path 34*c*, in dotted line, that is convoluted and circuitous and that has to go from the forward cargo compartment 20*a*, through the adjacent compartment 54, over the wing box 62, over the main wheel well 64, around the aft cargo compartment 20*b*, and through the outflow valve 94 which exhausts the smoke 14 outside the aircraft 12, all without penetrating the cabin 30, such as the main passenger cabin 30*a*. The indirect smoke path 34*c* is a convoluted path for smoke evacuation.

In contrast, a direct path 33, such as a smoke path 34, for example, a direct smoke path 34*a*, shown in FIG. 1, is an improved smoke path using the system 10 installed in the adjacent compartment 54 adjacent to, in proximity to, and external to, the forward cargo compartment 20*a*, to exhaust the smoke 14 directly from the forward cargo compartment 20*a* through the adjacent compartment 54, and outside the aircraft 12. In this version, the direct smoke path 34*a* is much shorter and only has to go through one adjacent compartment 54 from the forward cargo compartment 20*a*, as opposed to the much longer indirect smoke path 34*c* that has to go through multiple compartments from the forward cargo compartment 20*a*. As used herein, "direct smoke path" means a flow path that smoke from a fire event takes directly from a cargo compartment in an aircraft, through a pressure equalization valve, through a smoke vent valve assembly located in an adjacent compartment adjacent to the cargo compartment, and directly out of the aircraft to ambient atmosphere.

FIG. 1 further shows yet another of the plurality of valves 90 comprising a pressure equalization valve 96 coupled to and installed in the aft endwall 66*b* of the forward cargo compartment 20*a* and the first endwall 84*a* of the adjacent compartment 54.

The pressure equalization valve 96 is designed to equalize pressure across the boundary 78 of the cargo compartment 20, such as the forward cargo compartment 20*a*, such that the aft endwall 66*b* of the forward cargo compartment 20*a* is not having to hold a large pressure differential that would result if the pressure equalization valve 96 was not there. The pressure equalization valve 96 is a direct path 33, such as a direct smoke path 34*a*, for smoke 14 to pass through because the pressure equalization valve 96 is designed to open and to close as the pressure changes. As shown in FIG. 1, in one version, the pressure equalization valve 96 is installed in the aft endwall 66*b* of the forward cargo compartment 20*a*. In other versions, the pressure equalization valve 96 may be installed in the forward endwall 66*a*, a sidewall 68, a floor panel 72, or another suitable location of the forward cargo compartment 20*a*, or may be installed in the aft cargo compartment 20*b*. The pressure equalization valve 96 may be installed in the lining system 80 of the forward cargo compartment 20*a*, or in another version, in the lining system 80 of the aft cargo compartment 20*b*. The pressure equalization valve 96 is part of the system 10 and is used as an intentional leakage path 98 (see FIGS. 2A-2B, 7) to a smoke vent valve assembly 100 (see FIGS. 2A-2B, 3A, 4A, 7) which is also part of the system 10. As used herein, "intentional leakage path" means an intentionally formed flow path for smoke to exit out of a cargo compartment through a pressure equalization valve and to a smoke vent valve assembly when the pressure equalization valve is opened in response to increased pressure in the cargo compartment, as may occur due to temperature or pressure transients during a fire event in the cargo compartment.

Preferably, the smoke vent valve assembly 100 is installed in a location 101 (see FIGS. 1, 2A-2B) in the lower lobe compartment area 26, that is external to the cargo compartment 20, such as the forward cargo compartment 20*a* or the aft cargo compartment 20*b*. More preferably, the smoke vent valve assembly 100 is installed in the lower lobe compartment area 26 in a location 101 that is external to, and in proximity to, or adjacent to, the cargo compartment 20, such as the forward cargo compartment 20*a* or the aft cargo compartment 20*b*, and is in proximity to the pressure equalization valve 96. Although the smoke vent valve assembly 100 shown in FIG. 1 is installed in, and located in, the second endwall 84*b* of the adjacent compartment 54, such as the air conditioning mix bay 56, the smoke vent valve assembly 100 may be installed and located in another location in the adjacent compartment 54, where the adjacent compartment 54 comprises the air conditioning mix bay 56 (see FIG. 1), the cheek area 58 (see FIG. 2A), the bilge area 59 (see FIG. 7), or may be installed in another suitable area in the lower lobe compartment area 26 that is external to, in proximity to, or adjacent to, the cargo compartment 20, such as the forward cargo compartment 20*a*, or the aft cargo compartment 20*b*.

As shown in FIG. 1, preferably the pressure equalization valve 96 is installed in the aft endwall 66*b* of the forward cargo compartment 20*a* and is in close proximity to, and directly adjacent to, or near to, the smoke vent valve assembly 100, such that whenever excess pressure builds up inside the cargo compartment 20, such as the forward cargo compartment 20*a*, the pressure equalization valve 96 opens to an open position 112*a* (see FIG. 7) and creates the intentional leakage path 98 (see FIGS. 2A-2B, 7) through the lining system 80 of the cargo compartment 20, such as in one version, the forward cargo compartment 20*a*, and in another version, the aft cargo compartment 20*b*. In this way, the majority of smoke 14 that penetrates the lining system 80 of the cargo compartment 20, such as the forward cargo compartment 20*a*, or the aft cargo compartment 20*b*, is directed through the pressure equalization valve 96 and deposited directly next to, or near to, the smoke vent valve assembly 100, and the flow of the smoke 14 through the smoke vent valve assembly 100 draws the smoke 14 outside the aircraft 12. The pressure equalization valve 96 can be closed to a closed position 114*a* (see FIG. 7), when necessary. This happens automatically via springs that keep the pressure equalization valve 96 closed, and allow the pressure equalization valve 96 to open when a minimum cracking pressure is met.

As shown in FIG. 1, in one version, the system 10 comprises the smoke vent valve assembly 100, and in particular, a smoke vent valve 102 (see FIGS. 2A-2B), of the smoke vent valve assembly 100, coupled to a valve control system 104, via a connection 105, such as a wireless connection 105*a*, or a wired connection 105*b*. The smoke vent valve assembly 100 is designed to take advantage of the pressure equalization valve 96 and the intentional leakage path 98, so that the smoke vent valve assembly 100 can exhaust the smoke 14 through the pressure equalization valve 96 outside of the aircraft 12, using the valve control system 104.

Figure 2A:
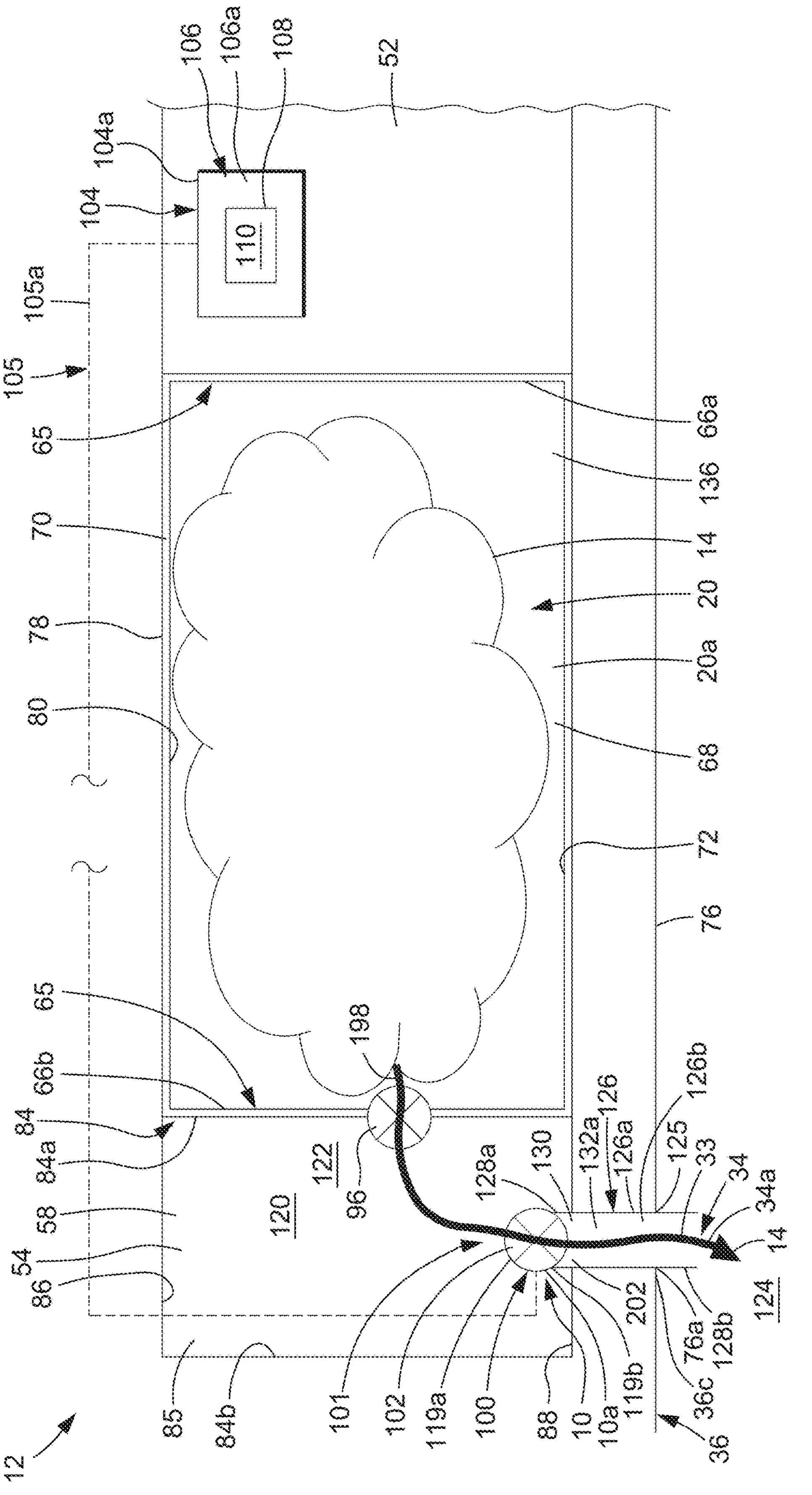
FIG. 2A is an illustration of a right side view of a schematic diagram showing a system of the disclosure installed in an aircraft, and having a version of a smoke vent valve assembly with one duct.
Figure 2B:
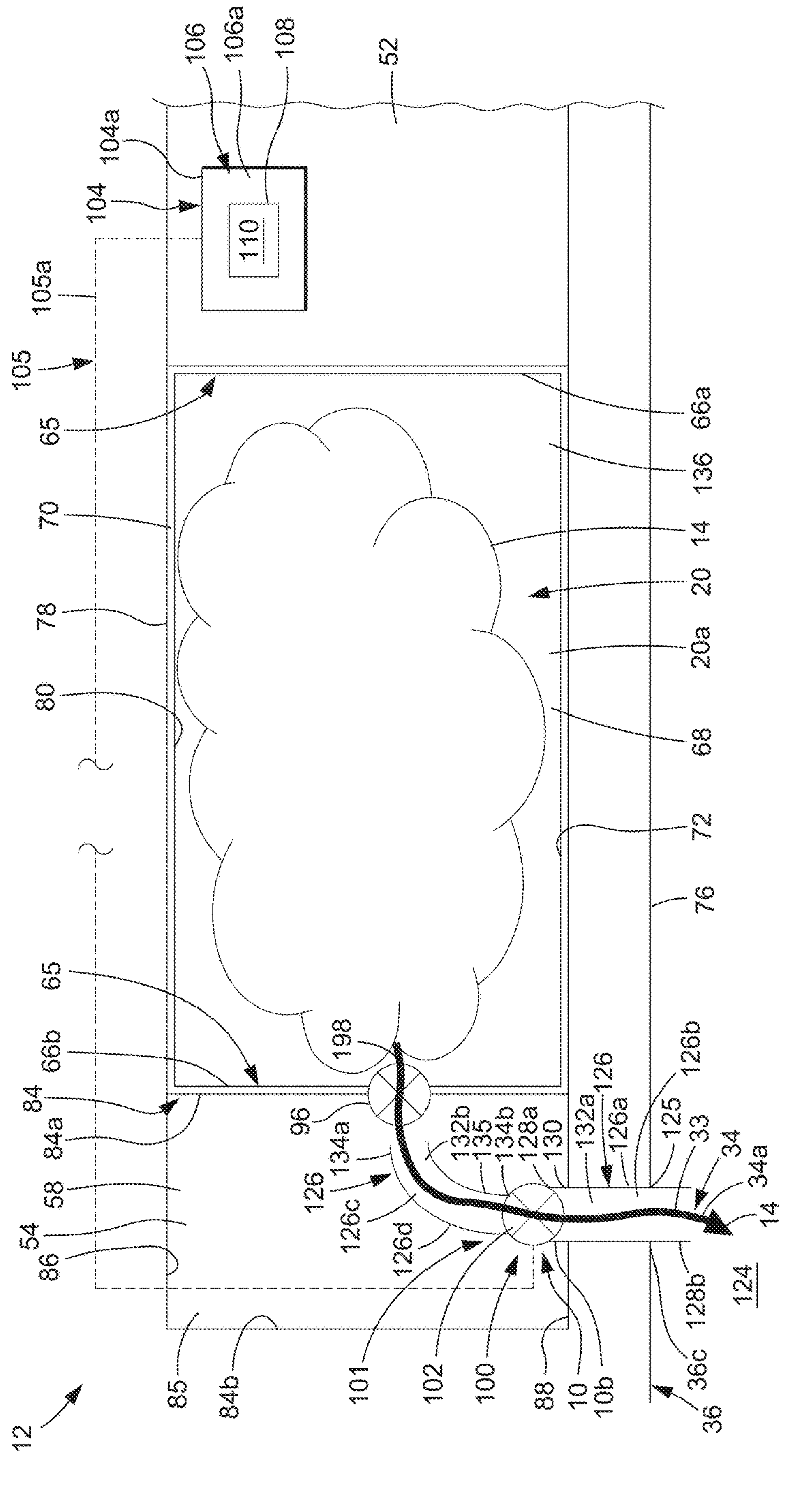
FIG. 2B is an illustration of a right side view of a schematic diagram showing a system of the disclosure installed in an aircraft, and having another version of a smoke vent valve assembly with two ducts.

As shown in FIG. 1, in one version, the valve control system 104 comprises an automated valve control system 104*a*. In one version, as shown in FIGS. 2A-2B, the automated valve control system 104*a* comprises a controller 106 that uses a software program 108 having a control logic 110. The controller 106 may comprise an equipment controller 106*a* (see FIGS. 2A-2B) or another suitable controller 106. The controller 106 may comprise an automated controller (CONT.) 106*b* (see FIG. 7) or a manual controller (CONT.) 106*c* (see FIG. 7).

In one version of the automated valve control system 104*a*, the control and operation of the smoke vent valve 102 of the smoke vent valve assembly 100 is automated to open or to close with the controller 106, such as the equipment controller 106*a*, using the software program 108 with the control logic (CL) 110 (see FIG. 7), that receives a signal input 107*a* (see FIG. 7), and then the control logic 110 outputs, or sends, a command output 107*b* (see FIG. 7) to open the smoke vent valve 102 to an open position 112*b* (see FIG. 7), or to close the smoke vent valve 102 to a closed position 114*b* (see FIG. 7), when necessary. As shown in FIGS. 2A-2B, in one version, the valve control system 104 with the controller 106, such as the equipment controller 106*a*, and the software program 108 with the control logic 110, is located in the electronic equipment bay 52. Preferably, the valve control system 104 is located in the electronic equipment bay 52, such as a forward electronic equipment bay or an aft electronic equipment bay. For example, if the valve control system 104 is a dedicated valve control system line replaceable unit (LRU), or controller box, it is preferably located in the electronic equipment bay 52, such as the forward electronic equipment bay, located in a forward portion of the lower lobe compartment area 26 (see FIG. 1), or located in the electronic equipment bay 52, such as the aft electronic equipment bay, located in an aft portion of the lower lobe compartment area 26. The aft electronic equipment bay may be a smaller bay than the forward electronic equipment bay and would house certain line replaceable units (LRUs) located in the aft half area of the lower lobe compartment area 26. In other versions, the valve control system 104 may be located in another lower lobe compartment area 26 conducive to smoke evacuation, in the flight deck 28, for example, if the control logic 110 is built into a cargo compartment fire panel, or in another suitable area of the aircraft 12. Location of the valve control system 104 may also be based on availability of space, system design constraints, and complexity of integration onto the aircraft 12.

In one version, the simple control logic (CL) 110*a* (see FIG. 7) causes the smoke vent valve 102 to open based on one or more signals 109 (see FIG. 7), such as a smoke signal 109*a* (see FIG. 7), a cargo compartment fire signal 109*b* (see FIG. 7), or another suitable signal 109 triggered by one or more sensors 218 (see FIG. 7) in the cargo compartment 20, such as the forward cargo compartment 20*a* and/or the aft cargo compartment 20*b*, sensing a fire event 24 (see FIGS. 2A-2B, 7) in the cargo compartment 20, such as the forward cargo compartment 20*a* and/or the aft cargo compartment 20*b*. The smoke vent valve 102 remains open for the duration of the flight until the aircraft 12 lands and the one or more signals 109, such as the smoke signal 109*a*, the cargo compartment fire signal 109*b* (see FIG. 7), or another suitable signal 109, is reset.

In an alternate architecture, the advanced control logic (CL) 110*b* (see FIGS. 6, 7) is used. The advanced control logic 110*b* includes the simple control logic 110*a* (see FIGS. 6, 7) and includes a first added control logic (CL) 110*c* (see FIGS. 6, 7) and may include a second added control logic (CL) 110*d* (see FIGS. 6, 7). For example, with the advanced control logic 110*b*, the simple control logic 110*a* causes the smoke vent valve 102 to automatically open based on one or more signals 109 (see FIG. 7), such as the smoke signal 109*a* (see FIG. 7), the cargo compartment fire signal 109*b* (see FIG. 7), or another suitable signal 109, and the first added control logic 110*c* of the advanced control logic 110*b* causes the smoke vent valve 102 to automatically close during a rapid or accelerated descent of the aircraft 12, and the second added control logic 110*d* of the advanced control logic 110*b* causes the smoke vent valve 102 to automatically reopen. The advanced control logic 110*b* is discussed in further detail below with regard to FIGS. 6 and 7.

Figure 5A:
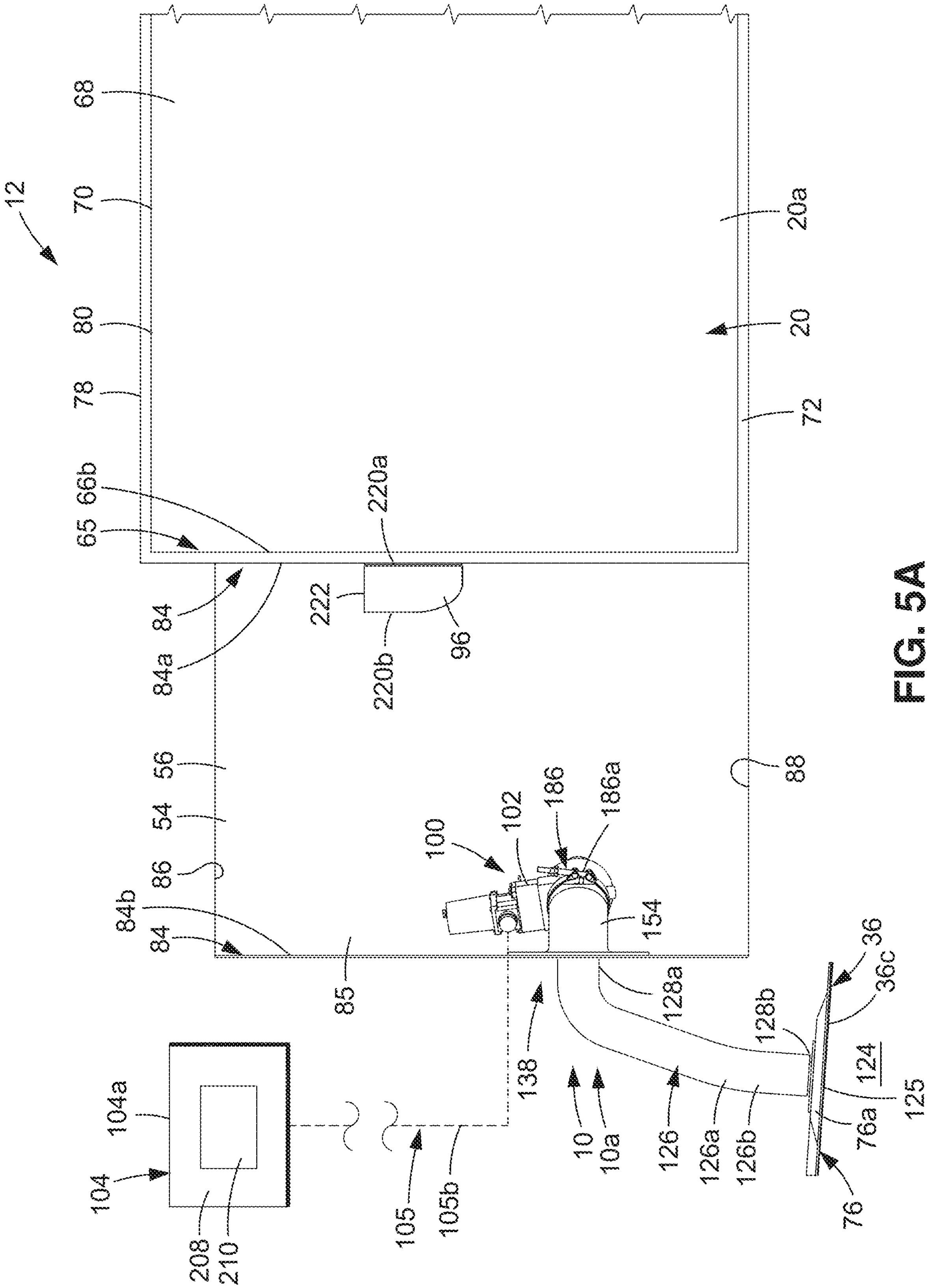
FIG. 5A is an illustration of a right side perspective view of a version of the system of FIG. 3A, installed in an aircraft in an aircraft installation configuration, and having a version of a smoke vent valve assembly with one duct.
Figure 5B:
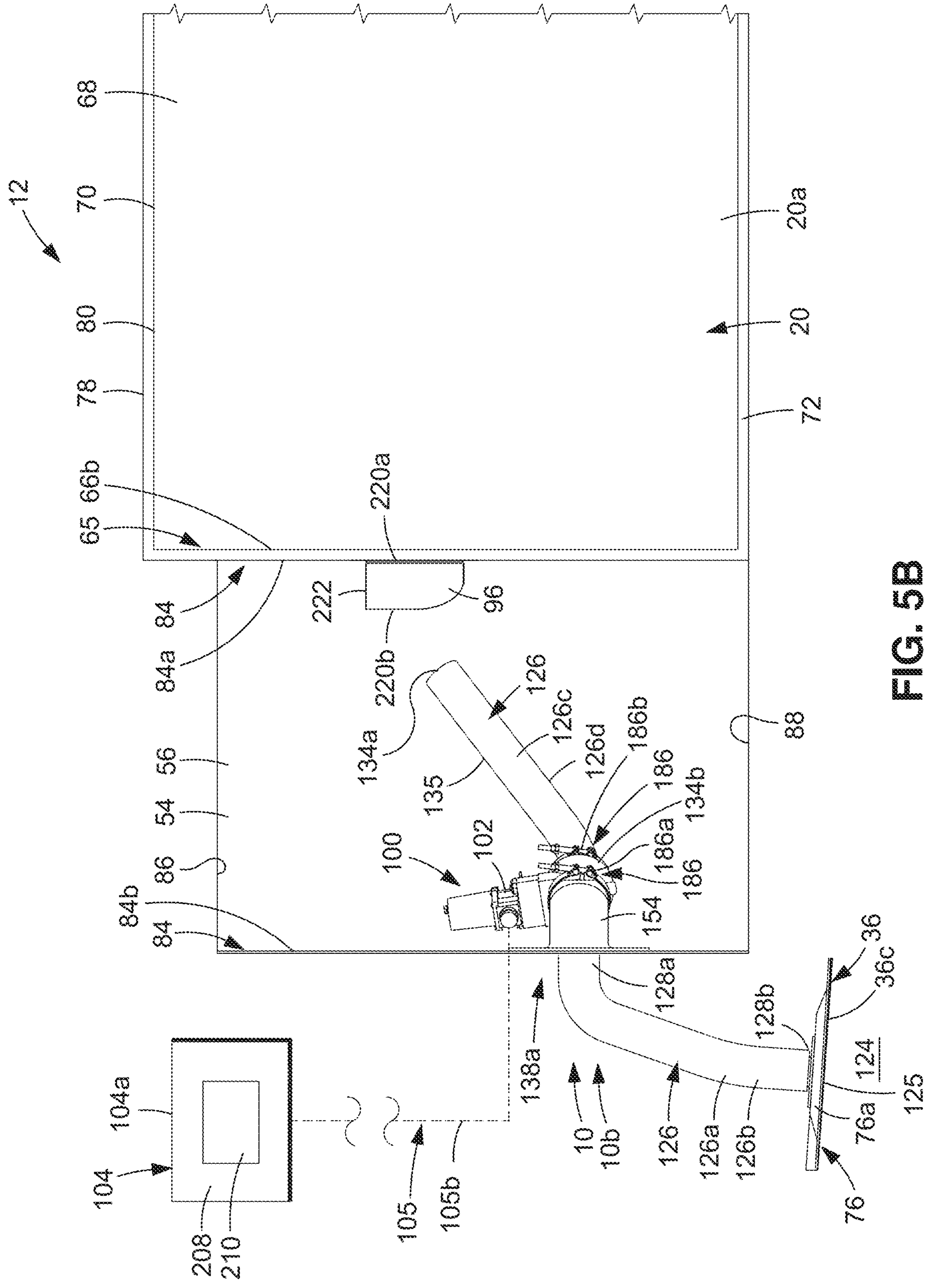
FIG. 5B is an illustration of a right side perspective view of a version of the system of FIG. 4A, installed in an aircraft in an aircraft installation configuration, and having another version of a smoke vent valve assembly with two ducts.
Figure 7:
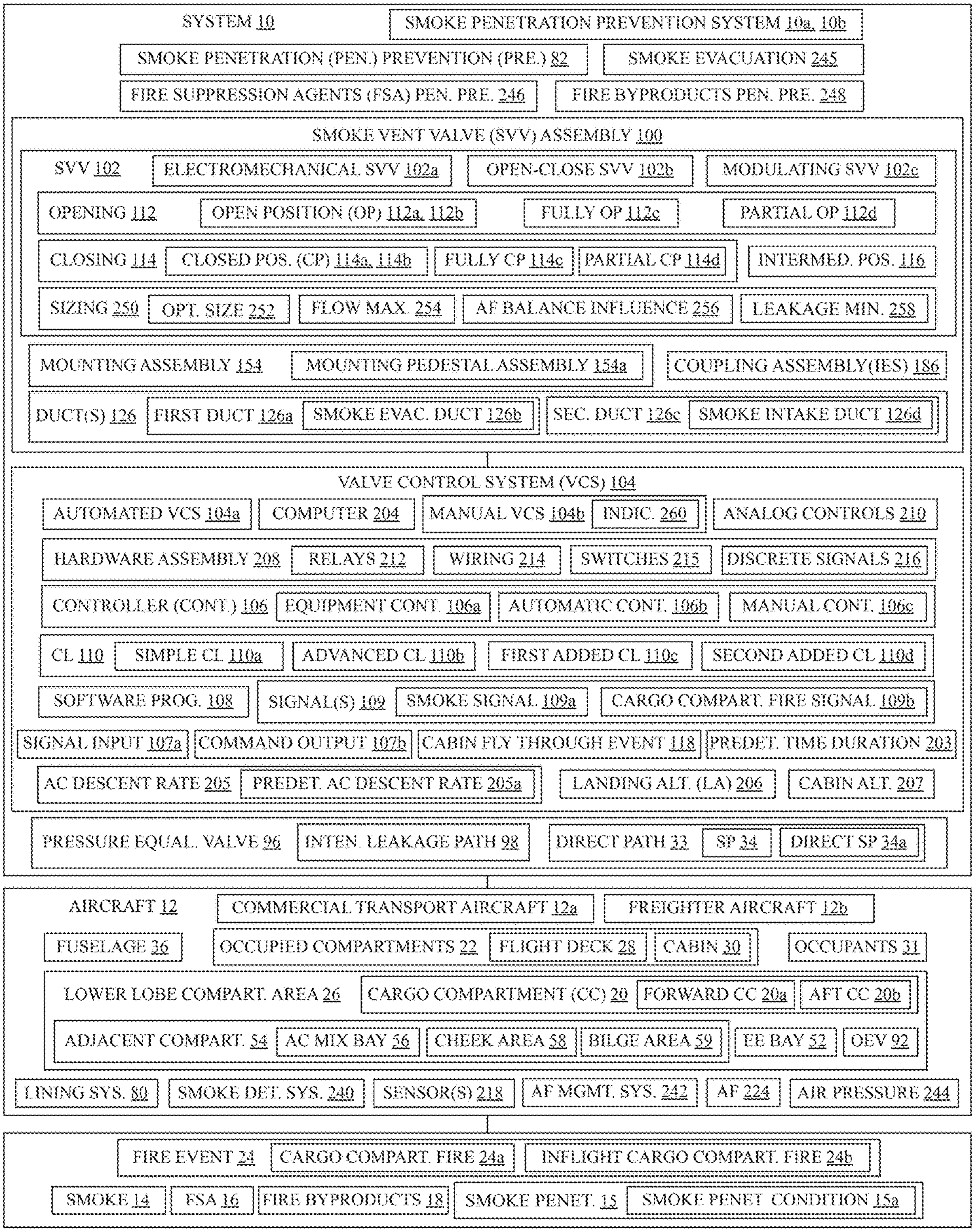
FIG. 7 is an illustration of a block diagram of versions of a system of the disclosure.

In another version of the automated valve control system 104*a*, the control and operation of the smoke vent valve 102 of the smoke vent valve assembly 100 is automated to open or to close with a hardware assembly 208 (see FIGS. 5A-5B, 7) and analog controls 210 (see FIGS. 5A-5B, 7). The hardware assembly 208 and the analog controls 210 may be located in the electronic equipment bay 52 (see FIG. 1), or in another lower lobe compartment area 26 (see FIG. 1) of the aircraft 12 (see FIGS. 1, 5A-5B). This version of the automated valve control system 104*a* is discussed in further detail below with regard to FIG. 7.

In another version, the valve control system 104 comprises the manual valve control system 104*b* (see FIG. 1). With the manual valve control system 104*b*, in one version, operation of the smoke vent valve 102 is manually controlled via a manual switch 111 (see FIG. 1) located in the flight deck 28 (see FIG. 1), or located in another suitable area of the aircraft 12. Operation of the smoke vent valve 102 using the manual switch 111 located in the flight deck 28 may be based on, for example, one or more indications (INDIC.) 260 (see FIG. 7), such as a cargo compartment fire indication, of a fire event 24 (see FIG. 7), such as a cargo compartment fire 24*a* (see FIG. 7), for example, an inflight cargo compartment fire 24*b* (see FIG. 7), in the cargo compartment 20, such as the forward cargo compartment 20*a*, and/or the aft cargo compartment 20*b*, or another area of the lower lobe compartment area 26 (see FIGS. 1, 7), and may also be based on related flight crew procedure which directs the flight crew to open the smoke vent valve 102. In addition to on indication 260, such as the cargo compartment fire indication, another indication 260, such as a smoke vent valve state indication, may be a separate light in the flight deck 28. In one version, the flight crew may manually operate the smoke vent valve 102 based on a first indication 260, such as the cargo compartment fire indication, and then a second, separate indication 260 may show if the smoke vent valve 102 is open or closed. The manual valve control system 104*b* may be used in addition to the automated valve control system 104*a*, as a backup system, or the manual valve control system 104*b* may be used instead of an automated valve control system 104*a*.

As shown in FIG. 1, in this version of the system 10, the design and location of the smoke vent valve assembly 100 is intended to manage smoke 14 originating from the forward cargo compartment 20*a*, which is farther away from the outflow valve 94 than the aft cargo compartment 20*b* on the aircraft 12 that has a single outflow valve 94, where it may be the most beneficial location. However, the smoke vent valve assembly 100 may be used to assist with smoke penetration prevention 82 (see FIG. 7) from the forward cargo compartment 20*a* and/or the aft cargo compartment 20*b*. The system 10 may be most beneficial for aircraft configurations with a single outflow valve 94, but may also be used on aircraft with multiple outflow valves 94.

The primary function of the smoke vent valve assembly 100 is to vent smoke 14 out of the aircraft 12. The smoke vent valve assembly 100 is designed to specifically vent smoke 14 in a location that is desirable from a smoke management perspective and the smoke vent valve 102 is controlled in a way to optimize the ventilation or exhaust of the smoke 14 and also to support the overall aircraft cabin pressurization function.

The smoke vent valve 102 is preferably in the form of an electromechanical smoke vent valve 102*a* (see FIG. 7), that is controllable by the valve control system 104 to open and to close. In one version, the smoke vent valve 102 comprises an open-close smoke vent valve 102*b* (see FIG. 7) that is controlled by the valve control system 104 to open in an open position 112*b* (see FIG. 7), such as a fully open position 112*c* (see FIG. 7), and is controlled to close in a closed position 114*b* (see FIG. 7), such as a fully closed position 114*c* (see FIG. 7).

In another version, the smoke vent valve 102 comprises a modulating smoke vent valve 102*c* (see FIG. 7), where the opening 112 (see FIG. 7) and the closing 114 (see FIG. 7) of the modulating smoke vent valve 102*c* may be modulated, so that the modulating smoke vent valve 102*c* is in an intermediate position 116, such as a partial open position 112*d*, or a partial closed position 114*d*, depending on how fast the aircraft 12 is descending, an altitude the descent is starting from, or how likely a cabin fly through event 118 (see FIG. 7) may occur. As used herein, "a cabin fly through event" means that when an aircraft experiences a rapid or accelerated descent, the aircraft may be unable to repressurize quickly enough and the ambient air pressure ends up exceeding the cabin pressure, i.e., negative cabin pressure to ambient air pressure differential, and this may cause the ambient air at higher pressures to flow backwards into the aircraft and disrupt normal airflow patterns, such as cabin air flowing out of the aircraft or air flowing from the occupied areas in the upper lobe to the lower lobe, and may potentially result in smoke penetration or smoke carried into occupied areas of the aircraft, such as the cabin and flight deck. The cabin fly through event 118 is discussed in more detail below with regard to FIGS. 6 and 7. In one version, the modulating smoke vent valve 102*c* may continuously adjust its position between the fully open position 112*c* and the fully closed position 114*c*, allowing for precise, proportional control of the modulating smoke vent valve 102*c*.

The smoke vent valve assembly 100 has a first end 119*a* (see FIG. 2A) that is open to an interior 120 (see FIG. 2A)

of the adjacent compartment 54 of ambient air 122 (see FIG. 2A), and has a second end 119*b* (see FIG. 2A) that is coupled to an exhaust opening 202 (see FIG. 2A, 3F, 4F) through an exterior portion 125 (see FIGS. 1, 2A-2B, 3D, 4D) of the aircraft 12, for example, through a portion 76*a* (see FIGS. 2A-2B) of the fuselage skin 76 (see FIGS. 1, 2A-2B) and outside the aircraft 12 in ambient atmosphere 124 (see FIGS. 1, 2A). When the aircraft 12 is in flight during a cruise or flight condition, the smoke vent valve 102 is in the closed position 114*b* (see FIG. 7). When the aircraft 12 is in flight during a cruise or flight condition, and there is a fire event 24 (see FIG. 7), such as a cargo compartment fire 24*a* (see FIG. 7), in the cargo compartment 20 (see FIGS. 1, 7), and the smoke vent valve 102 opens to the open position 112*b*, and a differential pressure between the adjacent compartment 54 of the aircraft 12 and the ambient air 122 creates flow through the smoke vent valve 102 from the adjacent compartment 54 that is pressurized and overboard the aircraft 12 to ambient atmosphere 124 through the exterior portion 125 (see FIG. 1) of the aircraft 12. This creates a much more direct smoke path 34*a* for smoke 14 to travel away from the forward cargo compartment 20*a*, through the adjacent compartment 54, and overboard the aircraft 12 without the smoke 14 penetrating the occupied compartments 22, such as the cabin 30, for example, the main passenger cabin 30*a*, and the flight deck 28.

Versions and various parts of the smoke vent valve assembly 100 are discussed in further detail below with regard to FIGS. 3A-3J and FIGS. 4A-4H.

Now referring to FIGS. 2A-2B, FIG. 2A is an illustration of a right side view of a schematic diagram showing a version of a system 10, such as a smoke penetration prevention system 10*a*, of the disclosure, installed in an aircraft 12, and having a version of a smoke vent valve assembly 100 with a duct 126, such as one duct 126, in the form of a first duct 126*a*, for example, a smoke evacuation duct 126*b*. FIG. 2B is an illustration of a right side view of a schematic diagram showing a system 10, such as a smoke penetration prevention system 10*b*, of the disclosure, installed in an aircraft 12, and having another version of a smoke vent valve assembly with two ducts 126, including the first duct 126*a* comprising the smoke evacuation duct 126*b*, and a second duct 126*c* comprising a smoke intake duct 126*d*.

FIGS. 2A-2B show the system 10 comprising the smoke vent valve assembly 100 and the valve control system 104 coupled to the smoke vent valve assembly 100. FIGS. 2A-2B further show the smoke vent valve assembly 100 with the smoke vent valve 102 coupled to the adjacent compartment 54, such as the cheek area 58, adjacent the cargo compartment 20, such as the forward cargo compartment 20*a*.

As further shown in FIGS. 2A-2B, the adjacent compartment 54 has the first endwall 84*a* coextensive with the aft endwall 66*b* of the forward cargo compartment 20*a*, the second endwall 84*b*, sidewalls 85, the ceiling 86, and the floor 88 near the fuselage skin 76 of the aircraft 12. In one version, as shown in FIGS. 2A-2B, the smoke vent valve 102 is coupled, or installed in, the floor 88 of the adjacent compartment 54, and the first duct 126*a*, such as the smoke evacuation duct 126*b*, extends from the smoke vent valve 102, and through the fuselage skin 76, to ambient atmosphere 124 outside the aircraft 12 through an exterior portion 125 of the aircraft 12, such as the fuselage skin 76.

As shown in FIGS. 2A-2B, the first duct 126*a*, such as the smoke evacuation duct 126*b*, has a first duct inlet end 128*a*, a first duct outlet end 128*b*, and a first duct body 130 formed between the first duct inlet end 128*a* and the first duct outlet end 128*b*. The first duct 126*a*, such as the smoke evacuation duct 126*b*, has a hollow tubular configuration 132*a* (see FIGS. 2A-2B). As shown in FIGS. 2A-2B, the first duct inlet end 128*a* is coupled to the smoke vent valve 102, and the first duct outlet end 128*b* is open to the ambient atmosphere 124 outside the aircraft 12 through the exterior portion 125 of the aircraft 12, such as the fuselage skin 76.

As shown in FIG. 2B, in another version, the smoke vent valve assembly 100 includes both the first duct 126*a*, such as the smoke evacuation duct 126*b*, and the second duct 126*c*, such as the smoke intake duct 126*d*. As shown in FIG. 2B, the second duct 126*c*, such as the smoke intake duct 126*d*, has a second duct inlet end 134*a*, a second duct outlet end 134*b*, and a second duct body 135 formed between the second duct inlet end 134*a* and the second duct outlet end 134*b*. The second duct 126*c*, such as the smoke intake duct 126*d*, has a hollow tubular configuration 132*b* (see FIG. 2B). The additional second duct 126*c* may be optionally installed with the second duct outlet end 134*b* coupled to the smoke vent valve 102, and the second duct inlet end 134*a* positioned in proximity to, or adjacent to, or connected to, the pressure equalization valve 96 (see FIG. 2B), to further streamline the smoke path 34 (see FIGS. 2A-2B), such as the direct smoke path 34*a* (see FIGS. 2A-2B), as a direct path 33 (see FIGS. 2A-2B) for smoke 14 (see FIGS. 2A-2B) to vent from the cargo compartment 20 (see FIGS. 2A-2B), such as the forward cargo compartment 20*a* (see FIGS. 2A-2B), through the smoke vent valve assembly 100, and outside of, or overboard, the aircraft 12.

FIGS. 2A-2B further show the cargo compartment 20, such as the forward cargo compartment 20*a*. As further shown in FIGS. 2A-2B, the forward cargo compartment 20*a* has the plurality of walls 65, such as the forward endwall 66*a*, the aft endwall 66*b*, and the sidewalls 68, and has the ceiling panel 70 and the floor panel 72. The floor panel 72 is adjacent to, or near to, the fuselage skin 76 of the aircraft 12. As further shown in FIGS. 2A-2B, the forward cargo compartment 20*a* has the boundary 78 that is lined with the lining system 80 of cargo compartment liners, tape, and/or other types of seals to seal up the boundary 78.

As shown in FIGS. 2A-2B, the pressure equalization valve 96 is coupled to, and installed in, the aft endwall 66*b* of the forward cargo compartment 20*a*. FIGS. 2A-2B show smoke 14 in an interior 136 of the forward cargo compartment 20*a*. As shown in FIG. 2A, the smoke path 34, such as the direct smoke path 34*a*, of smoke 14 exits the forward cargo compartment 20*a*, via the pressure equalization valve 96, and flows directly to the smoke vent valve assembly 100, such as through the smoke vent valve 102, through the first duct 126*a*, such as the smoke evacuation duct 126*b*, and out of the aircraft 12 to ambient atmosphere 124 through the exterior portion 125 of the aircraft 12. As shown in FIG. 2B, the smoke path 34, such as the direct smoke path 34*a*, of smoke 14 exits the forward cargo compartment 20*a*, via the pressure equalization valve 96, and flows into the second duct 126*c*, such as the smoke intake duct 126*d*, to provide a more aligned and streamlined smoke path 34 to the smoke vent valve 102 of the smoke vent valve assembly 100. As shown in FIG. 2B, the direct smoke path 34*a* travels through the smoke vent valve 102 and exits the smoke vent valve 102, and travels through the first duct 126*a*, such as the smoke evacuation duct 126*b*, and out of the aircraft 12 to ambient atmosphere 124 through the exterior portion 125 of the aircraft 12.

As shown in FIGS. 2A-2B, the pressure equalization valve 96 provides the intentional leakage path 98 through the lining system 80 of the cargo compartment 20, such as the forward cargo compartment 20*a*. In this way, the majority of smoke 14 that penetrates the lining system 80 of the cargo compartment 20, such as the forward cargo compartment 20*a*, is directed through the pressure equalization valve 96 and deposited directly next to, or near to, the smoke vent valve assembly 100, and the flow of the smoke 14 through the smoke vent valve assembly 100 draws the smoke 14 outside the aircraft 12.

FIGS. 2A-2B further show the electronic equipment bay 52 located adjacent to, and forward of, the forward cargo compartment 20*a*. In one version, the smoke vent valve 102 of the smoke vent valve assembly 100 is coupled to the valve control system 104, in one version, via the connection 105, such as the wireless connection 105*a*. In another version, the smoke vent valve 102 may be coupled to the valve control system 104 via a wired connection 105*b* (see FIG. 7). FIGS. 2A-2B show the valve control system 104 comprising the automated valve control system 104*a* having the controller 106, such as the equipment controller 106*a*, that uses the software program 108 having the control logic 110. The smoke vent valve assembly 100 is designed to take advantage of the pressure equalization valve 96 and the intentional leakage path 98, so that the smoke vent valve assembly 100 can exhaust the smoke 14 through the pressure equalization valve 96 outside of the aircraft 12, using the valve control system 104 comprising, in one version, the controller 106 and the software program 108 with the control logic 110.

In one version, the control and operation of the smoke vent valve 102 of the smoke vent valve assembly 100 is automated to open or to close with the controller 106, such as the equipment controller 106*a*, using the software program 108 with the control logic 110, that receives a signal input 107*a* (see FIG. 7), such as relevant signal input, and then the control logic 110 outputs, or sends, a command output 107*b* (see FIG. 7) to open the smoke vent valve 102 to the open position 112*b* (see FIG. 7), or to close the smoke vent valve 102 to the closed position 114*b* (see FIG. 7), when necessary. As shown in FIGS. 2A-2B, in one version, the valve control system 104 with the controller 106, such as the equipment controller 106*a*, and the software program 108 with the control logic 110, is located in the electronic equipment bay 52. Preferably, the valve control system 104 is located in the electronic equipment bay 52, such as a forward electronic equipment bay located in a forward portion of the lower lobe compartment area 26, or an aft electronic equipment bay located in an aft portion of the lower lobe compartment area 26. In other versions, the valve control system 104 may be located in another lower lobe compartment area 26 conducive to smoke evacuation, in the flight deck 28, for example, if the control logic 110 is built into a cargo compartment fire panel, or in another suitable area of the aircraft 12. As indicated above, location of the valve control system 104 may also be based on availability of space, system design constraints, and complexity of integration onto the aircraft 12.

Figure 3A:
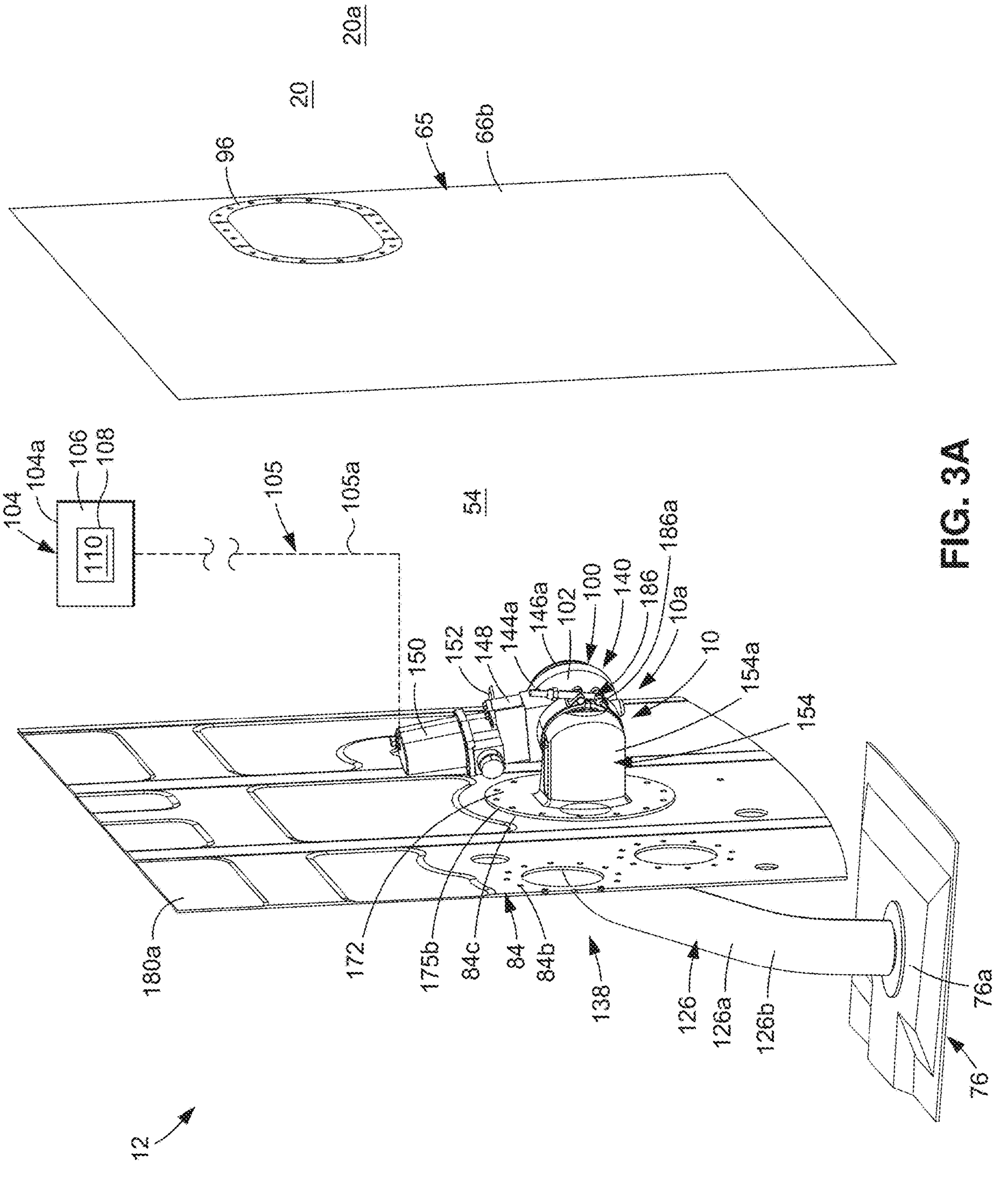
FIG. 3A is an illustration of a right side perspective view of a version of a system of the disclosure, in an aircraft installation configuration, and having a version of a smoke vent valve assembly with one duct.
Figure 3B:
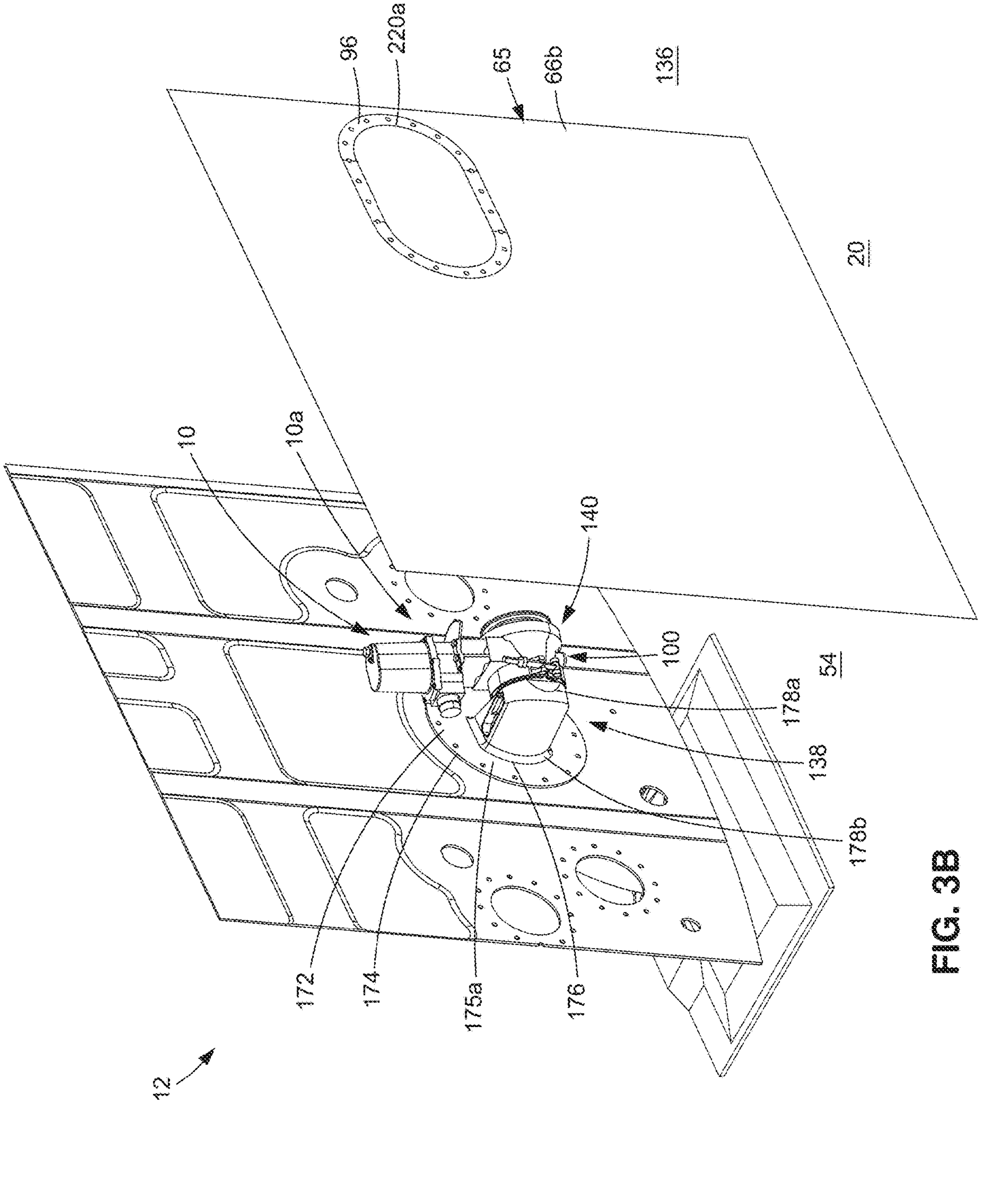
FIG. 3B is an illustration of a front perspective view of the system of FIG. 3A, in the aircraft installation configuration.
Figure 3C:
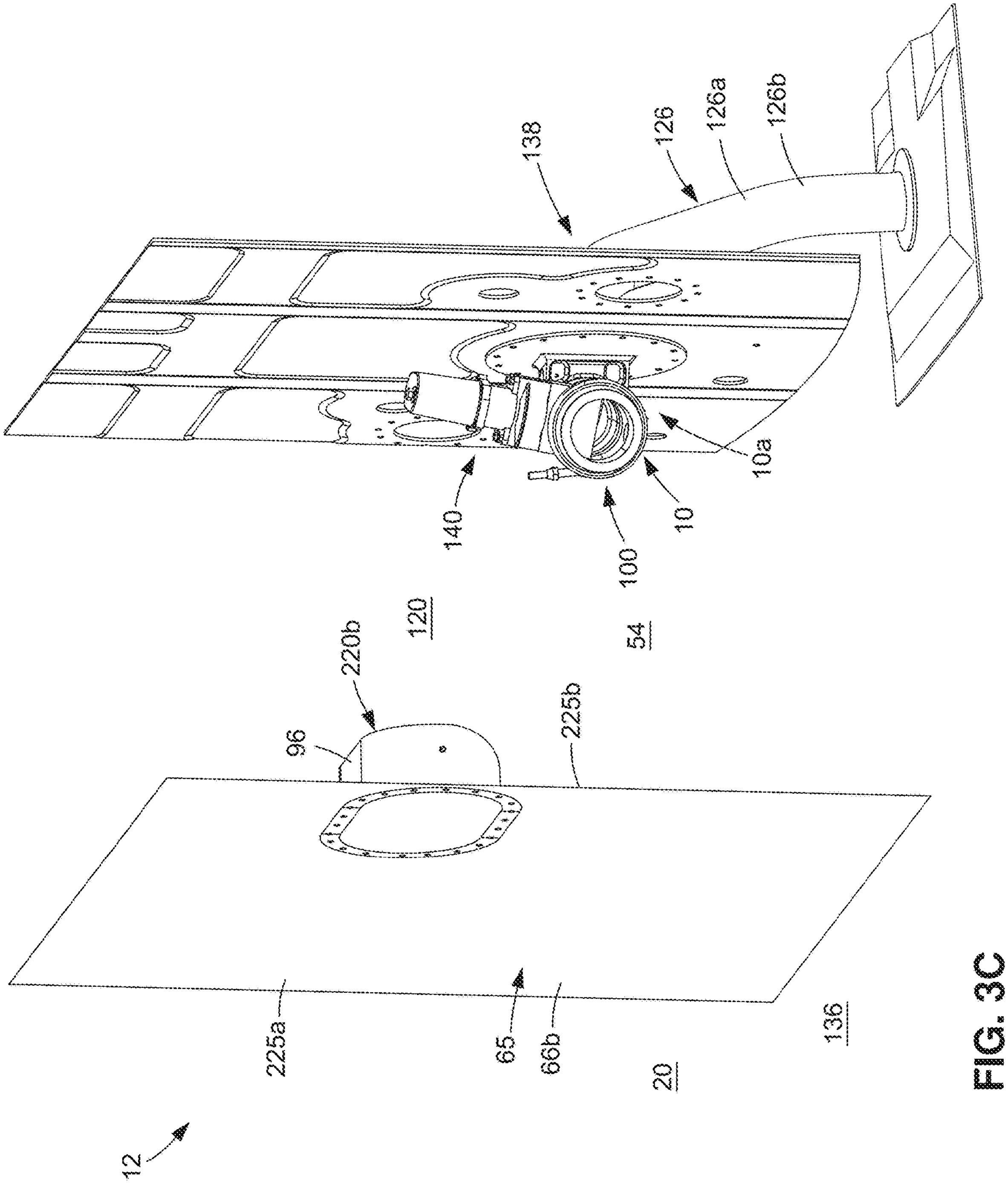
FIG. 3C is an illustration of a left side perspective view of the system of FIG. 3A, in the aircraft installation configuration.
Figure 3D:
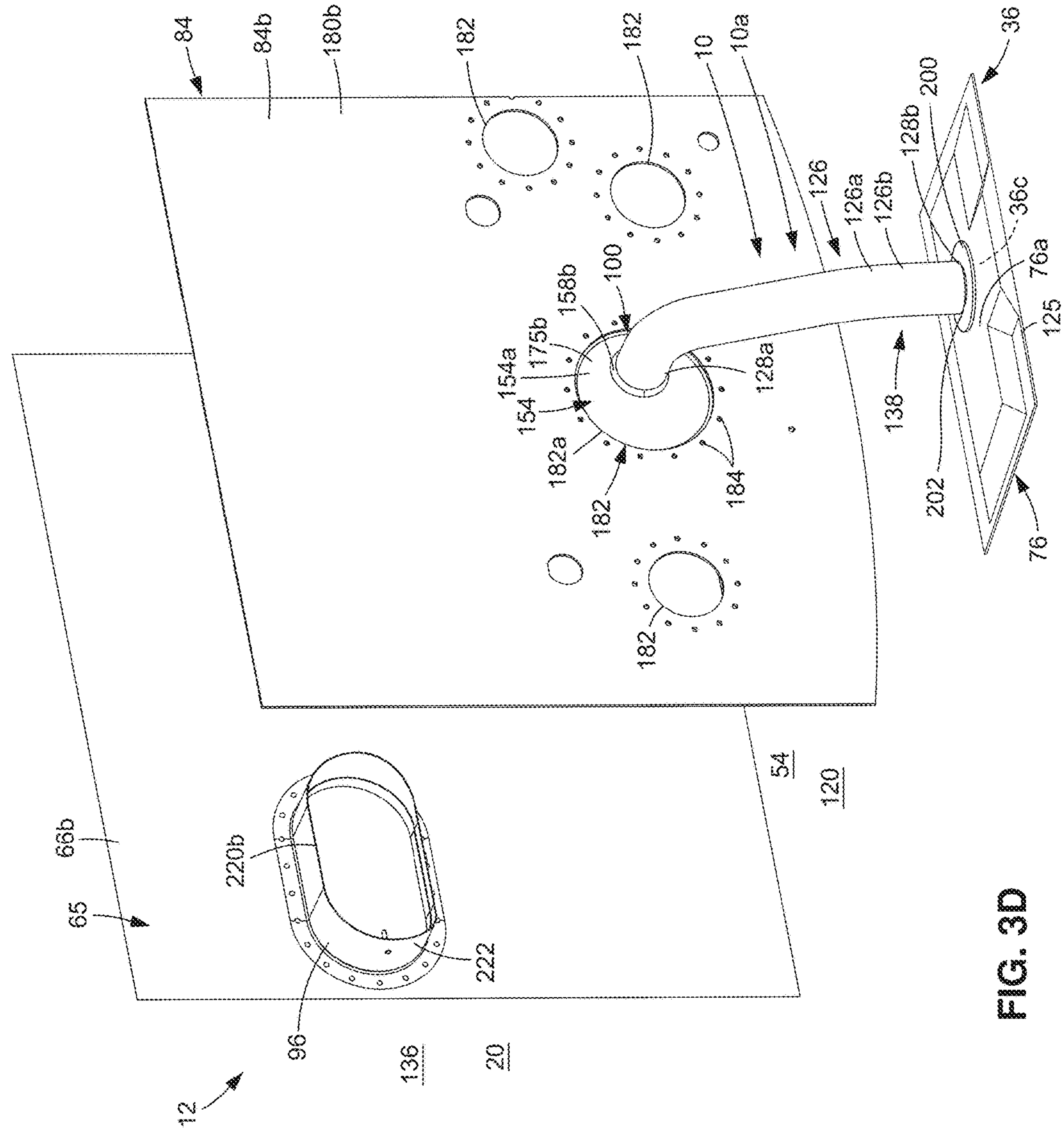
FIG. 3D is an illustration of back perspective view of the system of FIG. 3A, in the aircraft installation configuration.
Figure 3E:
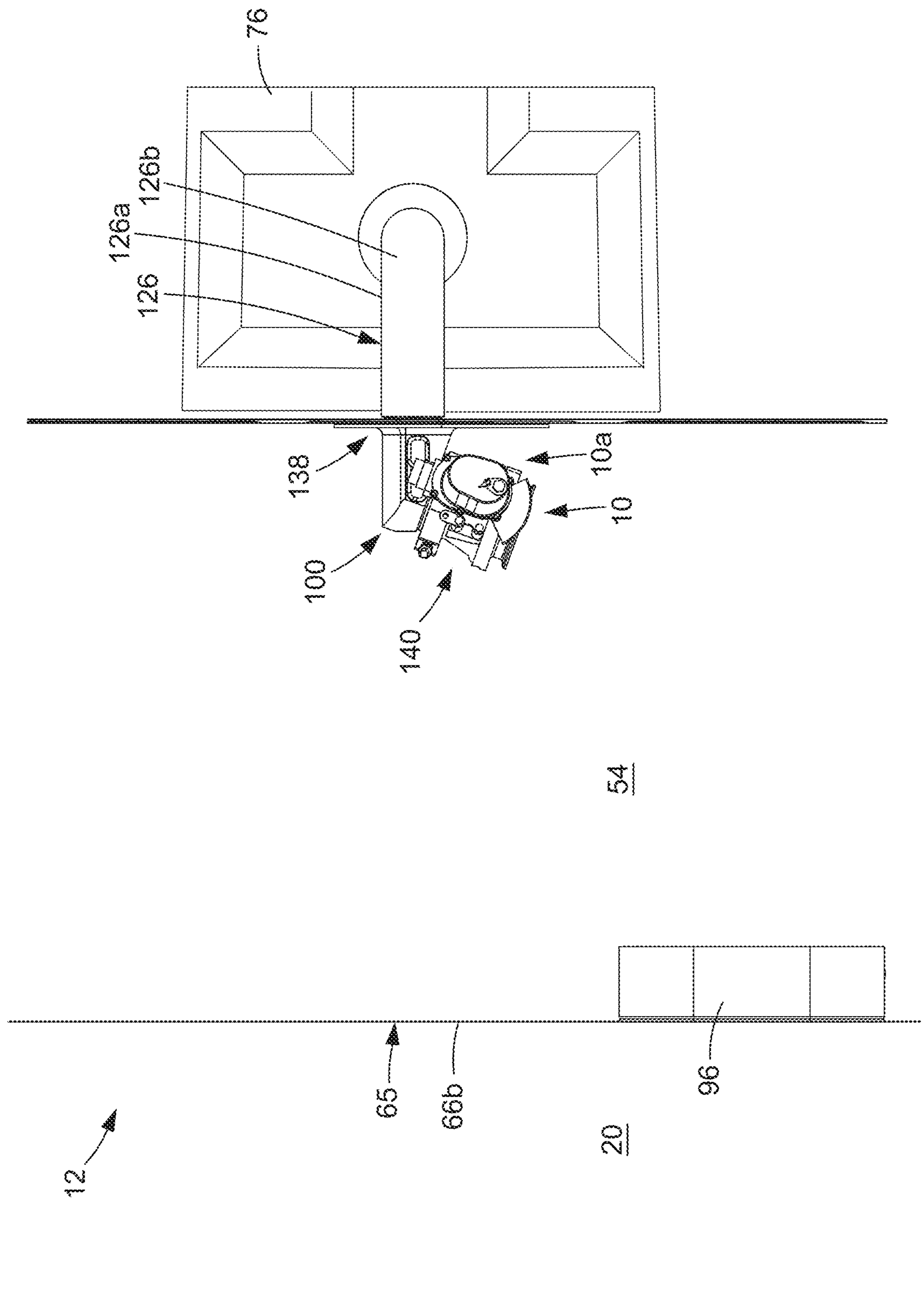
FIG. 3E is an illustration of a top perspective view of the system of FIG. 3A, in the aircraft installation configuration.
Figure 3F:
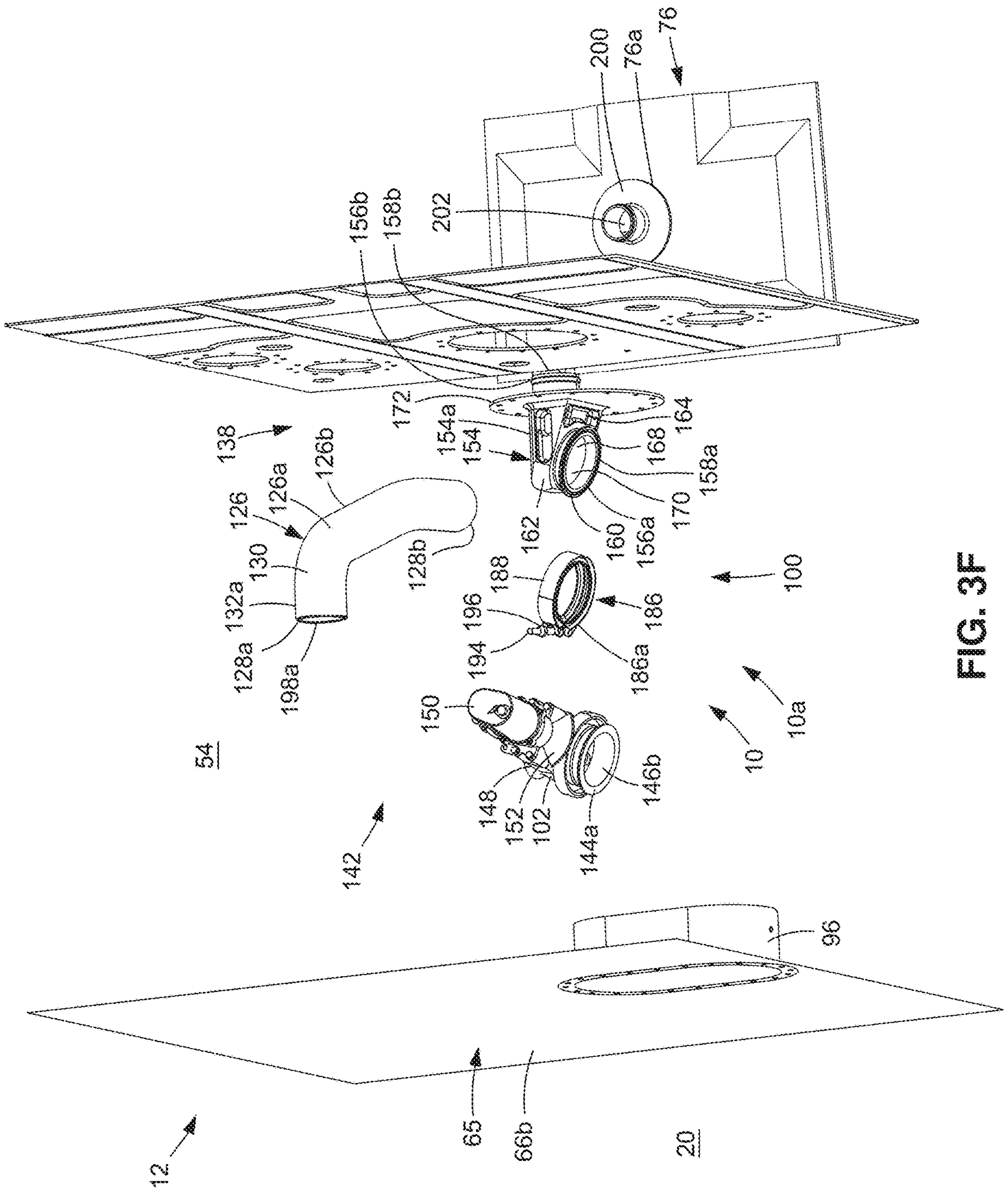
FIG. 3F is an illustration of a top perspective exploded view of the system of FIG. 3A, in an unassembled configuration, in the aircraft installation configuration.
Figure 3G:
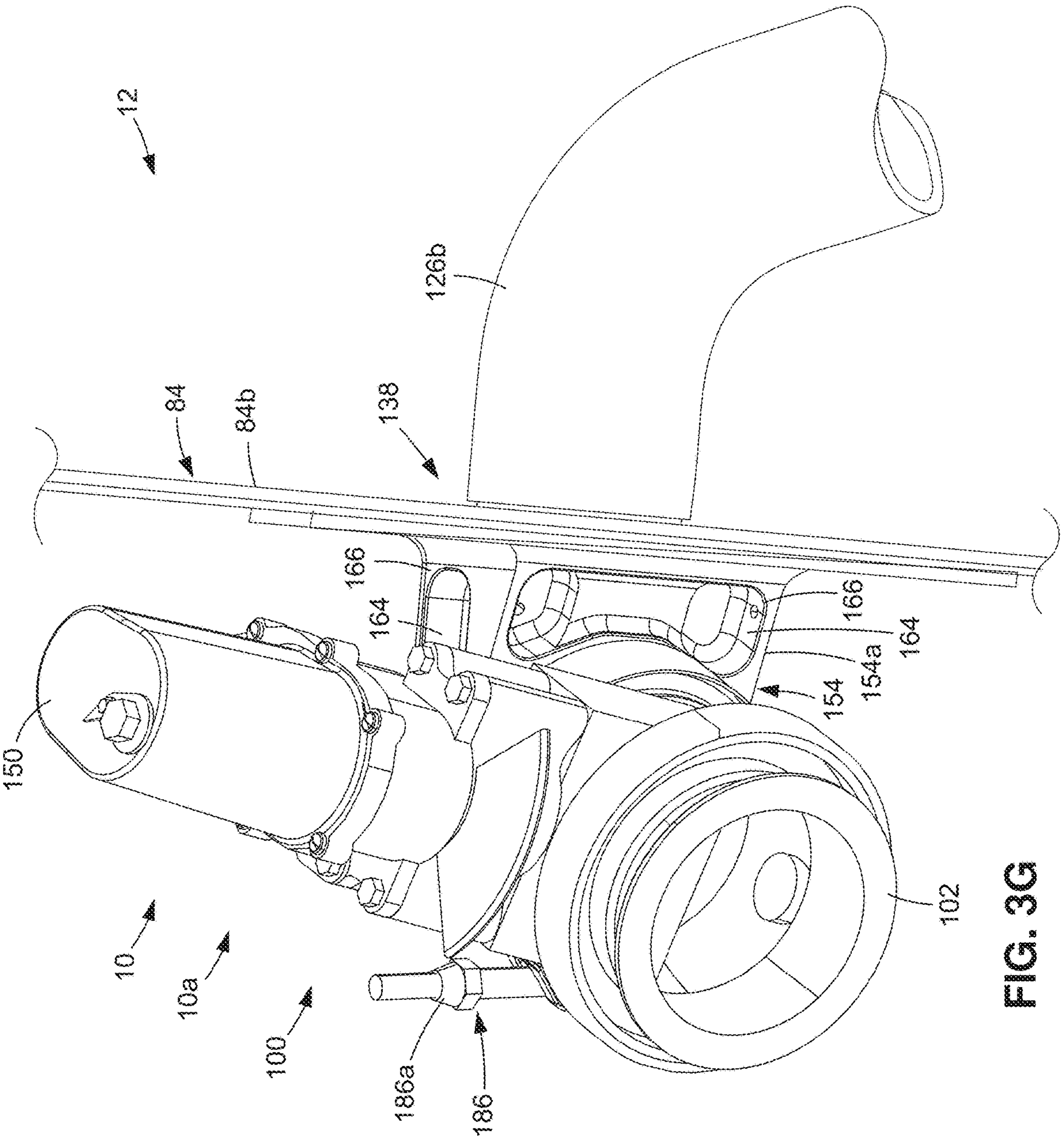
FIG. 3G is an illustration of a left side enlarged perspective view of the system of FIG. 3A, in the aircraft installation configuration.
Figure 3H:
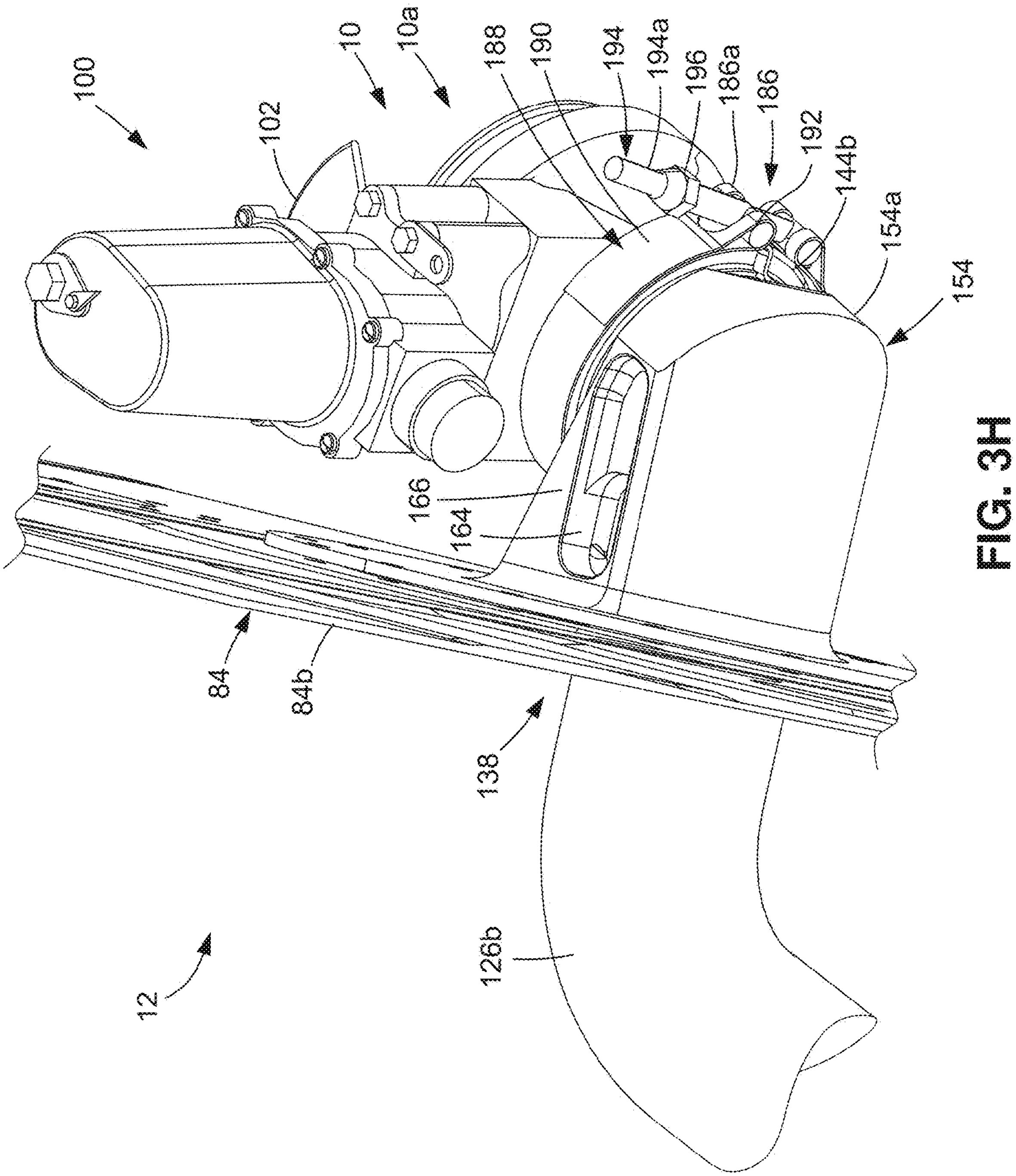
FIG. 3H is an illustration of a right side enlarged perspective view of the system of FIG. 3A, in the aircraft installation configuration.
Figure 3J:
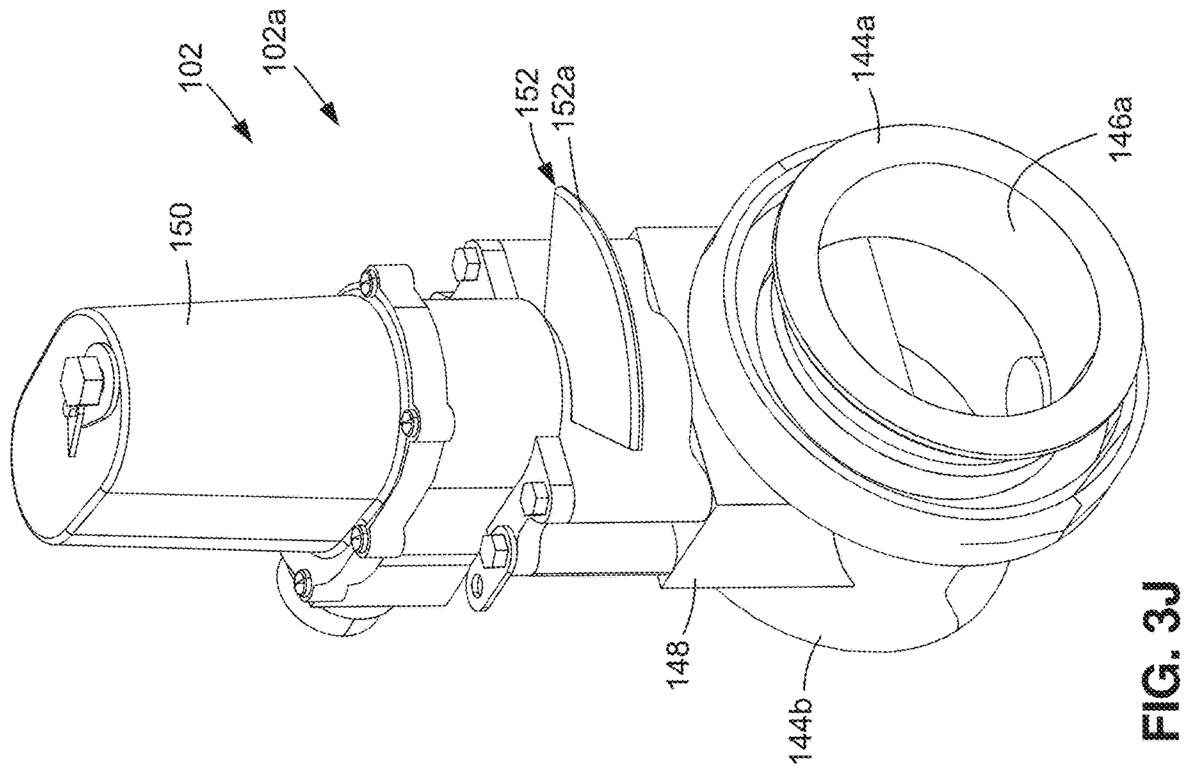
FIG. 3J is an illustration of a left side enlarged perspective view of the smoke vent valve of FIG. 3I.
Figure 3I:
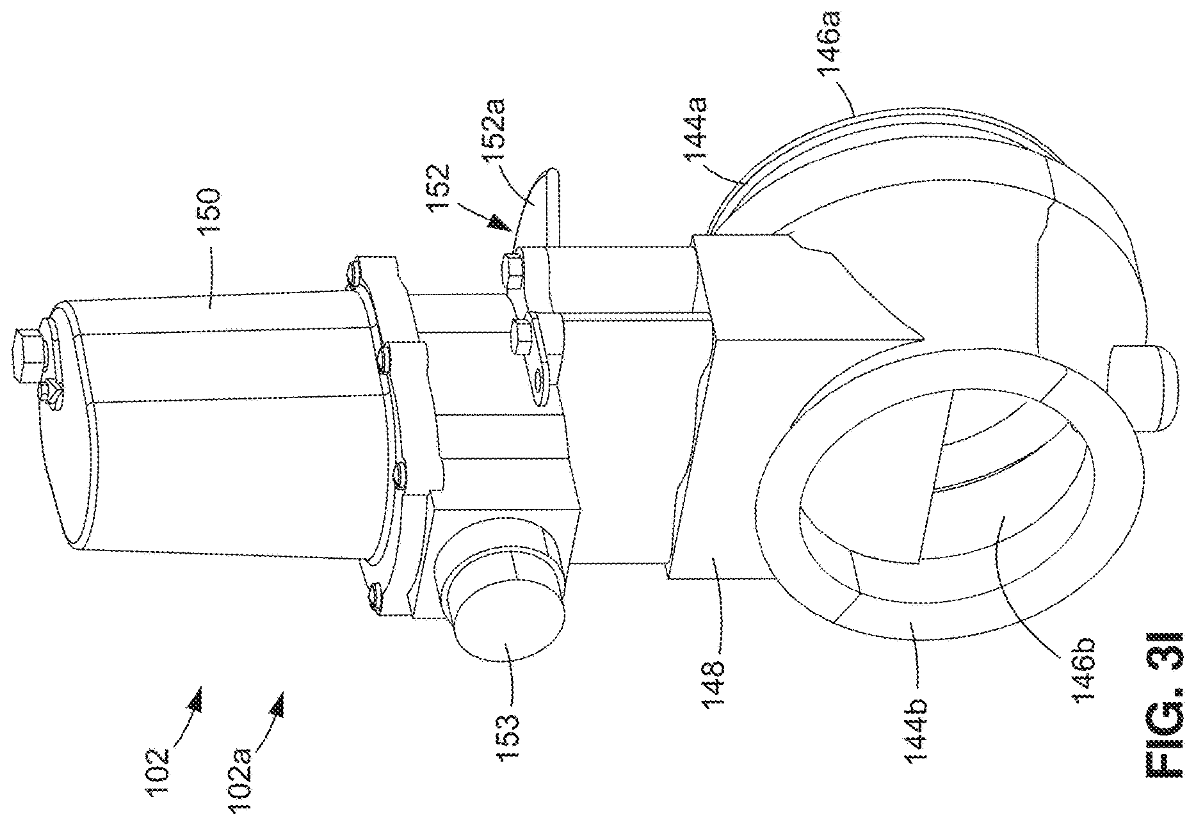
FIG. 3I is an illustration of a right side enlarged perspective view of a smoke vent valve of FIG. 3F.

Now referring to FIGS. 3A-3J, FIGS. 3A-3H show various views of a version of the system 10, such as the smoke penetration prevention system 10*a*, in an aircraft installation configuration 138, and having a version of the smoke vent valve assembly 100 with a duct 126, such as one duct 126, in the form of the first duct 126*a*, for example, the smoke evacuation duct 126*b*. FIGS. 3I-3J show the smoke vent valve 102 of the smoke vent valve assembly 100 of FIGS. 3A-3H. FIGS. 3A-3E and FIG. 3G-3H show the smoke vent valve assembly 100 in an assembled configuration 140. FIG. 3F shows the smoke vent valve assembly 100 in an unassembled configuration 142.

FIG. 3A is an illustration of a right side perspective view of a version of the system 10, such as the smoke penetration prevention system 10*a*, of the disclosure, in the aircraft installation configuration 138, and having a version of the smoke vent valve assembly 100 with one duct 126. FIG. 3B is an illustration of a front perspective view of the system 10, such as the smoke penetration prevention system 10*a*, of FIG. 3A, in the aircraft installation configuration 138. FIG. 3C is an illustration of a left side perspective view of the system 10, such as the smoke penetration prevention system 10*a*, of FIG. 3A, in the aircraft installation configuration 138. FIG. 3D is an illustration of back perspective view of the system 10, such as the smoke penetration prevention system 10*a*, of FIG. 3A, in the aircraft installation configuration 138. FIG. 3E is an illustration of a top perspective view of the system 10, such as the smoke penetration prevention system 10*a*, of FIG. 3A, in the aircraft installation configuration 138. FIG. 3F is an illustration of a top perspective exploded view of the system 10, such as the smoke penetration prevention system 10*a*, of FIG. 3A, in the unassembled configuration 142, in the aircraft installation configuration 138. FIG. 3G is an illustration of a left side enlarged perspective view of the system 10, such as the smoke penetration prevention system 10*a*, of FIG. 3A, in the aircraft installation configuration 138. FIG. 3H is an illustration of a right side enlarged perspective view of the system system 10, such as the smoke penetration prevention system 10*a*, of FIG. 3A, in the aircraft installation configuration 138.

FIG. 3I is an illustration of a right side enlarged perspective view of the smoke vent valve 102 of FIG. 3F. FIG. 3J is an illustration of a left side enlarged perspective view of the smoke vent valve 102 of FIG. 3I. The smoke vent valve 102 shown in FIGS. 3I-3J is an electromechanical smoke vent valve 102*a*. The smoke vent valve 102 shown in FIGS. 3I-3J may comprise an open-close smoke vent valve 102*b* (see FIG. 7), a modulating smoke vent valve 102*c* (see FIG. 7), or another suitable type of valve.

As shown in FIGS. 3A-3H, the system 10, such as the smoke penetration prevention system 10*a*, in an aircraft installation configuration 138, comprises the smoke vent valve assembly 100 having the smoke vent valve 102. As shown in FIGS. 3A, 3F-3J, the smoke vent valve 102 comprises a smoke vent valve inlet flange 144*a* surrounding a smoke vent valve inlet opening 146*a*, and a smoke vent valve outlet flange 144*b* (see FIGS. 3I-3J) surrounding a smoke vent valve outlet opening 146*b* (see FIG. 3I). As shown in FIGS. 3A, 3F-3J, the smoke vent valve 102 further comprises a smoke vent valve housing 148. The smoke vent valve housing 148 is preferably made of a metal material, such as aluminum, steel, stainless steel, titanium, or other suitable metal materials or metallic construction materials used in aircraft and appropriate for the application. The smoke vent valve housing 148 may also be made of non-metal materials suitable for the application.

As shown in FIGS. 3A, 3F-3J, the smoke vent valve 102 further comprises, in one version, a torque motor actuator assembly 150, to open the smoke vent valve 102. The torque motor actuator assembly 150 comprises an electric torque rotary actuator that uses power from an electric torque motor to produce rotational force to drive and open the smoke vent valve 102. The electric torque rotary actuator works based on the conversion of electrical energy into mechanical energy through the electric torque motor, which then produces a rotational motion which is transmitted to activate the smoke vent valve 102 to either open or close, when controlled by the valve control system 104 (see FIG. 1).

Although this version of the smoke vent valve 102 uses the torque motor actuator assembly 150, other versions of the smoke vent valve 102 may use other types of actuator assemblies, such as a linear actuator assembly, a shape memory alloy, a servo motor, or other suitable types of actuator assemblies to open the smoke vent valve 102. The electric torque rotary actuator has a suitable speed (revolutions per minute) appropriate for the application.

As shown in FIGS. 3A, 3F-3J, the smoke vent valve 102 further comprises a locking lever 152, such as a manual locking lever 152*a* (see FIGS. 3I, 3J), or another suitable type of locking lever 152 or locking mechanism, configured to lock the smoke vent valve 102 in an open position 112*b* (see FIG. 7) or in a closed position 114*b* (see FIG. 7). The locking lever 152 is preferably made of a metal material, such as aluminum, steel, stainless steel, titanium, or other suitable metal materials or metallic construction materials used in aircraft and appropriate for the application.

As further shown in FIG. 3I, the smoke vent valve 102 comprises an electrical connector element 153 attached to the torque motor actuator assembly 150. In one version, the electrical connector element 153 comprises a canon plug type electrical connector for powering and commanding the smoke vent valve 102.

As shown in FIGS. 3A, 3F-3H, the smoke vent valve assembly 100 further comprises a mounting assembly 154, such as a mounting pedestal assembly 154*a*, attached to the smoke vent valve 102, and in particular, attached to the smoke vent valve outlet flange 144*b* (see FIG. 3H). The mounting assembly 154 is preferably made of a metal material, such as aluminum, steel, stainless steel, titanium, or other suitable metal materials or metallic construction materials used in aircraft and appropriate for the application. The mounting assembly 154 may also be made of non-metal materials suitable for the application.

As shown in FIG. 3F, the mounting assembly 154, such as the mounting pedestal assembly 154*a*, comprises an inlet flange 156*a* surrounding an inlet opening 158*a*, and an outlet flange 156*b* surrounding an outlet opening 158*b*. As further shown in FIG. 3F, the inlet flange 156*a* has an O-ring seal 160 coupled, or attached, to the inlet flange 156*a*. The O-ring seal 160 is preferably made of a flexible, elastomeric material that creates a seal between the inlet opening 158*a* of the mounting pedestal assembly 154*a*, and the smoke vent valve outlet opening 146*b* (see FIG. 3I) of the smoke vent valve 102. When compressed in a groove, the O-ring seal 160 fills the space to form a barrier that prevents leaks of liquids or gases, such as the smoke 14.

As further shown in FIG. 3F, the mounting assembly 154, such as the mounting pedestal assembly 154*a*, comprises a support pedestal portion 162 coupled to, and formed between, the inlet opening 158*a* and the outlet opening 158*b*. As shown in FIGS. 3F-3H, the support pedestal portion 162 has a plurality of pocket features 164 formed in exterior portions 166 of the support pedestal portion 162, to lighten, or to decrease, the weight of the support pedestal portion 162 which is preferably machined.

As further shown in FIG. 3F, the mounting assembly 154, such as the mounting pedestal assembly 154*a*, has an orifice 168 located in an interior 170 of the support pedestal portion 162 between the inlet flange 156*a* and the outlet flange 156*b*. The orifice 168 is an optional feature and is a predetermined size and a defined dimension that may be built into the interior 170 of the support pedestal portion 162 of the mounting assembly 154, such as the mounting pedestal assembly 154*a*. The orifice 168 can act to limit the amount of smoke 14 flowing into or out of the aircraft 12. It is not necessary to use the orifice 168 in order for the smoke vent valve assembly 100 to be operational. Rather, a supplemental valve may be added to obtain an orifice of an exact size needed. With a modulating smoke vent valve 102*c*, the orifice 168 may be eliminated.

As further shown in FIG. 3F, the mounting assembly 154, such as the mounting pedestal assembly 154*a*, comprises a mounting flange member 172 attached to the support pedestal portion 162, and in particular, attached between the support pedestal portion 162 and the outlet opening 158*b* of the mounting assembly 154. As shown in FIG. 3B, the mounting flange member 172 has a disc-shaped body 174 with a first side 175*a*, a second side 175*b* (see FIG. 3D), and a central through opening 176 formed through the disc-shaped body 174.

As shown in FIG. 3B, the support pedestal portion 162 has a first end 178*a* attached to, or integral with, the inlet flange 156*a* (see FIG. 3F), and has a second end 178*b* attached to, or integral with the first side 175*a* of the mounting flange member 172 and covering the central through opening 176 on the first side 175*a*. As shown in FIG. 3A, the second side 175*b* of the mounting flange member 172 is mounted on, and attached to, a portion 84*c* of an endwall 84, such as a second endwall 84*b*, of the adjacent compartment 54 volume adjacent to the cargo compartment 20 volume. The endwall 84 (see FIGS. 3A, 3D), such as the second endwall 84*b* (see FIGS. 3A, 3D), has a first side 180*a* (see FIG. 3A) and a second side 180*b* (see FIG. 3D), and a plurality of cutout openings 182 (see FIG. 3D). As shown in FIG. 3D, the second side 175*b* of the mounting flange member 172 is attached with attachment elements 184, such as screws, bolts, or other suitable attachment elements, over a cutout opening 182*a* formed through the second endwall 84*b*.

As shown in FIGS. 3A, 3F-3H, the smoke vent valve assembly 100 further comprises a coupling assembly 186, such as a first coupling assembly 186*a*, for example, a smoke vent valve coupling assembly. The first coupling assembly 186*a* is attached to, and couples together, a smoke vent valve outlet flange 144*b* (see FIGS. 3H, 3I) of the smoke vent valve 102, and an inlet flange 156*a* (see FIG. 3F) of a mounting assembly 154 (see FIGS. 3F, 3H), such as a mounting pedestal assembly 154*a* (see FIGS. 3F, 3H). In one version, the first coupling assembly 186*a* couples the smoke vent valve 102 and the mounting assembly 154 together. As shown in FIG. 3H, the coupling assembly 186, such as the first coupling assembly 186*a*, comprises a T-bolt duct clamp 188 (see also FIG. 3F) comprising a metal band 190 or loop having a V-shaped profile 192, a bolt 194 (see also FIG. 3F), such as a T-shaped bolt 194*a*, attached to the metal band 190, and a locking nut 196 (see also FIG. 3F) coupled to the T-shaped bolt 194*a*.

As shown in FIGS. 3A, 3D, 3F, the smoke vent valve assembly 100 further comprises the first duct 126*a*, such as the smoke evacuation duct 126*b*, coupled to the smoke vent valve 102, via the mounting assembly 154 (see FIGS. 3A, 3F), such as the mounting pedestal assembly 154*a* (see FIGS. 3A, 3F). As shown in FIG. 3F, the first duct 126*a*, such as the smoke evacuation duct 126*b*, comprises the first duct inlet end 128*a*, the first duct outlet end 128*b*, and the first duct body 130 formed between the first duct inlet end 128*a* and the first duct outlet end 128*b*, where the first duct body 130 has a hollow tubular configuration 132*a* with a hollow interior 198*a*.

As shown in FIG. 3D, the first duct inlet end 128*a* of the first duct 126*a*, such as the smoke evacuation duct 126*b*, is attached to the outlet opening 158*b* of the mounting assembly 154, such as the mounting pedestal assembly 154*a*. The hollow interior 198*a* of the first duct 126*a*, such as the smoke evacuation duct 126*b* is in fluid communication with, and inline with, the interior 170 of the support pedestal portion 162 of the mounting pedestal assembly 154*a*.

As further shown in FIG. 3D, the first duct outlet end 128*b* of the first duct 126*a*, such as the smoke evacuation duct 126*b*, is attached to an exhaust port 200 (see also FIG. 3F) having an exhaust opening 202 (see FIG. 3F). As shown in FIGS. 3D, 3F, the exhaust port 200 is coupled, or attached, to a portion 76*a* of the fuselage skin 76 of the fuselage 36 (see FIG. 1), and the exhaust port 200 is in fluid communication with, and inline with, the exhaust opening 202 formed through the fuselage skin 76, at and through the exterior lower portion 36*c* (see FIG. 3D) of the fuselage 36 (see FIG. 3D), and at and through the exterior portion 125 (see FIGS. 1, 3D) of the aircraft 12 (see FIGS. 1, 3D). The first duct outlet end 128*b* of the first duct 126*a* is coupled to the portion 76*a* of the fuselage skin 76 and terminates at the exhaust opening 202 formed through the fuselage skin 76, at and through the exterior lower portion 36*c* of the fuselage 36, and at and through the exterior portion 125 (see FIGS. 2A, 3D, 5A) of the aircraft 12 (see FIGS. 1, 2A, 3D, 5A), and the exhaust opening 202 is open to ambient atmosphere 124 (see FIG. 1) outside the aircraft 12.

As shown in FIG. 3A, the system 10 further comprises the valve control system 104 coupled to the smoke vent valve 102, via the connection 105, such as the wireless connection 105*a*, to control opening 112 (see FIG. 7) and closing 114 (see FIG. 7) of the smoke vent valve 102. For clarity purposes, the valve control system 104 for the system 10 shown in FIGS. 3A-3H is only shown in FIG. 3A, but the valve control system 104 shown in FIG. 3A is also part of the system 10 shown in FIGS. 3B-3H. In one version of the system 10, as shown in FIG. 3A, the valve control system 104 comprises an automated valve control system 104*a*. In another version, the valve control system 104 may comprise a manual valve control system 104*b* (see FIG. 7).

As shown in FIG. 3A, the automated valve control system 104*a* comprises a controller 106 with a software program 108 having a control logic 110, such as an advanced control logic (CL) 110*b* (see FIG. 7). The controller 106 may be part of a computer 204 (see FIG. 7), and the software program 108 may be executed on the computer 204. In one version, the advanced control logic 110*b* of the software program 108 comprises a simple control logic (CL) 110*a* (see FIG. 7), a first added control logic (CL) 110*c* (see FIG. 7), and a second added control logic (CL) 110*d* (see FIG. 7). The simple control logic 110*a* is configured to cause the smoke vent valve 102 to automatically open based on one or more signals 109 (see FIG. 7) triggered by a fire event 24 (see FIG. 7) in a cargo compartment 20 (see FIG. 3A), such as a forward cargo compartment 20*a* (see FIG. 3A). The first added control logic 110*c* minimizes the risk of a cabin fly through event 118 (see FIG. 7). The first added control logic 110*c* is configured to cause the smoke vent valve 102 to automatically close, when an aircraft descent rate 205 (see FIG. 7) of the aircraft 12 is detected that is greater than, or faster than, a predetermined aircraft descent rate 205*a* (see FIG. 7) for a predetermined (PREDET.) time duration 203 (see FIG. 7), i.e., the aircraft descent rate 205 is greater than, or faster than, "x" feet per minute for "x" seconds, of the aircraft 12. The second added control logic 110*d* is configured to cause the smoke vent valve 102 to automatically reopen, when the aircraft descent rate 205 of the aircraft 12 is detected that is less than, or slower than, the predetermined aircraft descent rate 205*a* for the predetermined time duration 203, i.e., the aircraft descent rate 205 is less than, or slower than, "x" feet per minute for "x" seconds, of the aircraft 12. As used herein, "aircraft descent rate", also referred to as "rate of descent", means the speed at which an aircraft decreases altitude over time, typically measured in feet per minute (fpm), and it is a temporal rate of decrease in altitude, and a negative rate of climb corresponds to a positive rate of descent.

The first added control logic 110*c* may also use the parameters of a landing altitude (LA) 206 (see FIG. 7) and a cabin altitude 207 (see FIG. 7), in addition to the aircraft descent rate 205. As used herein, "landing altitude" means an aircraft's height above the ground (AGL) or sea level when the aircraft touches down or lands. As used herein, "cabin altitude" means a simulated altitude inside the aircraft cabin that is artificially lower than the actual flying altitude of an aircraft. For example, in one version, the first added control logic 110*c* is configured to cause the smoke vent valve 102 to automatically close, when the aircraft descent rate 205 of the aircraft 12 is detected that is greater than, or faster than, the predetermined aircraft descent rate 205*a* for a predetermined time duration 203, and when a cabin altitude 207 (see FIG. 7) of the aircraft 12 is detected that is greater than or equal to a landing altitude 206 (see FIG. 7), such as a selected landing altitude.

The second added control logic 110*d* may also use the parameter of the aircraft descent rate 205 to reopen the smoke vent valve 102. For example, in one version, the second added control logic 110*d* is configured to cause the smoke vent valve 102 to automatically reopen, when the aircraft descent rate 205 of the aircraft 12 is detected that is less than, or slower than, the predetermined aircraft descent rate 205*a* for the predetermined time duration 203.

Alternatively, in another version of the automated valve control system 104*a*, the smoke vent valve 102 is automated to automatically open or to automatically close using a hardware assembly 208, such as shown in FIG. 7, and analog controls 210. The hardware assembly 208 preferably includes, as shown in FIG. 7, relays 212, wiring 214, switches 215, discrete signals (SIG.) 216, and other suitable hardware that receive signals, for example, via discrete signal wiring relays, upon activation of one or more sensors 218 (see FIG. 7) in the cargo compartment 20, when there is a fire event 24 (see FIG. 7) in the cargo compartment 20. The hardware assembly 208 and the analog controls 210 may be located in the electronic equipment bay 52 (see FIGS. 1, 2A-2B), or in another lower lobe compartment area 26 (see FIG. 1) of the aircraft 12 (see FIGS. 1, 5A-5B).

As shown in FIGS. 3A-3F, the system 10 further comprises the pressure equalization valve 96 installed in a wall 65, such as an aft endwall 66*b*, of the cargo compartment 20, such as a forward cargo compartment 20*a* (see FIG. 3A), and opening into the adjacent compartment 54. The pressure equalization valve 96 has an inlet end 220*a* (see FIG. 3B) in, and facing, the interior 136 of the cargo compartment 20. As shown in FIGS. 3C, 3D, the pressure equalization valve 96 further has an outlet end 220*b* (see FIGS. 3C, 3D) external to the interior 136 of the cargo compartment 20, and located in the interior 120 of the adjacent compartment 54, and in proximity to the smoke vent valve assembly 100.

The pressure equalization valve 96 further has a valve body 222 (see FIG. 3D) formed between the inlet end 220*a* and the outlet end 220*b*. The pressure equalization valve 96 is a pressure relief valve and is a two-way valve that allows airflow 224 (see FIG. 7) in or out of the cargo compartment 20 depending on what the pressure differential is across the boundary 78 (see FIG. 1). As shown in FIG. 3C, the wall 65, such as an aft endwall 66*b*, of the cargo compartment 20, such as a forward cargo compartment 20*a*, has a first side 225*a* facing the interior 136 of the cargo compartment 20, and has a second side 225*b* facing the interior 120 of the adjacent compartment 54.

The system 10, such as the smoke penetration prevention system 10*a*, shown in FIGS. 3A-3H, provides a direct path 33 (see FIGS. 1, 2A-2B, 7), such as a direct smoke path 34*a* (see FIGS. 1, 2A-2B, 7), for the smoke 14 (see FIGS. 1, 2A-2B, 7), caused by a fire event 24 (see FIG. 7) in the cargo compartment 20 (see FIG. 3A), to flow the smoke 14 directly from the cargo compartment 20, through the pressure equalization valve 96 (see FIG. 3A), and through the smoke vent valve assembly 100 (see FIG. 3A) which exhausts the smoke 14 directly overboard the aircraft 12 (see FIGS. 1, 3A, 7), to result in the system 10 evacuating and preventing penetration of the smoke 14 from the cargo compartment 20 to the one or more occupied compartments 22 (see FIGS. 1, 7), such as the cabin 30 (see FIGS. 1, 7) and the flight deck 28 (see FIGS. 1, 7).

Figure 4A:
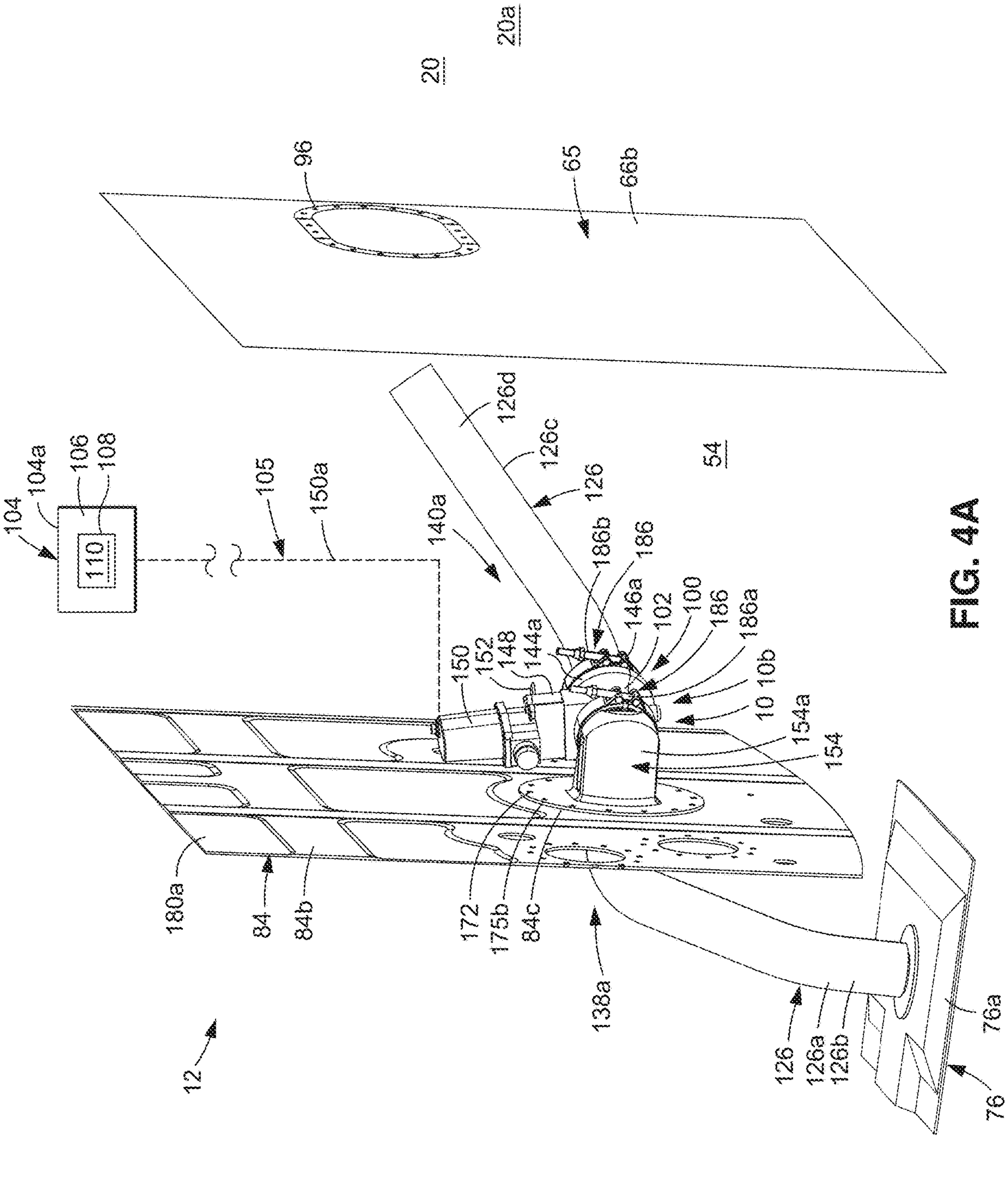
FIG. 4A is an illustration of a right side perspective view of a version of a system of the disclosure, in an aircraft installation configuration, and having another version of a smoke vent valve assembly with two ducts.
Figure 4B:
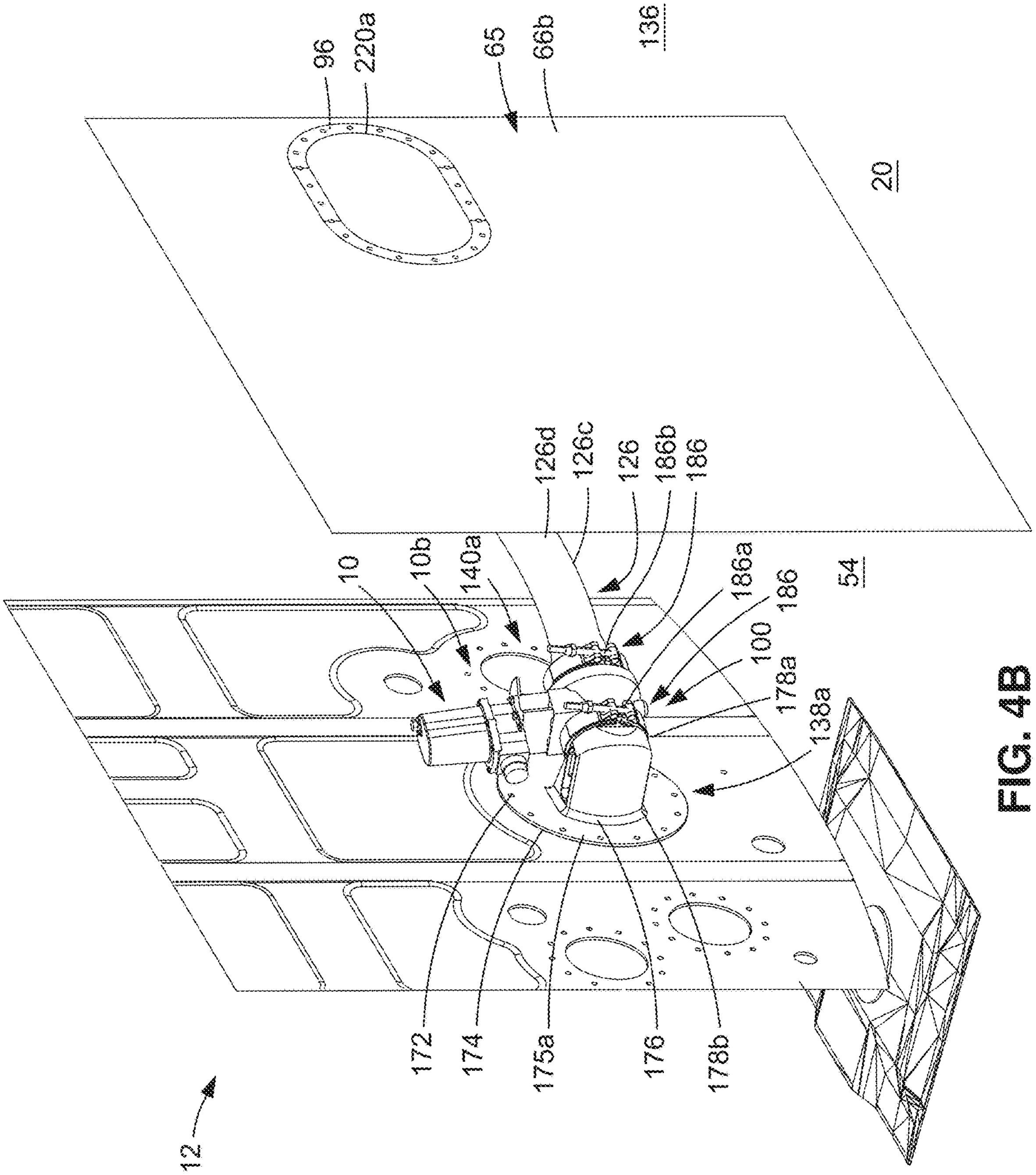
FIG. 4B is an illustration of a front perspective view of the system of FIG. 4A, in the aircraft installation configuration.
Figure 4C:
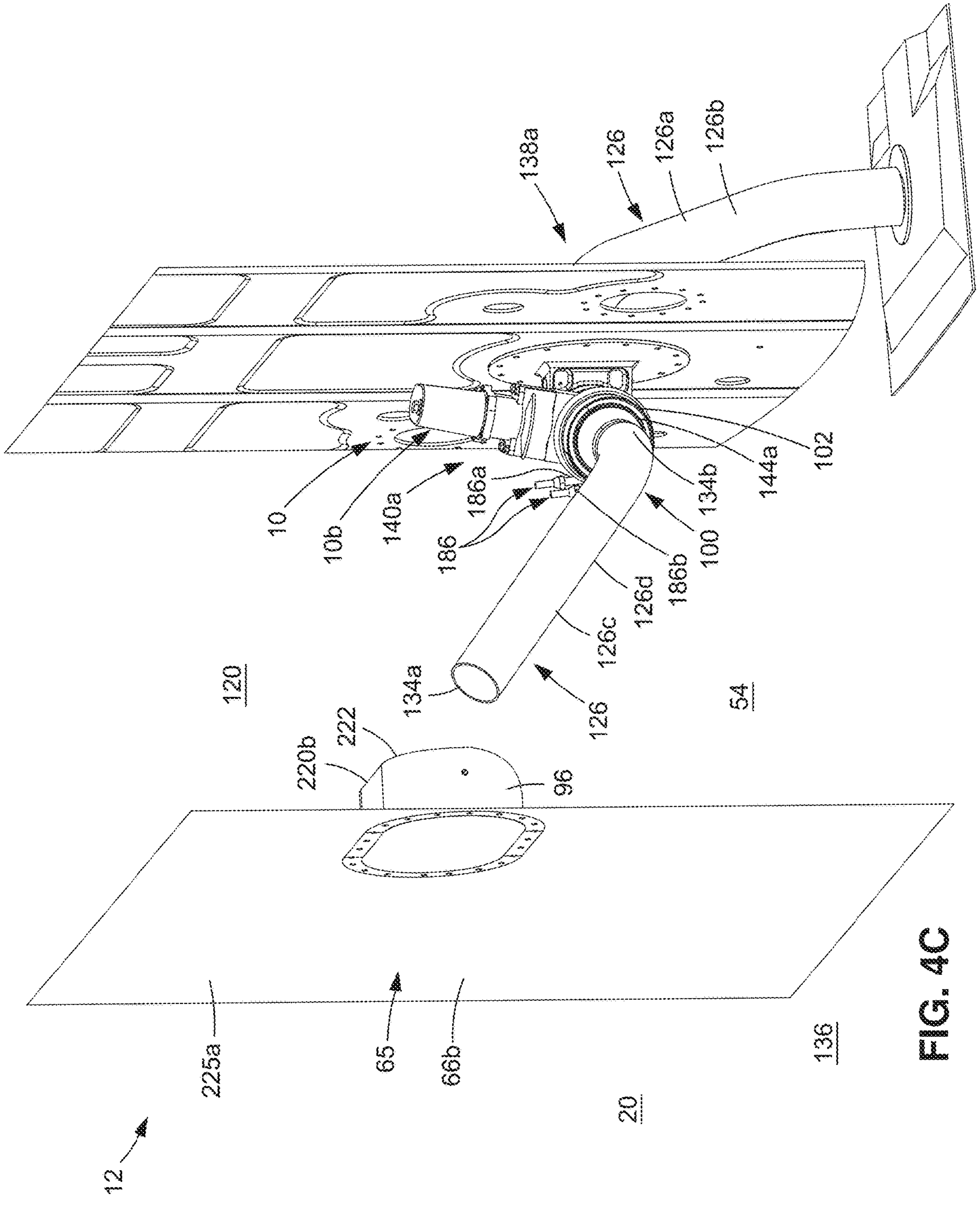
FIG. 4C is an illustration of a left side perspective view of the system of FIG. 4A, in the aircraft installation configuration.
Figure 4D:
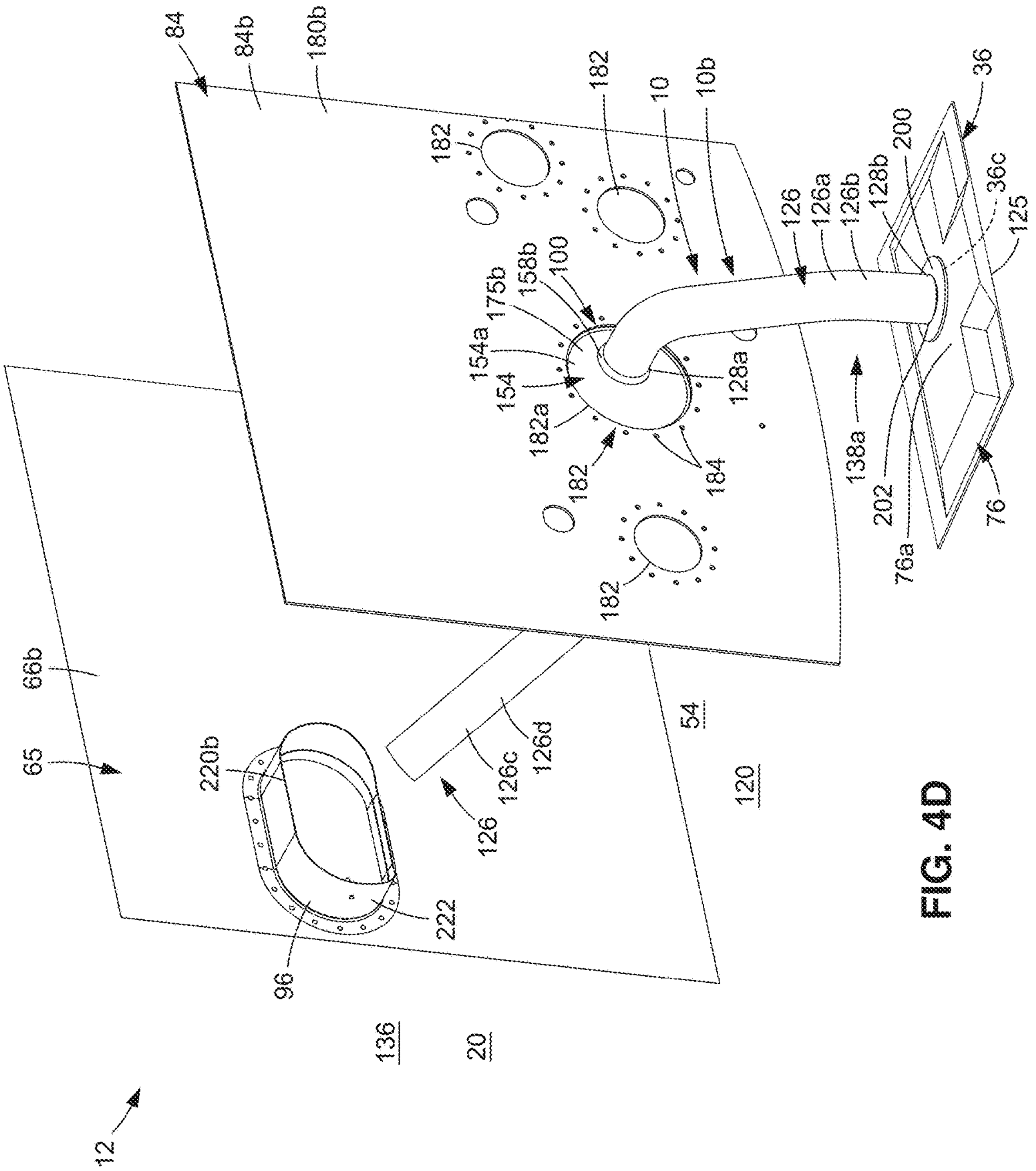
FIG. 4D is an illustration of back perspective view of the system of FIG. 4A, in the aircraft installation configuration.
Figure 4E:
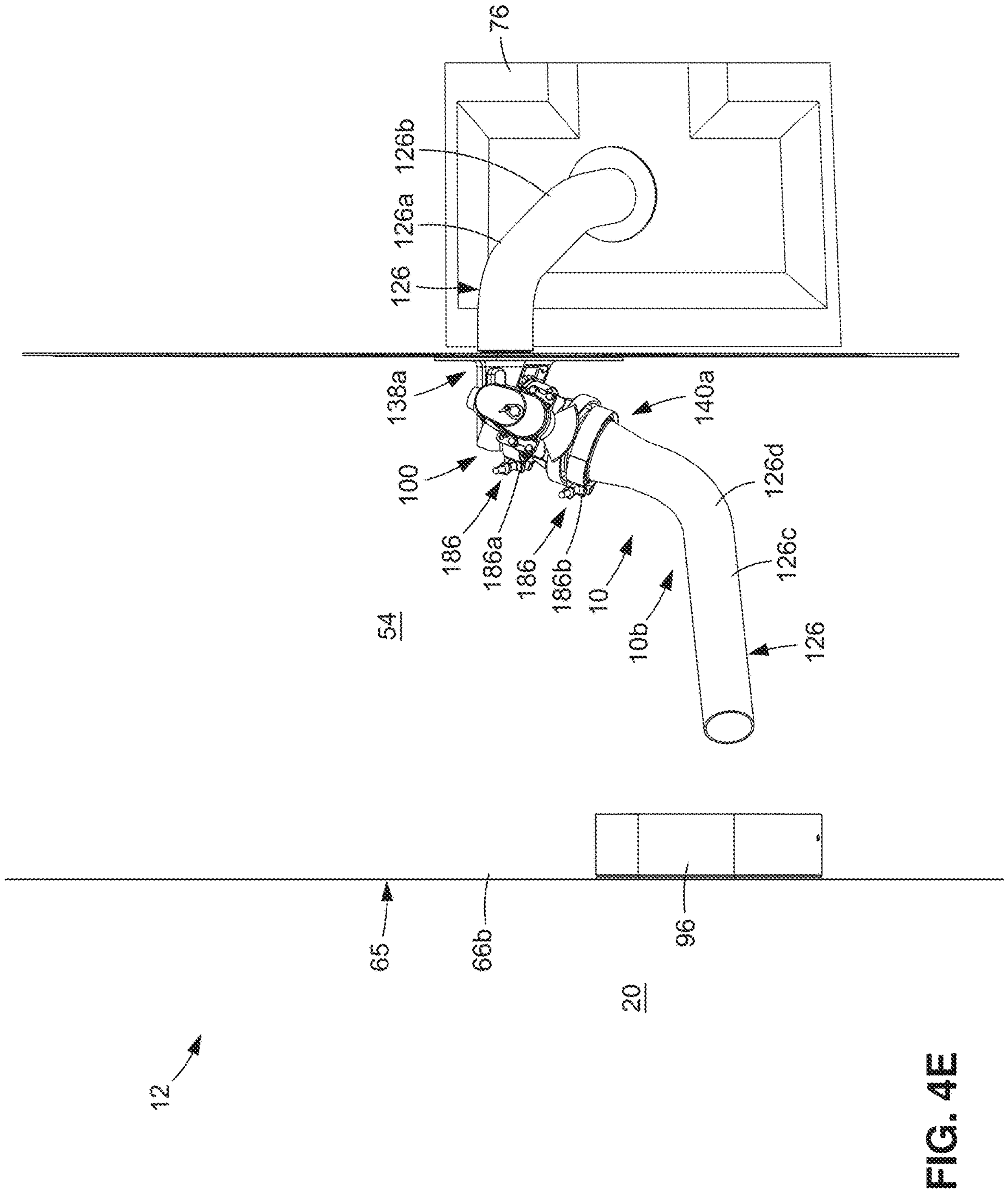
FIG. 4E is an illustration of a top perspective view of the system of FIG. 4A, in the aircraft installation configuration.
Figure 4F:
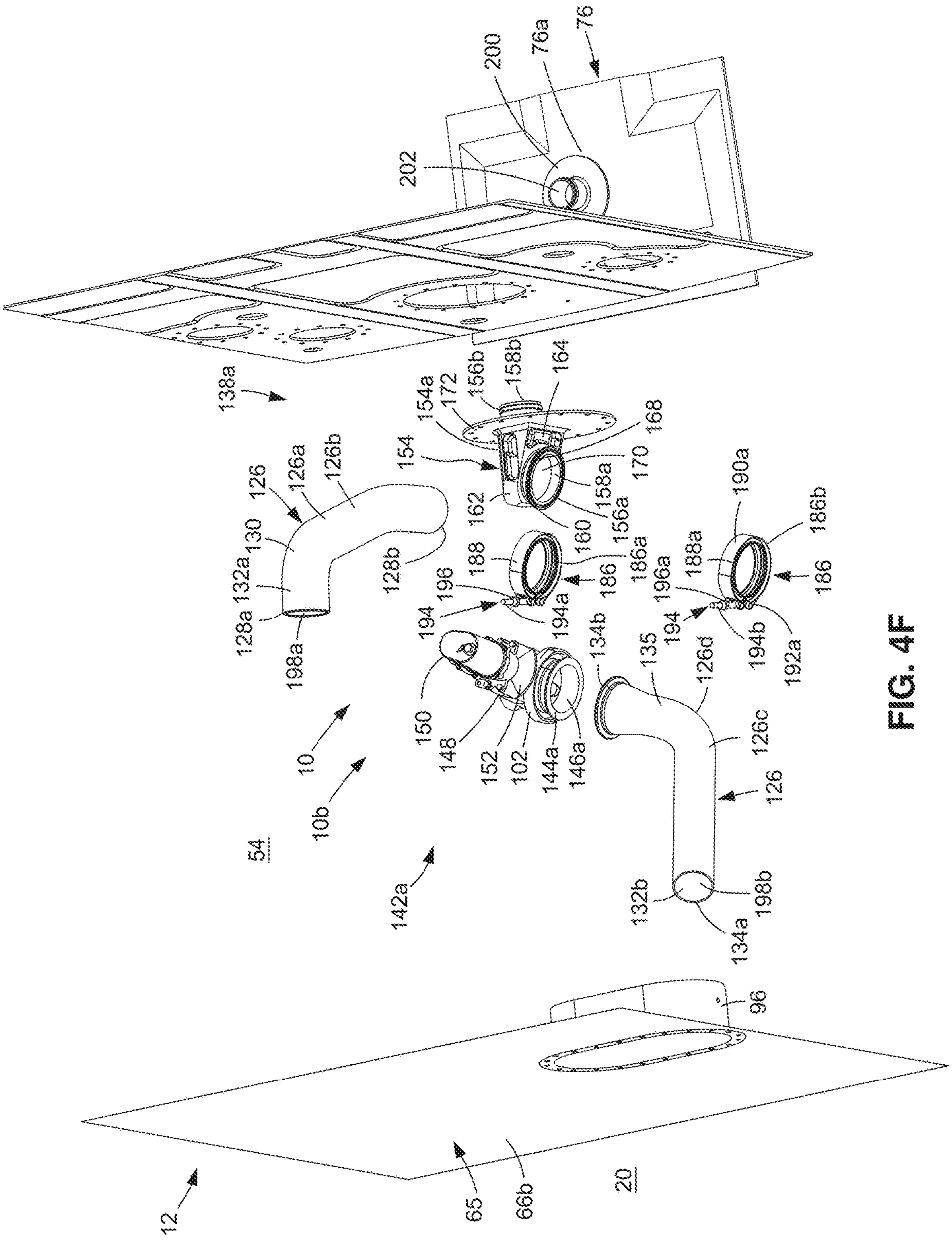
FIG. 4F is an illustration of a top perspective exploded view of the system of FIG. 4A, in an unassembled configuration, in the aircraft installation configuration.

Now referring to FIGS. 4A-4H, FIGS. 4A-4H show various views of a version of the system 10, such as the smoke penetration prevention system 10*b*, in an aircraft installation configuration 138*a*, and having another version of the smoke vent valve assembly 100 with two ducts 126, including the first duct 126*a*, such as the smoke evacuation duct 126*b*, and the second duct 126*c*, such as the smoke intake duct 126*d*. The smoke vent valve 102 shown in FIGS. 3I-3J is the same smoke vent valve 102 of the smoke vent valve assembly 100 of FIGS. 4A-4H. FIGS. 4A-4E and FIG. 4G-4H show the smoke vent valve assembly 100 in an assembled configuration 140*a*. FIG. 4F shows the smoke vent valve assembly 100 in an unassembled configuration 142*a*.

Figure 4G:
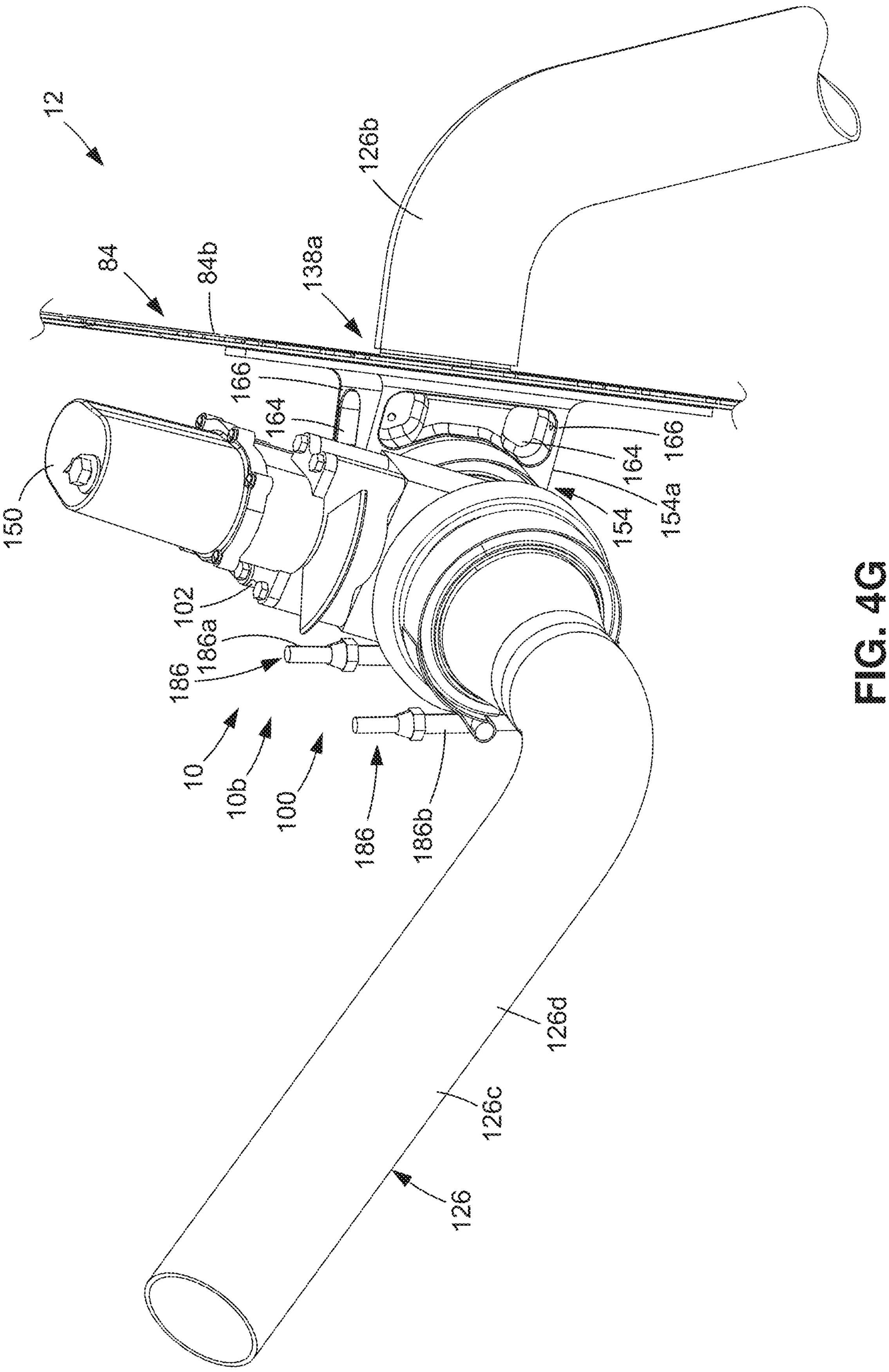
FIG. 4G is an illustration of a left side enlarged perspective view of the system of FIG. 4A, in the aircraft installation configuration.
Figure 4H:
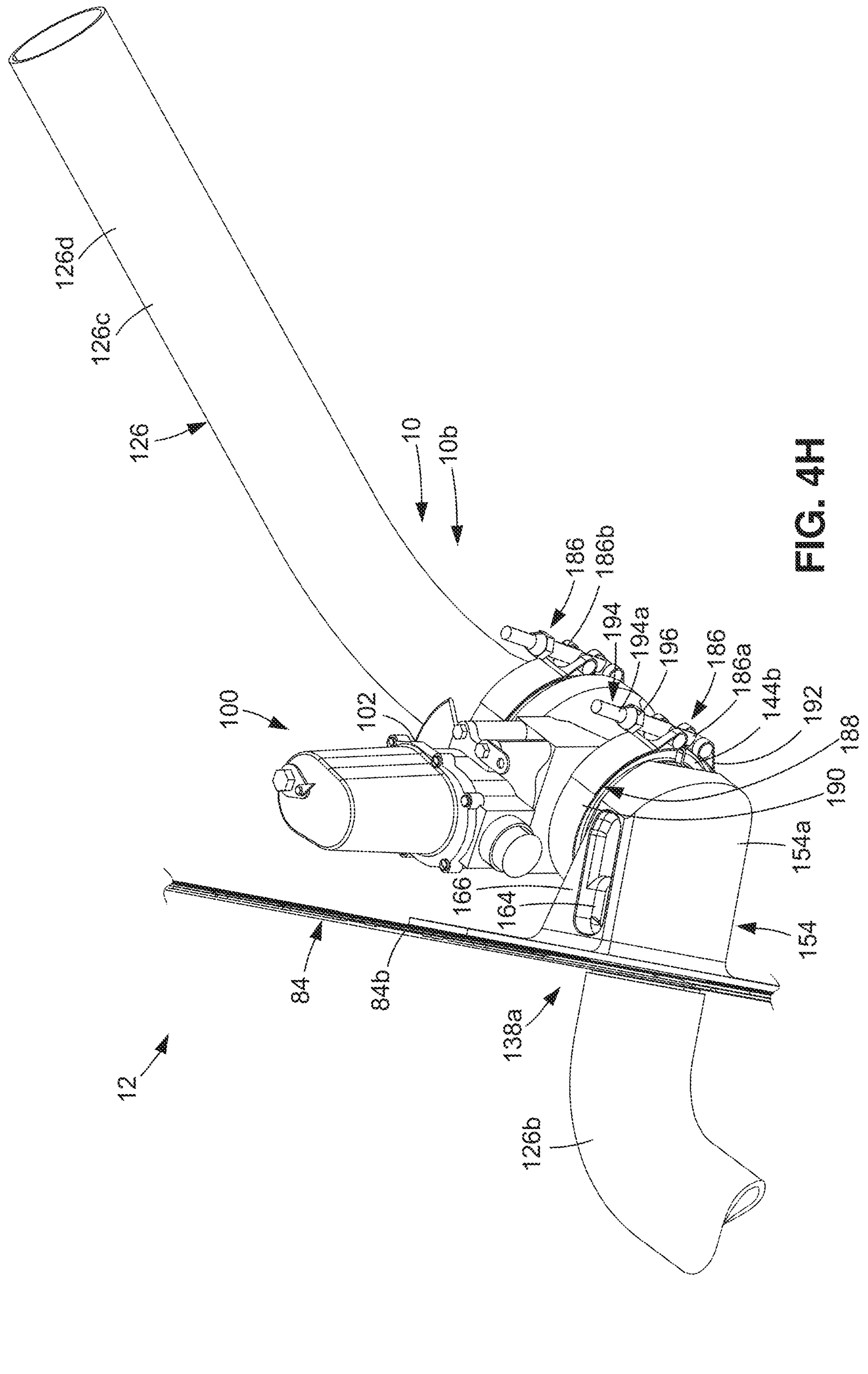
FIG. 4H is an illustration of a right side enlarged perspective view of the system of FIG. 4A, in the aircraft installation configuration.

FIG. 4A is an illustration of a right side perspective view of a version of a system 10, such as the smoke penetration prevention system 10*b*, of the disclosure, in the aircraft installation configuration 138*a*, and having another version of the smoke vent valve assembly 100 with two ducts 126. FIG. 4B is an illustration of a front perspective view of the system 10, such as the smoke penetration prevention system 10*b*, of FIG. 4A, in the aircraft installation configuration 138*a*. FIG. 4C is an illustration of a left side perspective view of the system 10, such as the smoke penetration prevention system 10*b*, of FIG. 4A, in the aircraft installation configuration 138*a*. FIG. 4D is an illustration of back perspective view of the system 10, such as the smoke penetration prevention system 10*b*, of FIG. 4A, in the aircraft installation configuration 138*a*. FIG. 4E is an illustration of a top perspective view of the system 10, such as the smoke penetration prevention system 10*b*, of FIG. 4A, in the aircraft installation configuration 138*a*. FIG. 4F is an illustration of a top perspective exploded view of the system 10, such as the smoke penetration prevention system 10*b*, of FIG. 4A, in the unassembled configuration 142*a*, in the aircraft installation configuration 138*a*. FIG. 4G is an illustration of a left side enlarged perspective view of the system 10, such as the smoke penetration prevention system 10*b*, of FIG. 4A, in the aircraft installation configuration 138*a*. FIG. 4H is an illustration of a right side enlarged perspective view of the system 10, such as the smoke penetration prevention system 10*b*, of FIG. 4A, in the aircraft installation configuration 138*a*.

As shown in FIGS. 4A-4H, the system 10, such as the smoke penetration prevention system 10*b*, in an aircraft installation configuration 138*a*, comprises the smoke vent valve assembly 100 having the smoke vent valve 102. As shown in FIGS. 4A, 4F-4H, the smoke vent valve 102 comprises the smoke vent valve inlet flange 144*a* surrounding the smoke vent valve inlet opening 146*a*, and the smoke vent valve outlet flange 144*b* (see FIG. 3I) surrounding the smoke vent valve outlet opening 146*b*. As shown in FIGS. 4A, 4F-4H, the smoke vent valve 102 further comprises the smoke vent valve housing 148.

As shown in FIGS. 4A, 4F-4H, the smoke vent valve 102 further comprises the torque motor actuator assembly 150, as discussed above with respect to FIGS. 3A, 3F-3I. As shown in FIGS. 4A, 4F-4H, the smoke vent valve 102 further comprises the locking lever 152, such as the manual locking lever 152*a*, or another suitable type of locking lever 152 or locking mechanism, configured to lock the smoke vent valve 102 in the open position 112*b* or in the closed position 114*b*.

As shown in FIGS. 4A, 4F-4H, the smoke vent valve assembly 100 further comprises the mounting assembly 154, such as the mounting pedestal assembly 154*a*, attached to the smoke vent valve 102, and in particular, attached to the smoke vent valve outlet flange 144*b* (see FIG. 3H). As shown in FIG. 4F, the mounting assembly 154, such as the mounting pedestal assembly 154*a*, comprises the inlet flange 156*a* surrounding the inlet opening 158*a*, and the outlet flange 156*b* surrounding the outlet opening 158*b*. As further shown in FIG. 4F, the inlet flange 156*a* has the O-ring seal 160 coupled, or attached, to the inlet flange 156*a*.

As further shown in FIG. 4F, the mounting assembly 154, such as the mounting pedestal assembly 154*a*, comprises the support pedestal portion 162 coupled to, and formed between, the inlet opening 158*a* and the outlet opening 158*b*. As shown in FIGS. 4F-4H, the support pedestal portion 162 has the plurality of pocket features 164 formed in the exterior portions 166 of the support pedestal portion 162, to lighten, or decrease the weight of, the support pedestal portion 162 that is preferably machined.

As further shown in FIG. 4F, the mounting assembly 154, such as the mounting pedestal assembly 154*a*, has the orifice 168 located in the interior 170 of the support pedestal portion 162 between the inlet flange 156*a* and the outlet flange 156*b*. The orifice 168 is an optional feature and is a predetermined size and a defined dimension that may be built into the interior 170 of the support pedestal portion 162 of the mounting assembly 154, such as the mounting pedestal assembly 154*a*.

As further shown in FIG. 4F, the mounting assembly 154, such as the mounting pedestal assembly 154*a*, comprises the mounting flange member 172 attached to the support pedestal portion 162, and in particular, attached between the support pedestal portion 162 and the outlet opening 158*b* of the mounting assembly 154. As shown in FIG. 4B, the mounting flange member 172 has the disc-shaped body 174 with the first side 175*a*, the second side 175*b* (see FIG. 4D), and the central through opening 176 formed through the disc-shaped body 174.

As shown in FIG. 4B, the support pedestal portion 162 has the first end 178*a* attached to, or integral with, the inlet flange 156*a* (see FIG. 4F), and has the second end 178*b* attached to, or integral with the first side 175*a* of the mounting flange member 172 and covering the central through opening 176 on the first side 175*a*. As shown in FIG. 4A, the second side 175*b* of the mounting flange member 172 is mounted on, and attached to, the portion 84*c* of the endwall 84, such as the second endwall 84*b*, of the adjacent compartment 54 volume adjacent to the cargo compartment 20 volume. The endwall 84 (see FIGS. 4A, 4D), such as the second endwall 84*b* (see FIGS. 4A, 4D), has the first side 180*a* (see FIG. 4A) and the second side 180*b* (see FIG. 4D), and the plurality of cutout openings 182 (see FIG. 4D). As shown in FIG. 4D, the second side 175*b* of the mounting flange member 172 is attached with attachment elements 184, such as screws, bolts, or other suitable attachment elements, over a cutout opening 182*a* formed through the second endwall 84*b*.

As shown in FIGS. 4A-4C, 4E-4H, the smoke vent valve assembly 100 further comprises the coupling assembly 186, such as the first coupling assembly 186*a*, for example, the smoke vent valve coupling assembly. The first coupling assembly 186*a* is attached to, and couples together, the smoke vent valve outlet flange 144*b* (see FIGS. 4H, 3I) of the smoke vent valve 102 (see FIGS. 4F, 4H), and the inlet flange 156*a* (see FIG. 4F) of the mounting assembly 154 (see FIGS. 4F, 4H), such as the mounting pedestal assembly 154*a* (see FIGS. 4F, 4H). In one version, the first coupling assembly 186*a* couples the smoke vent valve 102 and the mounting assembly 154 together. As shown in FIG. 4H, the coupling assembly 186, such as the first coupling assembly 186*a*, comprises the T-bolt duct clamp 188 (see also FIG. 4F) comprising the metal band 190 or loop having the V-shaped profile 192, the bolt 194 (see also FIG. 4F), such as the T-shaped bolt 194*a* (see also FIG. 4F), attached to the metal band 190, and the locking nut 196 (see also FIG. 4F) coupled to the T-shaped bolt 194*a*. As shown in FIGS. 4A-4C, 4E-4H, the smoke vent valve assembly 100 further comprises another coupling assembly 186, such as a second coupling assembly 186*b*, for example, a smoke intake duct coupling assembly. The second coupling assembly 186*b* is attached to, and couples together, a second duct outlet end 134*b* (see FIG. 4F) of the smoke intake duct 126*d* (see FIG. 4F), and the smoke vent valve inlet flange 144*a* (see FIG. 4F) of the smoke vent valve 102 (see FIG. 4F). In one version, the second coupling assembly 186*b* couples the smoke vent valve 102 and the smoke intake duct 126*d* together. As shown in FIG. 4F, the coupling assembly 186, such as the second coupling assembly 186*b*, comprises a T-bolt duct clamp 188*a* comprising a metal band 190*a* or loop having a V-shaped profile 192*a*, a bolt 194, such as a T-shaped bolt 194*b*, attached to the metal band 190*a*, and a locking nut 196*a* coupled to the T-shaped bolt 194*b*.

As shown in FIGS. 4A, 4D, 4F, the smoke vent valve assembly 100 further comprises the first duct 126*a*, such as the smoke evacuation duct 126*b*, coupled to the smoke vent valve 102, via the mounting assembly 154 (see FIGS. 4A, 4F), such as the mounting pedestal assembly 154*a* (see FIGS. 4A, 4F). As shown in FIG. 4F, the first duct 126*a*, such as the smoke evacuation duct 126*b* comprises the first duct inlet end 128*a*, the first duct outlet end 128*b*, and the first duct body 130 formed between the first duct inlet end 128*a* and the first duct outlet end 128*b*, where the first duct body 130 has the hollow tubular configuration 132*a* with the hollow interior 198*a*.

As shown in FIG. 4D, the first duct inlet end 128*a* of the first duct 126*a*, such as the smoke evacuation duct 126*b*, is attached to the outlet opening 158*b* of the mounting assembly 154, such as the mounting pedestal assembly 154*a*. The hollow interior 198*a* of the first duct 126*a*, such as the smoke evacuation duct 126*b* is in fluid communication with, and inline with, the interior 170 of the support pedestal portion 162 of the mounting pedestal assembly 154*a*.

As further shown in FIG. 4D, the first duct outlet end 128*b* of the first duct 126*a*, such as the smoke evacuation duct 126*b*, is attached to the exhaust port 200 (see also FIG. 4F) having the exhaust opening 202 (see FIG. 4F). As shown in FIGS. 4D, 4F, the exhaust port 200 is coupled, or attached, to the portion 76*a* of the fuselage skin 76 of the fuselage 36 (see FIG. 1), and the exhaust port 200 is in fluid communication with, and inline with, the exhaust opening 202 formed through the fuselage skin 76, at and through the exterior lower portion 36*c* (see FIGS. 2B, 4D, 5B) of the fuselage 36 (see FIGS. 2B, 4D, 5B), and at and through the exterior portion 125 (see FIGS. 2B, 4D, 5B) of the aircraft 12 (see FIGS. 1, 2B, 4D, 5B). The first duct outlet end 128*b* of the first duct 126*a* is coupled to the portion 76*a* of the fuselage skin 76 and terminates at the exhaust opening 202 formed through the fuselage skin 76, at and through the exterior lower portion 36*c* (see FIGS. 2B, 4D, 5B) of the fuselage 36 (see FIG. 4D), and at and through the exterior portion 125 (see FIGS. 1, 2B, 4D, 5B) of the aircraft 12 (see FIGS. 1, 2B, 4D, 5B), and the exhaust opening 202 is open to ambient atmosphere 124 (see FIG. 1) outside the aircraft 12.

In this version of the system 10, such as the smoke penetration prevention system 10*b*, as shown in FIGS. 4A-4H, the smoke vent valve assembly 100 further comprises a second duct 126*c* comprising a smoke intake duct 126*d*. As shown in FIG. 4F, the second duct 126*c*, such as the smoke intake duct 126*d*, comprises the second duct inlet end 134*a*, the second duct outlet end 134*b*, and the second duct body 135 formed between the second duct inlet end 134*a* and the second duct outlet end 134*b*, where the second duct body 135 has the hollow tubular configuration 132*b* with the hollow interior 198*b*.

As shown in FIG. 4C, the second duct inlet end 134*a* of the second duct 126*c*, such as the smoke intake duct 126*d*, is in proximity to, or near to, the outlet end 220*b* of the pressure equalization valve 96, and is open to the interior 120 of the adjacent compartment 54 adjacent to the cargo compartment 20. In this version, the second duct inlet end 134*a* is free and not attached to the outlet end 220*b* of the pressure equalization valve 96.

As further shown in FIG. 4C, the second duct outlet end 134*b* of the second duct 126*c*, such as the smoke intake duct 126*d*, is attached to, or coupled to, the smoke vent valve inlet flange 144*a* of the smoke vent valve 102, via the coupling assembly 186, such as the second coupling assembly 186*b*, for example, the smoke intake duct coupling assembly. The hollow interior 198*b* (see FIGS. 4C, 4F) of the second duct 126*c* (see FIGS. 4C, 4F), such as the smoke intake duct 126*d* (see FIGS. 4C, 4F), is in fluid communication with, and inline with, an interior 226 (see FIG. 4F) of the smoke vent valve 102 (see FIG. 4F).

As shown in FIG. 4A, the system 10 further comprises the valve control system 104 coupled to the smoke vent valve 102, via the connection 105, such as the wireless connection 105*a*, to control opening 112 (see FIG. 7) and closing 114 (see FIG. 7) of the smoke vent valve 102. For clarity purposes, the valve control system 104 for the system 10 shown in FIGS. 4A-4H is only shown in FIG. 4A, but the valve control system 104 shown in FIG. 4A is also part of the system 10 shown in FIGS. 4B-4H. In one version of the system 10, as shown in FIG. 4A, the valve control system 104 comprises the automated valve control system 104*a*. In another version, the valve control system 104 may comprise the manual valve control system 104*b* (see FIG. 7).

As shown in FIG. 4A, the automated valve control system 104*a* comprises the controller 106 with the software program 108 having the control logic 110, such as the advanced control logic 110*b* (see FIG. 7). The controller 106 may be part of a computer 204 (see FIG. 7), and the software program 108 may be executed on the computer 204. In one version, the advanced control logic 110*b* of the software program 108 comprises the simple control logic 110*a* (see FIG. 7), the first added control logic 110*c* (see FIG. 7), and the second added control logic 110*d* (see FIG. 7). As discussed above, the simple control logic 110*a* is configured to cause the smoke vent valve 102 to automatically open based on one or more signals 109 (see FIG. 7) triggered by a fire event 24 (see FIG. 7) in the cargo compartment 20 (see FIG. 4A), such as the forward cargo compartment 20*a* (see FIG. 4A). The first added control logic 110*c* minimizes the risk of a cabin fly through event 118 (see FIG. 7). The first added control logic 110*c* is configured to cause the smoke vent valve 102 to automatically close, when the aircraft descent rate 205 (see FIG. 7) of the aircraft 12 is detected that is greater than, or faster than, the predetermined aircraft descent rate 205*a* (see FIG. 7) for the predetermined time duration 203 (see FIG. 7), i.e., the aircraft descent rate 205 is greater than, or faster than, "x" feet per minute for "x" seconds, of the aircraft 12. The second added control logic 110*d* is configured to cause the smoke vent valve 102 to automatically reopen, when the aircraft descent rate 205 of the aircraft 12 is detected that is less than, or slower than, the predetermined aircraft descent rate 205*a* for the predetermined time duration 203, i.e., the aircraft descent rate 205 is less than, or slower than, "x" feet per minute for "x" seconds, of the aircraft 12.

The first added control logic 110*c* may also use the parameters of the landing altitude (LA) 206 (see FIG. 7) and the cabin altitude 207 (see FIG. 7), in addition to the aircraft descent rate 205. For example, in one version, the first added control logic 110*c* is configured to cause the smoke vent valve 102 to automatically close, when the aircraft descent rate 205 of the aircraft 12 is detected that is greater than, or faster than, the predetermined aircraft descent rate 205*a* for the predetermined time duration 203, and when a cabin altitude 207 (see FIG. 7) of the aircraft 12 is detected that is greater than or equal to a landing altitude 206 (see FIG. 7), such as a selected landing altitude. The second added control logic 110*d* may also use the parameter the aircraft descent rate 205. For example, in one version, the second added control logic 110*d* is configured to cause the smoke vent valve 102 to automatically reopen, when the aircraft descent rate 205 of the aircraft 12 is detected that is less than, or slower than, the predetermined aircraft descent rate 205*a* for the predetermined time duration 203.

Alternatively, in another version of the automated valve control system 104*a*, the smoke vent valve 102 is automated to automatically open or to automatically close using the hardware assembly 208 (see FIG. 7) and the analog controls 210 (see FIG. 7).

As shown in FIGS. 4A-4F, the system 10 further comprises the pressure equalization valve 96 installed in the wall 65, such as the aft endwall 66*b*, of the cargo compartment 20, such as the forward cargo compartment 20*a* (see FIG. 4A) and opening into the adjacent compartment 54. The pressure equalization valve 96 has the inlet end 220*a* (see FIG. 4B) in, and facing, the interior 136 of the cargo compartment 20. As shown in FIGS. 4C, 4D, the pressure equalization valve 96 further has the outlet end 220*b* external to the interior 136 of the cargo compartment 20, and located in the interior 120 (see FIG. 4D) of the adjacent compartment 54, and in proximity to the smoke vent valve assembly 100.

The pressure equalization valve 96 further has a valve body 222 (see FIG. 4D) formed between the inlet end 220*a* and the outlet end 220*b*. The pressure equalization valve 96 is a pressure relief valve and is a two-way valve that allows airflow 224 (see FIG. 7) in or out of the cargo compartment 20 depending on what the pressure differential is across the boundary 78 (see FIG. 1). As shown in FIG. 4C, the wall 65, such as the aft endwall 66*b*, of the cargo compartment 20 has the first side 225*a* facing the interior 136 of the cargo compartment 20, and has the second side 225*b* facing the interior 120 of the adjacent compartment 54.

The system 10, such as the smoke penetration prevention system 10*b*, shown in FIGS. 4A-4H, provides a direct path 33 (see FIGS. 1, 2A-2B, 7), such as a direct smoke path 34*a* (see FIGS. 1, 2A-2B, 7), for the smoke 14 (see FIGS. 1, 2A-2B, 7), caused by a fire event 24 (see FIG. 7) in the cargo compartment 20 (see FIG. 4A), to flow the smoke 14 directly from the cargo compartment 20, through the pressure equalization valve 96 (see FIG. 4A), and through the smoke vent valve assembly 100 (see FIG. 4A) which exhausts the smoke 14 directly overboard the aircraft 12 (see FIGS. 1, 4A, 7), to result in the system 10 evacuating and preventing penetration of the smoke 14 from the cargo compartment 20 to the one or more occupied compartments 22 (see FIGS. 1, 7), such as the cabin 30 (see FIGS. 1, 7) and the flight deck 28 (see FIGS. 1, 7).

Now referring to FIGS. 5A-5B, FIG. 5A is an illustration of a right side perspective view of a version of the system 10, such as the smoke penetration prevention system 10*a*, of FIG. 3A, installed in an aircraft 12 in an aircraft installation configuration 138, and having a version of a smoke vent valve assembly 100 with a duct 126, such as one duct 126, in the form of the first duct 126*a*, for example, the smoke evacuation duct 126*b*. FIG. 5B is an illustration of a right side perspective view of a version of the system 10, such as the smoke penetration prevention system 10*b*, of FIG. 4A, installed in an aircraft 12 in an aircraft installation configuration 138*a*, and having another version of a smoke vent valve assembly 100 with two ducts 126, including the first duct 126*a*, such as the smoke evacuation duct 126*b*, and the second duct 126*c*, such as the smoke intake duct 126*d*.

FIGS. 5A-5B show the system 10 comprising the smoke vent valve assembly 100 and the valve control system 104 coupled to the smoke vent valve assembly 100. FIGS. 5A-5B further show the smoke vent valve assembly 100 comprising the smoke vent valve 102, the mounting assembly 154 attached to the smoke vent valve 102, the coupling assembly 186, such as the first coupling assembly 186*a*, attached to, and coupling together, the smoke vent valve 102 and the mounting assembly 154, and the first duct 126*a*, such as the smoke evacuation duct 126*b*, attached to the mounting assembly 154. As further shown in FIGS. 5A-5B, in one version, the first duct inlet end 128*a* of the first duct 126*a* is attached to the mounting assembly 154, and the first duct outlet end 128*b* of the first duct 126*a* is attached to a portion 76*a* of the fuselage skin 76 and terminates at the exhaust opening 202 (see FIGS. 3F, 4F) through the exterior portion 125 (see FIGS. 5A-5B) of the aircraft 12, and is open to ambient atmosphere 124 outside the aircraft 12. As further shown in FIGS. 5A-5B, in one version, the smoke vent valve assembly 100, and in particular, the mounting assembly 154 and the first duct 126*a*, is installed in the second endwall 84*b* of the adjacent compartment 54, such as the air conditioning mix bay 56, adjacent the cargo compartment 20, such as the forward cargo compartment 20*a*. In other versions, the smoke vent valve assembly 100, and in particular, the mounting assembly 154 and the first duct 126*a*, is installed in the other locations of the adjacent compartment 54 adjacent the cargo compartment 20, such as the forward cargo compartment 20*a*, or in other locations in the lower lobe compartment area 26 (see FIG. 1).

As further shown in FIGS. 5A-5B, the adjacent compartment 54 has the first endwall 84*a* adjacent to, and/or coextensive with, the aft endwall 66*b* of the forward cargo compartment 20*a*, the second endwall 84*b*, sidewalls 85, the ceiling 86, and the floor 88 near the fuselage skin 76 of the aircraft 12.

As shown in FIG. 5B, in another version, the smoke vent valve assembly 100 includes both ducts 126, such as the first duct 126*a*, for example, the smoke evacuation duct 126*b*, and such as the second duct 126*c*, for example, the smoke intake duct 126*d*. As shown in FIG. 5B, the second duct 126*c*, such as the smoke intake duct 126*d*, has the second duct inlet end 134*a*, the second duct outlet end 134*b*, and the second duct body 135 formed between the second duct inlet end 134*a* and the second duct outlet end 134*b*. As further shown in FIG. 5B, the smoke vent valve assembly 100 comprises both coupling assemblies 186, such as the first coupling assembly 186*a*, for example, the smoke vent valve coupling assembly, and the second coupling assembly 186*b*, for example, the smoke intake duct coupling assembly. The second coupling assembly 186*b* is attached to, and couples together, the smoke intake duct 126*d* (see FIG. 5B) and the smoke vent valve 102 (see FIG. 5B). The additional second duct 126*c* is preferably installed with the second duct outlet end 134*b* coupled to the smoke vent valve 102, and the second duct inlet end 134*a* positioned in proximity to, or adjacent to, the pressure equalization valve 96 (see FIG. 5B).

FIGS. 5A-5B further show the valve control system 104 coupled to the smoke vent valve 102 of the smoke vent valve assembly 100, in one version, via the connection 105, such as the wired connection 105*b*. In another version, the smoke vent valve 102 may be coupled to the valve control system 104 via a wireless connection 105*a* (see FIG. 7).

FIGS. 5A-5B show the valve control system 104 comprising the automated valve control system 104*a* having the hardware assembly 208 and analog controls 210. In this version of the automated valve control system 104*a*, the smoke vent valve 102 is automated to automatically open or to automatically close, as shown in FIG. 7, using the hardware assembly 208, such as relays 212, wiring 214, switches 215, discrete signals 216, and other suitable hardware that receive signals, for example, via discrete signal wiring relays, upon activation of one or more sensors in the cargo compartment 20 when there is a fire event 24 in the cargo compartment 20. The hardware assembly 208 and the analog controls 210 may be located in the electronic equipment bay 52 (see FIGS. 1, 2A-2B), or in another lower lobe compartment area 26 (see FIG. 1) of the aircraft 12 (see FIGS. 1, 5A-5B).

Alternatively, in another version of the automated valve control system 104*a*, the smoke vent valve 102 is automated to open or to close using the controller 106 (see FIGS. 2A-2B) and the software program 108 (see FIGS. 2A-2B) with the control logic 110 (see FIGS. 2A-2B), such as simple control logic 110*a* (see FIG. 7) or advanced control logic 110*b* (see FIG. 7). The controller 106 and the software program 108 with the control logic 110 may be located in the electronic equipment bay 52 (see FIGS. 1, 2A-2B), or in another lower lobe compartment area 26 (see FIG. 1) of the aircraft 12 (see FIGS. 1, 5A-5B).

FIGS. 5A-5B further show the cargo compartment 20, such as the forward cargo compartment 20*a*. As further shown in FIGS. 5A-5B, the forward cargo compartment 20*a* has the plurality of walls 65, such as the forward endwall 66*a* (see FIGS. 2A-2B), the aft endwall 66*b*, and the sidewalls 68, and has the ceiling panel 70 and the floor panel 72. As further shown in FIGS. 5A-5B, the forward cargo compartment 20*a* has the boundary 78 that is lined with the lining system 80 of cargo compartment liners, tape, and/or other types of seals to seal up the boundary 78.

FIGS. 5A-5B further show, in one version, the pressure equalization valve 96 coupled to, and installed in, the aft endwall 66*b* of the forward cargo compartment 20*a* and through the lining system 80 of the cargo compartment 20, such as the forward cargo compartment 20*a*. In other versions, the pressure equalization valve 96 may be coupled to, and installed in, other locations in the cargo compartment 20. FIGS. 5A-5B show the inlet end 220*a*, the outlet end 220*b*, and the valve body 222 of the pressure equalization valve 96. The outlet end 220*b* is in proximity to, or near to, the smoke vent valve assembly 100, such that when an excess pressure builds up inside the cargo compartment 20, such as the forward cargo compartment 20*a*, the pressure equalization valve 96 opens to the open position 112*a* (see FIG. 7) and creates the intentional leakage path 98 (see FIGS. 2A-2B, 7) through the lining system 80 (see FIGS. 5A-5B) of the cargo compartment 20. In this way, the majority of smoke 14 (see FIGS. 2A-2B, 7) that penetrates the lining system 80 of the cargo compartment 20, such as the forward cargo compartment 20*a*, is directed through the pressure equalization valve 96 and deposited directly next to, or near to, the smoke vent valve assembly 100, and the flow of the smoke 14 (see FIGS. 2A-2B) through the smoke vent valve assembly 100 draws the smoke 14 outside the aircraft 12.

Figure 6:
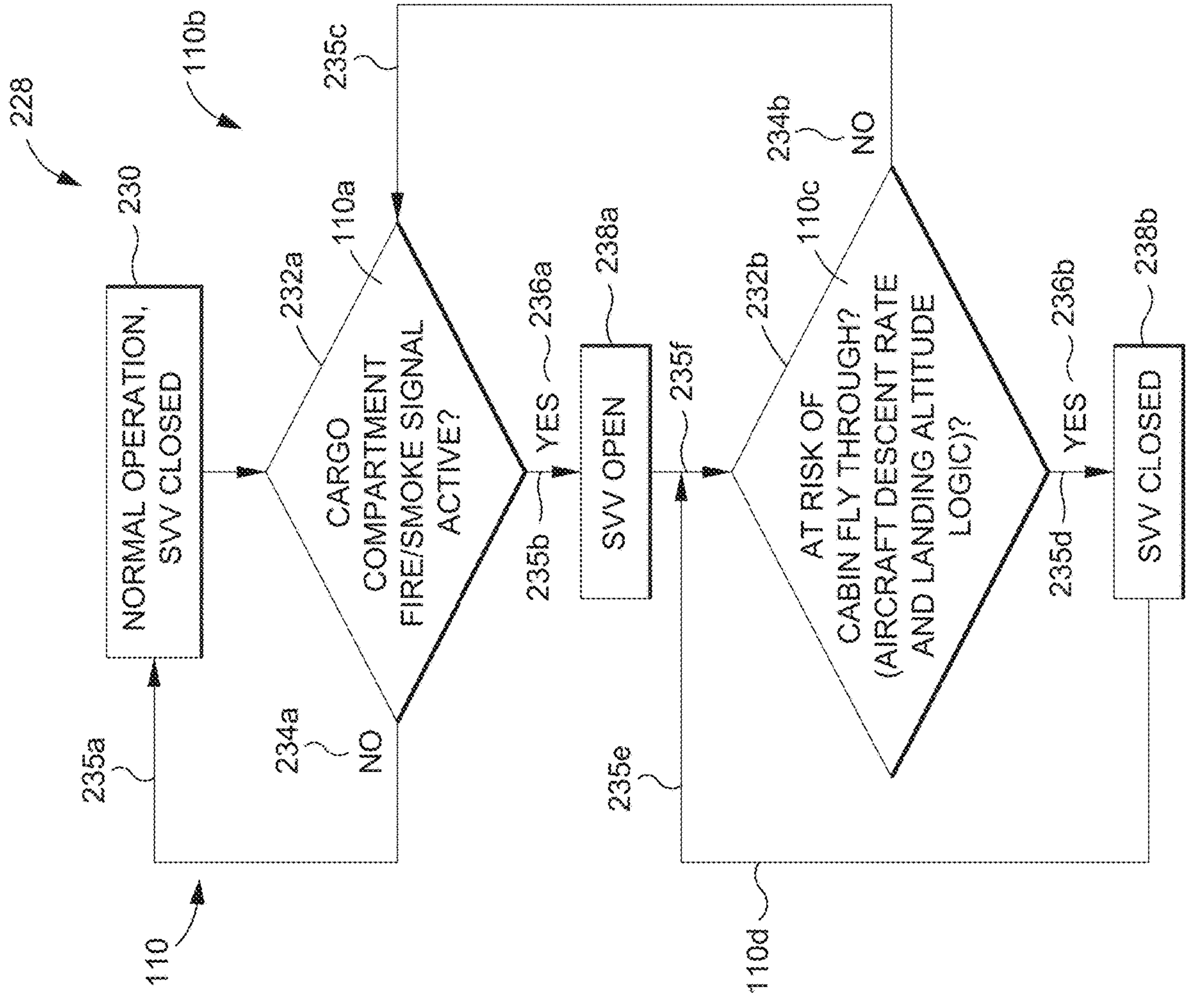
FIG. 6 is an illustration of a control logic flowchart of a control logic and operation of a version of a smoke vent valve of a system of the disclosure.

Now referring to FIG. 6, FIG. 6 is an illustration of a control logic flowchart 228 of a control logic 110, such as an advanced control logic 110*b* that includes a simple control logic 110*a*, the first added control logic 110*c*, and the second added control logic 110*d*, and operation of a version of a smoke vent valve 102 of the disclosure. As shown in FIG. 6, the control logic flowchart 228 shows a starting box 230 labeled NORMAL OPERATION, SVV CLOSED. This means that under normal operation of the aircraft 12 (see FIG. 1), for example, in a cruise or flight condition, the smoke vent valve (SVV) 102 is closed in a closed position 114*b* (see FIG. 7), to minimize airplane leakage and avoid disrupting the normal airflow balance in the occupied compartment 22, such as the cabin 30 and the flight deck 28.

As further shown in FIG. 6, the control logic flowchart 228 next shows a decision box 232*a* labeled with a question CARGO COMPARTMENT FIRE/SMOKE SIGNAL ACTIVE? This decision box 232*a* indicates the simple control logic 110*a* portion of the advanced control logic 110*b*. The question in the decision box 232*a* asks whether there is a cargo compartment (CC) fire 24*a* (see FIG. 7) in the cargo compartment 20 (see FIGS. 1, 7) and/or whether there is a smoke signal 109*a* (see FIG. 7) active or activated based on the cargo compartment fire 24*a*.

As further shown in FIG. 6, if the answer to the decision box 232*a* is a NO answer 234*a*, then an arrow 235*a* leads back to the starting box 230 labeled NORMAL OPERATION, SVV CLOSED. As further shown in FIG. 6, if the answer to the decision box 232*a* is a YES answer 236*a*, then an arrow 235*b* leads to an action step box 238*a* labeled SVV OPEN. This means that if there is a cargo compartment fire 24*a* (see FIG. 7) and/or if there is a smoke signal 109*a* (see FIG. 7) that is active or activated based on the cargo compartment fire 24*a*, the smoke vent valve (SVV) 102 is automatically opened. The simple control logic 110*a* is configured to cause the smoke vent valve 102 to automatically open based on one or more signals 109 (see FIG. 7), such as one or more smoke signals 109*a* triggered by the fire event 24 (see FIG. 7), such as the cargo compartment fire 24*a*, in the cargo compartment 20.

In the event of a fire event 24, such as a cargo compartment fire 24*a* (see FIG. 7), for example, an inflight cargo compartment fire 24*b* (see FIG. 7), the smoke vent valve 102 is opened in order to prevent smoke penetration. In its simplest form, the smoke vent valve 102 can automatically open based on a signal 109 (see FIG. 7), such as a smoke signal 109*a* (see FIG. 7), a cargo compartment fire signal 109*b* (see FIG. 7), or another fire signal, and the smoke vent valve 102 remains open in the open position 112*b* (see FIG. 7) until the aircraft 12 lands and the signal 109, such as the smoke signal 109*a*, the cargo compartment fire signal 109*b*, or another fire signal is reset.

As further shown in FIG. 6, the control logic flowchart 228 shows a decision box 232*b* labeled with a question AT RISK OF CABIN FLY THROUGH (AIRCRAFT DESCENT RATE AND LANDING ALTITUDE LOGIC)? This decision box 232*b* indicates the first added control logic 110*c* portion of the advanced control logic 110*b*. The question in the decision box 232*b* asks whether there is a risk of cabin fly through, such as a cabin fly through event 118 (see FIG. 7). The first added control logic 110*c* uses measurements and/or calculations of the aircraft descent rate 205 (see FIG. 7) compared to the predetermined aircraft descent rate 205*a* (see FIG. 7), or known aircraft descent rate, to determine if the smoke vent valve 102 should be closed. The first added control logic 110*c* may also use measurements and/or calculations of a cabin altitude 207 (see FIG. 7), for example, a cabin pressure, compared to a landing altitude 206, such as a selected landing altitude of the aircraft 12 (see FIG. 1), to determine if the smoke vent valve 102 should be closed.

As further shown in FIG. 6, if the answer to the decision box 232*b* is a NO answer 234*b*, then an arrow 235*c* leads back to the decision box 232*a* labeled with the question CARGO COMPARTMENT FIRE/SMOKE SIGNAL ACTIVE? As further shown in FIG. 6, if the answer to the decision box 232*b* is a YES answer 236*b*, then an arrow 235*d* leads to an action step box 238*b* labeled SVV CLOSED. This means that if the first added control logic 110*c* of the advanced control logic 110*b* determines that there is a risk of a cabin fly through event 118 (see FIG. 7) based on the aircraft descent rate 205 (see FIG. 7) compared to the predetermined aircraft descent rate 205*a* (see FIG. 7), and based on the cabin altitude 107 (see FIG. 7) compared to the landing altitude 206 (see FIG. 7), such as a selected landing altitude, the smoke vent valve (SVV) 102 is automatically closed. In one version, the first added control logic 110*c* is configured to cause the smoke vent valve 102 to automatically close, when the aircraft descent rate 205 of the aircraft 12 is detected that is greater than, or faster than, the predetermined aircraft descent rate 205*a* (see FIG. 7) for the predetermined time duration 203 (see FIG. 7), and when the cabin altitude 207 of the aircraft 12 is detected that is greater than or equal to the landing altitude 206, such as a selected landing altitude.

With the advanced control logic 110*b*, the simple control logic 110*a* causes the smoke vent valve to automatically open if it is determined there is a fire event 24, such as a cargo compartment fire 24*a*, in the cargo compartment 20. The first added control logic 110*c* is incorporated to cause the smoke vent valve 102 to close during a rapid or accelerated descent of the aircraft 12, to minimize or prevent the risk of a cabin fly through event 118 (see FIG. 7). As indicated above, as used herein, "a cabin fly through event" means that when an aircraft experiences a rapid or accelerated descent, the aircraft may be unable to repressurize quickly enough and the ambient air pressure ends up exceeding the cabin pressure, i.e., negative cabin pressure to ambient air pressure differential, and this may cause the ambient air at higher pressures to flow backwards into the aircraft and disrupt normal airflow patterns, such as cabin air flowing out of the aircraft or air flowing from the occupied areas in the upper lobe to the lower lobe, and may potentially result in smoke penetration or smoke carried into occupied areas of the aircraft, such as the cabin and flight deck.

To minimize the risk of a cabin fly through event 118, the first added control logic 110*c* is used to detect a rapid aircraft descent, for example, when the aircraft descent rate 205 (see FIG. 7) is greater than, or faster than, "x" feet per minute for "x" seconds, to cause the smoke vent valve 102 to automatically close. This will decrease overall airplane leakage and allow the cabin 30 to repressurize more quickly, decreasing the chance of a cabin fly through event 118, or flying through the cabin 30.

Additional logic, such as the second added control logic 110*d*, may be incorporated in the advanced control logic 110*b*, to reopen the smoke vent valve 102 once the risk of the cabin fly through event 118, or flying through the cabin 30, has passed, for example, the aircraft descent rate 205 decreases below "x" feet per minute for "x" seconds.

As further shown in FIG. 6, the control logic flowchart 228 further shows an arrow 235*e* that loops back from the action step box 238*b* labeled SVV CLOSED to an arrow 235*f* leading to the decision box 232*b* labeled CARGO COMPARTMENT FIRE/SMOKE SIGNAL ACTIVE? This means as the aircraft 12 continues to descend, the second added control logic 110*d* of the advanced control logic 110*b*, continues to check for a risk of a cabin fly through event 118 and continues to check for changes in the aircraft descent rate 205 compared to the predetermined aircraft descent rate 205, and continues to check for changes in the cabin altitude 207 (see FIG. 7) compared to the landing altitude 206, such as a selected landing altitude, to determine if the smoke vent valve 102 should remain closed or should reopen. With regard to determining if the smoke vent valve 102 should reopen, the second added control logic 110*d* is configured to cause the smoke vent valve 102 to automatically reopen, when the aircraft descent rate 205 of the aircraft 12 is detected that is less than, or slower than, the predetermined aircraft descent rate 205*a* (see FIG. 7) for the predetermined time duration 203 (see FIG. 7).

The control logic 110, such as the advanced control logic 110*b*, based on the aircraft descent rate 205, and in one version, also based on the landing altitude 206 and the cabin altitude 207, is used to determine if the smoke vent valve 102 needs to remain open in the open position 112*b*, or if the smoke vent valve 102 should close in the closed position 114*b*, to prevent a cabin fly through event 118, which results in a negative pressure in one or more of the occupied compartments 22 (see FIG. 1), such as the main passenger cabin 30*a* and/or the flight deck 28. Although the landing altitude 206 may be manually modified as part of an aircraft reconfiguration, there may be instances where the aircraft 12 needs to land at a higher altitude and the first added control logic 110*c*, of the advanced control logic 110*b*, is protecting for that instance where the smoke vent valve 102 may open inadvertently and create a smoke penetration condition 15*a* (see FIG. 7).

Now referring to FIG. 7, FIG. 7 is an illustration of a block diagram of versions of a system 10, such as a smoke penetration prevention system 10*a* (see FIG. 3A), and a smoke penetration prevention system 10*b* (see FIG. 4A), of the disclosure, for incorporation and installation into an aircraft 12 having a fuselage 36. As shown in FIG. 7, the aircraft 12 comprises a commercial transport aircraft 12*a*, a freighter aircraft 12*b*, or another suitable type of aircraft 12.

As shown in FIG. 7, the aircraft 7 comprises the plurality of occupied compartments 22, including at least the flight deck 28 and the cabin 30. The cabin 30 comprises the main passenger cabin 30*a* (see FIG. 1). The occupied compartments 22, or occupant compartments, are designed to house or seat occupants 23 (see FIG. 7), such as passengers and/or flight crew members. The occupied compartments 22 are located in the interior upper portion 36*a* (see FIG. 1) of the fuselage 36 (see also FIG. 1).

As further shown in FIG. 7, the aircraft 12 comprises the lower lobe compartment area 26. The lower lobe compartment area 26 is located in the interior lower portion 36*b* (see FIG. 1) of the fuselage 36 (see also FIG. 1). The lower lobe compartment area 26 is separated from, and positioned below, or under, such as in an adjacent position below, the plurality of occupied compartments 22.

As shown in FIG. 7, the lower lobe compartment area 26 comprises at least one cargo compartment (CC) 20, and for example, comprises two cargo compartments 20, including the forward cargo compartment (CC) 20*a* and the aft cargo compartment (CC) 20*b*. As further shown in FIG. 7, the lower lobe compartment area 26 comprises the adjacent compartment 54 adjacent to the at least one cargo compartment 20. In one version, as shown in FIG. 1, the adjacent compartment 54 is adjacent to, and positioned aft of, the forward cargo compartment 20*a*. As shown in FIG. 7, the adjacent compartment 54 may comprise the air conditioning (AC) mix bay 56 (see also FIG. 1), the cheek area 58 (see also FIG. 2A), the bilge area 59, or another suitable adjacent compartment 54 adjacent to the cargo compartment 20, for example, the forward cargo compartment 20*a* or the aft cargo compartment 20*b*. As shown in FIG. 7, the lower lobe compartment area 26 further includes the electronic equipment (EE) bay 52 and the overboard exhaust valve (OEV) 92.

As shown in FIG. 7, the aircraft 12, such as the lower lobe compartment area 26 of the aircraft 12, further includes the lining system (SYS.) 80, such as in the cargo compartments 20 and/or other areas in the lower lobe compartment area 26. The lining system 80 comprises cargo compartment liners, tape, and/or other types of seals to seal up the boundary 78 (see FIGS. 2A-2B) of the cargo compartment 20.

As shown in FIG. 7, the aircraft 12, such as the lower lobe compartment area 26 of the aircraft 12, further includes a smoke detection (DET.) system (SYS.) 240 having one or more sensors 218. The smoke detection system 240 may be located in, or near, one or more of the cargo compartments 20, such as the forward cargo compartment 20*a* and/or the aft cargo compartment 20*b*, in, or near, the adjacent compartment 54, or in another location in the lower lobe compartment area 26. As shown in FIG. 7, the aircraft 12 further includes an airflow (AF) management (MGMT.) system (SYS.) 242 for managing airflow (AF) 224, including cabin airflow, and air pressure 244, including cabin air pressure.

As shown in FIG. 7, the system 10 provides smoke penetration (PEN.) prevention (PRE.) 82, smoke evacuation 245, fire suppression agents (FSA) penetration (PEN.) prevention (PRE.) 246, and fire byproducts penetration (PEN.) prevention (PRE.) 248, for evacuating and preventing penetration of smoke 14, as well as fire suppression agents (FSA) 16, and fire byproducts 18, from a cargo compartment 20, such as the forward cargo compartment 20*a*, or the aft cargo compartment 20*b*, or another lower lobe compartment area 26, into one or more occupied compartments 22, such as the flight deck 28 and/or the cabin 30. The system 10 for evacuating and preventing penetration of smoke 14 caused by a fire event 24 in the at least one cargo compartment 20 evacuates, and/or assists in evacuating, the smoke 14 from the at least one cargo compartment 20 and prevents penetration of the smoke 14 into one or more of the plurality of occupied compartments 22.

As shown in FIG. 7, the smoke 14 and the fire byproducts 18 are typically caused by, and result from, the fire event 24, such as the cargo compartment (COMP.) fire 24*a*, for example, the inflight cargo compartment (COMP.) fire 24*b*. The fire suppression agents 16 are typically released at the onset of the fire event 24 and can be mixed in with the smoke 14 and/or fire byproducts 18. As further shown in FIG. 7, the smoke 14 can penetrate into adjacent and surrounding areas around the fire event 24, causing smoke penetration (PENET.) 15, resulting in a smoke penetration (PENET.) condition 15*a*.

As shown in FIG. 7, the system 10 comprises the smoke vent valve assembly 100 installed, in one version, in the adjacent compartment 54 external to the at least one cargo compartment 20, such as the forward cargo compartment 20*a*. As shown in FIG. 7, the smoke vent valve assembly 100 comprises the smoke vent valve (SVV) 102. The smoke vent valve 102 is preferably an electromechanical smoke vent valve (SVV) 102*a* (see FIG. 7). In one version, the smoke vent valve 102 comprises an open-close smoke vent valve (SVV) 102*b* (see FIG. 7). In another version, the smoke vent valve 102 comprises a modulating smoke vent valve (SVV) 102*c* (see FIG. 7).

The opening 112 (see FIG. 7) and the closing 114 (see FIG. 7) of the smoke vent valve 102 is controlled with the valve control system (VCS) 104 (see FIG. 7). As shown in FIG. 7, the smoke vent valve 102, such as in the form of the open-close smoke vent valve 102*b*, is controlled by the valve control system 104 to open in the open position (OP) 112*b*, such as the fully open position (OP) 112*c*, and is controlled to close in the closed position (POS.) (CP) 14*b*, such as the fully closed position (CP) 114*c*. As further shown in FIG. 7, the smoke vent valve 102, such as in the form of the modulating smoke vent valve 102*c*, where the opening 112 and the closing 114 of the modulating smoke vent valve 102*c* may be modulated, may be controlled to open or to close in an intermediate position (INTERMED. POS.) 116, such as a partial open position (OP) 112*d*, or a partial closed position (CP) 114*d*, depending on how fast the aircraft 12 is descending, an altitude the descent is starting from, or how likely a cabin fly through event 118 may occur. Cabin fly through is discussed in more detail below with regard to FIGS. 6 and 7. In one version, the modulating smoke vent valve 102*c* may continuously adjust its position between the fully open position 112*c* and the fully closed position 114*c*, allowing for precise, proportional control of the modulating smoke vent valve 102*c*.

As further shown in FIG. 7, the smoke vent valve 102 preferably undergoes sizing 250 so it is designed to obtain an optimum (OPT.) size 252. The optimum size 252 refers to the diametrical open area of the orifice 168 (see FIG. 3F) and effective flow area of the smoke vent valve 102. Considerations for optimum sizing 252 may include what air flow rate is needed and/or how much additional leakage the aircraft pressurization and air conditioning system can handle before control of the cabin environment and altitude become uncontrolled. One factor in the sizing 250 is that the smoke vent valve 102 provide a flow maximization (MAX.) 254 (see FIG. 7) of the flow of the smoke 14 through the smoke vent valve 102 to evacuate the smoke 14 overboard the aircraft 12. For example, sizing 250 of the smoke vent valve 102 preferably maximizes the amount of flow of the smoke 14 through the smoke vent valve 102 to evacuate the smoke 14 overboard.

Another factor in the sizing 250 is that the smoke vent valve 102 provide an airflow (AF) balance influence 256 (see FIG. 7). For example, sizing 250 of the smoke vent valve 102 preferably contributes to overall airflow management by influencing the airflow balance in the aircraft 12 and maximizing an amount of downward airflow from the one or more occupied compartments 22, such as the cabin 30 and/or the flight deck 28, to the cargo compartment 20, such as the forward cargo compartment 20*a* and/or the aft cargo compartment 20*b*, or to other areas of the lower lobe compartment area 26 that may be most susceptible to smoke penetration 15 (see FIG. 7).

Another factor in the sizing 250 is that the smoke vent valve 102 provide a leakage minimization (MIN.) 258 (see FIG. 7). For example, the sizing 250 of the smoke vent valve 102 preferably minimizes overall aircraft leakage to prevent depressurizing the occupied compartment 22, such as the cabin 30 and/or the flight deck 28. In addition, preferably the sizing 250 of the smoke vent valve 102 maintains a desired pressurization of the one or more occupied compartments 22, such as the cabin 30 and/or the flight deck 28, to prevent depressurization of the one or more occupied compartments 22, such as the cabin 30 and/or the flight deck 28.

As shown in FIG. 7, the smoke vent valve assembly 100 further comprises the mounting assembly 154, such as the mounting pedestal assembly 154*a*. The mounting assembly 154 is attached to, or coupled to, the smoke vent valve 102, via the coupling assembly 186 (see FIGS. 3A, 7), such as the first coupling assembly 186*a* (see FIG. 3A), for example, the smoke vent valve coupling assembly. As shown in FIG. 7, the smoke vent valve assembly 100 further comprises the first duct 126*a*, such as the smoke evacuation (EVAC.) duct 126*b*, coupled to the smoke vent valve 102. The first duct 126*a* terminates at the exhaust opening 202 (see FIGS. 2A-2B, 3D, 4D) through the exterior portion 125 (see FIGS. 2A-2B, 3D, 4D, 5A-5B) of the aircraft 12 (see FIGS. 2A-2B, 3D, 4D, 5A-5B).

In one version of the smoke vent valve assembly 100, the smoke vent valve assembly 100 includes one duct 126, such as the first duct 126*a*, for example, the smoke evacuation duct 126*b*. The first duct 126*a*, such as the smoke evacuation duct 126*b*, has the first duct inlet end 128*a* (see FIGS. 3D, 4D) coupled to the smoke vent valve 102, via the mounting assembly 154 (see FIGS. 3D, 4D), and has the first duct outlet end 128*b* (see FIGS. 3D, 4D) that terminates at the exhaust opening 202 (see FIGS. 3D, 4D) through the exterior portion 125 (see FIGS. 2A-2B, 3D, 4D) of the aircraft 12.

In another version of the smoke vent valve assembly 100, the smoke vent valve assembly 100 includes two ducts 126, including the first duct 126*a*, such as the smoke evacuation duct 126*b*, and also includes the second (SEC.) duct 126*c* (see FIG. 7), such as the smoke intake duct 126*d* (see FIG. 7). The second duct 126*c*, such as the smoke intake duct 126*d*, has the second duct inlet end 134*a* (see FIG. 4C) in proximity to the outlet end 220*b* (see FIG. 4C) of the pressure equalization valve 96 (see FIG. 4C), and has the second duct outlet end 134*b* (see FIG. 4C) attached to, or coupled to, the smoke vent valve inlet flange 144*a* (see FIG. 4C) of the smoke vent valve 102 (see FIG. 4C), via the coupling assembly 186 (see FIGS. 3A, 7), such as the second coupling assembly 186*b* (see FIG. 3A), for example, the smoke intake duct coupling assembly.

As shown in FIG. 7, the system 10 further comprises the pressure equalization (EQUAL.) valve 96 that is preferably installed in a wall 65 (see FIGS. 2A-2B) of the cargo compartment 20. The pressure equalization valve 96 has the inlet end 220*a* (see FIGS. 3B, 4B) located in the cargo compartment 20 and has the outlet end 220*b* (see FIGS. 3D, 4D) located in the adjacent compartment 54 and in proximity to the smoke vent valve assembly 100. When the pressure equalization valve 96 is opened to the open position 112*a* (see FIG. 7), it creates the intentional (INTEN.) leakage path 98 (see FIG. 7) through the lining system 80 (see FIG. 7) of the cargo compartment 20, such as in one version, the forward cargo compartment 20*a*, and in another version, the aft cargo compartment 20*b*. When the pressure equalization valve 96 is closed to a closed position (POS.) (CP) 114*a* (see FIG. 7), it closes the intentional leakage path 98. The smoke vent valve assembly 100 is designed to take advantage of the pressure equalization valve 96 and the intentional leakage path 98, so that the smoke vent valve assembly 100 can exhaust the smoke 14 through the pressure equalization valve 96 outside of the aircraft 12, using the valve control system 104.

As shown in FIG. 7, the system 10 provides a direct path 33 and a smoke path (SP) 34, such as a direct smoke path (SP) 34*a*, for the smoke 14 to flow directly from the at least one cargo compartment 20, through the pressure equalization valve 96, and through the smoke vent valve assembly 100 which exhausts the smoke 14 directly overboard the aircraft 12. This results in the system 10 evacuating and preventing penetration of the smoke 14 from the at least one cargo compartment 20 to one or more of the plurality of occupied compartments 22.

As shown in FIG. 7, the system 10 further comprises the valve control system (VCS) 104 coupled to the smoke vent valve 102, to control the opening 112 and the closing 114 of the smoke vent valve 102. As shown in FIG. 7, the valve control system 104 comprises an automated valve control system (VCS) 104*a* or a manual valve control system (VCS) 104*b*.

The manual valve control system 104*b* comprises, in one version, the manual switch 111 (see FIG. 1) located in the flight deck 28 (see FIG. 1) that is manually operated to control the opening 112 (see FIG. 7) and the closing 114 (see FIG. 7) of the smoke vent valve 102. Operation of the smoke vent valve 102 using the manual switch 111 located in the flight deck 28 may be based on, for example, an indication (INDIC.) 260 (see FIG. 7), such as a cargo compartment fire indication, of a fire event 24 (see FIG. 7), such as a cargo compartment fire 24*a* (see FIG. 7), for example, an inflight cargo compartment fire 24*b* (see FIG. 7) in the cargo compartment 20, such as the forward cargo compartment 20*a*, and/or the aft cargo compartment 20*b*, or another area of the lower lobe compartment area 26 (see FIGS. 1, 7), and may also be based on related flight crew procedure which directs the flight crew to open the smoke vent valve 102.

As shown in FIG. 7, in one version, the automated valve control system 104*a* comprises the hardware assembly 208 and the analog controls 210, where the hardware assembly 208 comprises relays 212, wiring 214, switches 215, discrete signals (SIG.) 216, and other suitable hardware that receive signals, for example, via discrete signal wiring relays, upon activation of one or more sensors 218 in the cargo compartment 20, such as the forward cargo compartment 20*a*, and/or the aft cargo compartment 20*b*, when there is a fire event 24 in the cargo compartment 20, such as the forward cargo compartment 20*a*, and/or the aft cargo compartment 20*b*.

As shown in FIG. 7, in another version, the automated valve control system 104*a* comprises a controller (CONT.) 106 having a software program (PROG.) 108 with control logic (CL) 110. The controller 106 that may be part of, or used with, a computer 204 or a computer system. As shown in FIG. 7, the controller 106 may comprise an equipment controller (CONT.) 106*a* or another suitable controller 106. The controller 106 may comprise an automated controller (CONT.) 106*b* (see FIG. 7) or a manual controller (CONT.) 106*c* (see FIG. 7).

In one version of the automated valve control system 104*a*, the control and operation of the smoke vent valve 102 of the smoke vent valve assembly 100 is automated to open or to close with the controller 106, such as the equipment controller 106*a*, using the software program 108 with the control logic 110, that receives a signal input 107*a* (see FIG. 7), and then the control logic 110 outputs, or sends, a command output 107*b* (see FIG. 7) to open the smoke vent valve 102 to an open position 112*b* (see FIG. 7), or to close the smoke vent valve 102 to a closed position 114*b* (see FIG. 7), when necessary.

In one version, the simple control logic (CL) 110*a* causes the smoke vent valve 102 to open based on one or more signals 109 (see FIG. 7), such as a smoke signal 109*a* (see FIG. 7), a cargo compartment fire signal 109*b* (see FIG. 7), or another suitable signal 109 triggered by one or more sensors 218 (see FIG. 7) in the cargo compartment 20, such as the forward cargo compartment 20*a* and/or the aft cargo compartment 20*b*, sensing a fire event 24 (see FIG. 7) in the cargo compartment 20, such as the forward cargo compartment 20*a* and/or the aft cargo compartment 20*b*. The smoke vent valve 102 remains open for the duration of the flight until the aircraft 12 lands and the one or more signals 109 (see FIG. 7), such as the smoke signal 109*a* (see FIG. 7), the cargo compartment fire signal 109*b* (see FIG. 7), or another suitable signal 109, is reset.

In an alternate architecture, the advanced control logic (CL) 110*b* (see FIG. 7) is used. The advanced control logic 110*b* includes the simple control logic 110*a* (see FIG. 7) and includes a first added control logic (CL) 110*c* (see FIG. 7), and may include a second added control logic (CL) 110*d* (see FIG. 7). For example, with the advanced control logic 110*b*, the simple control logic 110*a* causes the smoke vent valve 102 to automatically open based on one or more signals 109 (see FIG. 7), such as the smoke signal 109*a* (see FIG. 7), the cargo compartment fire signal 109*b* (see FIG. 7), or another suitable signal 109.

The advanced control logic 110*b* minimizes the risk of a cabin fly through event 118 (see FIG. 7) with the first added control logic 110*c*. The first added control logic 110*c* of the advanced control logic 110*b* causes the smoke vent valve 102 to automatically close during a rapid or accelerated descent of the aircraft 12. In one version, the first added control logic 110*c* (see FIG. 7) is configured to cause the smoke vent valve 102 to automatically close, when an aircraft (AC) descent rate 205 (see FIG. 7) of the aircraft 12 is detected that is greater than, or faster than, a predetermined (PREDET.) aircraft (AC) descent rate 205*a* (see FIG. 7) of the aircraft 12 for a predetermined (PREDET.) time duration 203 (see FIG. 7), i.e., "x" feet per minute for "x" seconds, of the aircraft 12. The first added control logic 110*c* uses measurements and/or calculations of the aircraft descent rate 205 (see FIG. 7) compared to the predetermined aircraft descent rate 205*a* (see FIG. 7), or known aircraft descent rate, to determine if the smoke vent valve 102 should be closed. The first added control logic 110*c* may also use measurements and/or calculations of a cabin altitude (ALT.) 107 (see FIG. 7) compared to a landing altitude (ALT.) (LA) 206 (see FIG. 7), such as a selected landing altitude, of the aircraft 12 (see FIG. 1), to determine if the smoke vent valve 102 should be closed. This decreases overall aircraft leakage and allows the occupied compartments 22, such as the cabin 30 and/or the flight deck 28, to repressurize more quickly, thus decreasing the risk of a cabin fly through event 118 or flying through the cabin 30.

The advanced control logic 110*b* may further comprise the second added control logic 110*d* (see FIG. 7). The second added control logic 110*d* may also use the parameter of the aircraft descent rate 205. In one version, the second added control logic 110*d* is configured to cause the smoke vent valve 102 to automatically reopen, when the aircraft descent rate 205 of the aircraft 12 is detected that is less than, or slower than, the predetermined aircraft descent rate 205*a* of the aircraft 12 for the predetermined time duration 203, i.e., "x" feet per minute for "x" seconds. The second added control logic 110*d* of the advanced control logic 110*b* can be used to automatically reopen the closed smoke vent valve 102.

Thus, operation of the smoke vent valve 102 can be manual, via a manual switch 111 (see FIG. 1) located in the flight deck 28, and based on, for example, an indication 260 (see FIG. 7), such as a cargo compartment fire indication, and related flight crew procedure which directs the flight crew to open the smoke vent valve 102.

Alternatively, operation of the smoke vent valve 102 can be automated via the hardware assembly 208 and the analog controls 210, such that upon activation of a signal 109 (see FIG. 7), such as a smoke signal 109*a* (see FIG. 7) or a cargo compartment fire signal 109*b* (see FIG. 7), the smoke vent valve 102 is automatically driven open.

Alternatively, operation of the smoke vent valve 102 can be automated via the implementation of a controller 106 having a software program 108 with control logic 110, such as simple control logic 110*a* or advanced control logic 110*b*, to receive a signal input 107*a* (see FIG. 7), such as a relevant signal input, and then output a command output 107*b* (see FIG. 7), to open the smoke vent valve 102 and to close the smoke vent valve 102, when necessary.

Figure 8:
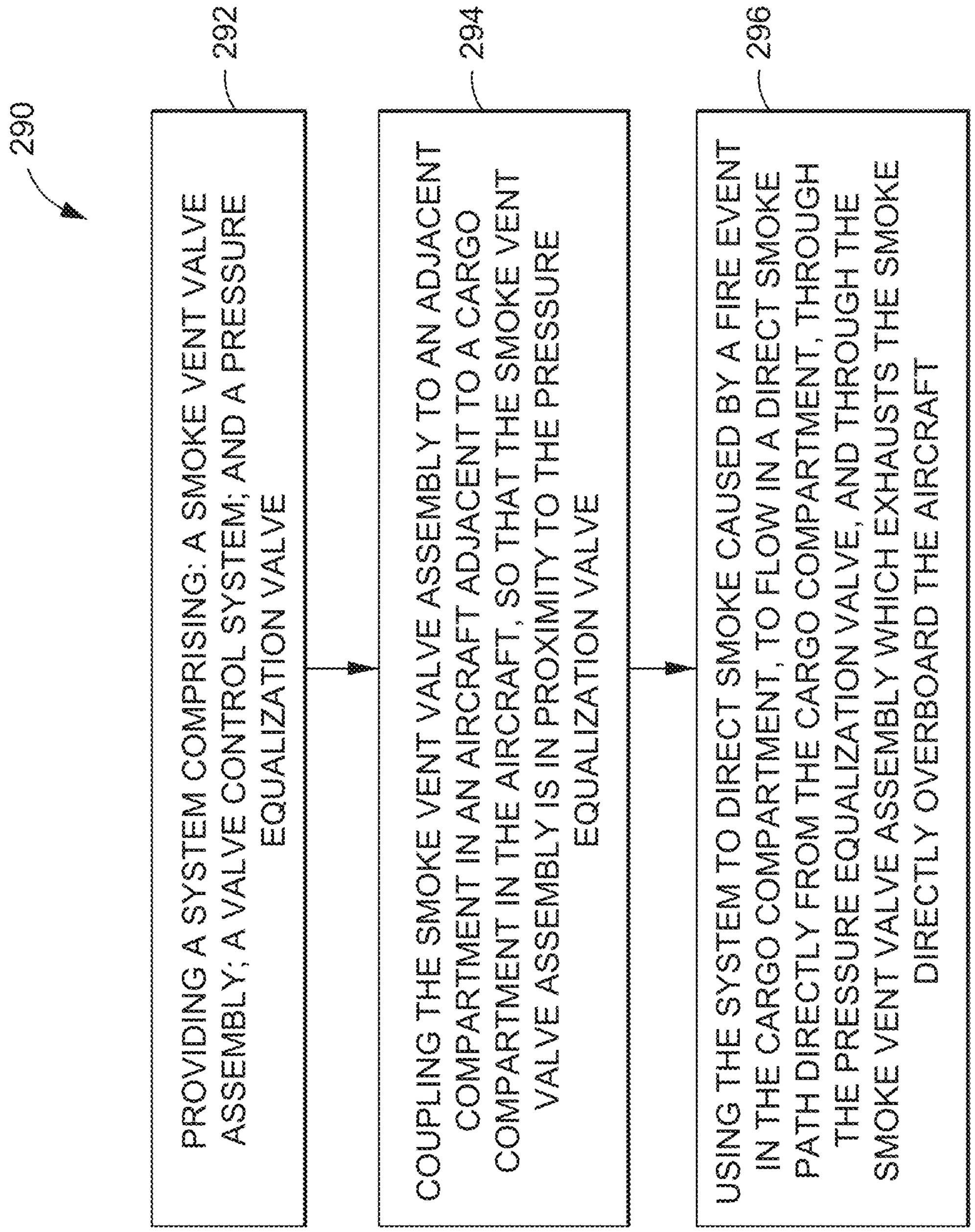
FIG. 8 is an illustration of a flow diagram of a version of a method of the disclosure.

Now referring to FIG. 8, FIG. 8 is an illustration of a flow diagram of a version of a method 290 of the disclosure. In another version of the disclosure, there is provided the method 290 of using a system 10 (see FIGS. 1, 3A, 4A, 7) installed in an aircraft 12 (see FIGS. 1, 7) for evacuating and preventing penetration of smoke 14 (see FIGS. 1, 2A-2B, 7) from a cargo compartment 20 (see FIGS. 1, 2A-2B, 7) to one or more occupied compartments 22 (see FIGS. 1, 7) in the aircraft 12. The blocks in FIG. 8 represent operations and/or portions thereof, or elements, and lines connecting the various blocks do not imply any particular order or dependency of the operations or portions thereof, or elements. FIG. 8 and the disclosure of the steps of the method 290 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 8, the method 290 comprises the step of providing 292 the system 10 (see FIGS. 1, 2A-2B, 3A, 4A, 7), such as the smoke penetration prevention system 10*a* (see FIGS. 2A, 3A, 7) and the smoke penetration prevention system 10*b* (see FIGS. 2B, 4A, 7). In one version, the system 10 comprises the smoke vent valve assembly 100 (see FIGS. 3A, 4A, 7), as discussed in detail above.

As shown in FIGS. 3A, 4A, 7, the smoke vent valve assembly 100 comprises the smoke vent valve 102, the mounting assembly 154 attached to the smoke vent valve 102, and the coupling assembly 186, such as the first coupling assembly 186*a*, for example, the smoke vent valve coupling assembly, attached to, and coupling, the smoke vent valve 102 and the mounting assembly 154 together.

The step of providing 292 the system 10 may further comprise providing the system 10 wherein the smoke vent valve 102 comprises one of, an open-close smoke vent valve 102*b* (see FIG. 7), or a modulating smoke vent valve 102*c* (see FIG. 7).

As shown in FIGS. 3A, 4A, 7, the smoke vent valve assembly 100 further comprises the first duct 126*a* coupled to the smoke vent valve 102. As shown in FIGS. 2A-2B, the first duct 126*a* terminates at the exhaust opening 202 through the exterior portion 125 of the aircraft 12, such as through an exterior lower portion 36*c* of the fuselage 36.

The step of providing 292 the system 10 may further comprise providing the system 10 wherein the first duct 126*a* of the smoke vent valve assembly 100 comprises a smoke evacuation duct 126*b* (see FIGS. 2A-2B, 3D, 4D) having a first duct inlet end 128*a* (see FIGS. 2A-2B, 3D, 4D) and a first duct outlet end 128*b* (see FIGS. 2A-2B, 3D, 4D), and further wherein the first duct inlet end 128*a* is coupled to the smoke vent valve 102, via a mounting assembly 154 (see FIGS. 3A, 4A), and the first duct outlet end 128*b* terminates at the exhaust opening 202 (see FIGS. 1, 2A-2B, 3F, 4F) through the exterior portion 125 (see FIGS. 1, 2A-2B, 3D, 4D, 5A-5B) of the aircraft 12, such as the exterior lower portion 36*c* (see FIGS. 2A-2B, 3D, 4D, 5A-5B) of the fuselage 36 (see FIGS. 1, 2A-2B, 3D, 4D, 5A-5B).

The step of providing 292 the system 10 may further comprise providing the system 10 wherein the smoke vent valve assembly 100 further comprises a second duct 126*c* (see FIGS. 2B, 4E, 5B) comprising a smoke intake duct 126*d* (see FIGS. 2B, 4E, 5B). The second duct 126*c* has a second duct inlet end 134*a* (see FIGS. 2B, 4E, 5B) and a second duct outlet end 134*b* (see FIGS. 2B, 4E, 5B). As shown in FIGS. 4C, 5B, the second duct inlet end 134*a* of the smoke intake duct 126*d* is in proximity to the outlet end 220*b* of the pressure equalization valve 96, and the second duct outlet end 134*b* of the smoke intake duct 126*d* is attached to, or coupled to, a smoke vent valve inlet flange 144*a* of the smoke vent valve 102, via a coupling assembly 186 (see also FIGS. 4A. 4F), such as a second coupling assembly 186*b* (see also FIGS. 4A, 4F), for example, a smoke intake duct coupling assembly.

As shown in FIGS. 1, 2A-2B, 3A, 4A, 7, the system 10 further comprises the valve control system 104 coupled to the smoke vent valve 102, to control opening 112 and closing 114 of the smoke vent valve 102. The valve control system 104 may comprise an automated valve control system 104*a* (see FIGS. 1, 3A, 4A), and/or a manual valve control system 104*b* (see FIGS. 1, 7).

The step of providing 292 the system 10 may further comprise providing the system 10 wherein the valve control system 104 of the system 10 comprises the automated valve control system 104*a* comprising in one version, the hardware assembly 208 (see FIGS. 5A-5B) and the analog controls 210 (see FIGS. 5A-5B). In this version of the automated valve control system 104*a*, the smoke vent valve 102 is automated to open or to close using the hardware assembly (ASSY.) 208, such as shown in FIG. 7, that includes relays 212, wiring 214, switches 215, discrete signals (SIG.) 216, and other suitable hardware that receive signals, for example, via discrete signal wiring relays, upon activation of one or more sensors 218 (see FIG. 7) in the cargo compartment 20, such as the forward cargo compartment 20*a*, and/or the aft cargo compartment 20*b*, when there is a fire event 24 (see FIGS. 2A-2B, 7) in the cargo compartment 20, such as the forward cargo compartment 20*a*, and/or the aft cargo compartment 20*b*. The hardware assembly 208 and the analog controls 210 may be located in the electronic equipment bay 52 (see FIGS. 1, 2A-2B), or in another lower lobe compartment area 26 (see FIG. 1) of the aircraft 12 (see FIGS. 1, 5A-5B).

Alternatively, in another version of the automated valve control system 104*a*, the smoke vent valve 102 is automated to open or to close using the controller 106 (see FIGS. 2A-2B) and the software program 108 (see FIGS. 2A-2B) with the control logic 110 (see FIGS. 2A-2B), such as the simple control logic 110*a* (see FIG. 7) or the advanced control logic 110*b* (see FIG. 7). The controller 106 and the software program 108 with the control logic 110 may be located in the electronic equipment bay 52 (see FIGS. 1, 2A-2B), or in another lower lobe compartment area 26 (see FIG. 1) of the aircraft 12 (see FIGS. 1, 5A-5B).

The advanced control logic 110*b* minimizes the risk of a cabin fly through event 118 (see FIG. 7). In one version, the advanced control logic 110*b* comprises the simple control logic 110*a* (see FIG. 7) configured to cause the smoke vent valve 102 to automatically open based on one or more signals 109 (see FIG. 7) triggered by the fire event 24 in the cargo compartment 20, and upon activation of one or more sensors 218 (see FIG. 7) in the cargo compartment 20, such as the forward cargo compartment 20*a*, and/or the aft cargo compartment 20*b*, when there is a fire event 24 (see FIGS. 2A-2B, 7) in the cargo compartment 20, such as the forward cargo compartment 20*a*, and/or the aft cargo compartment 20*b*.

The advanced control logic 110*b* further comprises a first added control logic 110*c* (see FIG. 7) that, in one version, is configured to cause the smoke vent valve 102 to automatically close, when an aircraft descent rate 205 (see FIG. 7) of the aircraft 12 is detected that is greater than, or faster than, a predetermined aircraft descent rate 205*a* (see FIG. 7) of the aircraft 12 for a predetermined time duration 203 (see FIG. 7), i.e., "x" feet per minute for "x" seconds. The first added control logic 110*c* (see FIGS. 6, 7) may also use the parameters of the landing altitude (LA) 206 (see FIG. 7) and the cabin altitude 207 (see FIG. 7), in addition to the aircraft descent rate 205. For example, in one version, the first added control logic 110*c* is configured to cause the smoke vent valve 102 to automatically close, when the aircraft descent rate 205 of the aircraft 12 is detected that is greater than, or faster than, the predetermined aircraft descent rate 205*a* for the predetermined time duration 203, and when a cabin altitude 207 (see FIG. 7) of the aircraft 12 is detected that is greater than or equal to a landing altitude 206 (see FIG. 7), such as a selected landing altitude. This decreases overall aircraft leakage and allows the occupied compartments 22, such as the cabin 30 and/or the flight deck 28, to repressurize more quickly, thus decreasing the risk of a cabin fly through event 118 or flying through the cabin 30.

The advanced control logic 110*b* may further comprise a second added control logic 110*d* (see FIGS. 6, 7) that, in one version, is configured to cause the smoke vent valve 102 to automatically reopen, when the aircraft descent rate 205 of the aircraft 12 is detected that is less than, or slower than, the predetermined aircraft descent rate 205*a* of the aircraft 12 for the predetermined time duration 203, i.e., "x" feet per minute for "x" seconds. The second added control logic

110*d* may also use the parameter of the aircraft descent rate 205. For example, in one version, the second added control logic 110*d* is configured to cause the smoke vent valve 102 to automatically reopen, when the aircraft descent rate 205 of the aircraft 12 is detected that is less than, or slower than, the predetermined aircraft descent rate 205*a* for the predetermined time duration 203.

The step of providing 292 the system 10 may further comprise providing the system 10 wherein the valve control system 104 of the system 10 comprises the manual valve control system 104*b* comprising in one version, a manual switch 111 (see FIG. 1) that is manually operated to control the opening 112 (see FIG. 7) and the closing 114 (see FIG. 7) of the smoke vent valve 102. The manual switch 111 may be located in the flight deck 28 (see FIG. 1) of the aircraft 12, or in another suitable location of the aircraft 12. Operation of the smoke vent valve 102 using the manual switch 111 located in the flight deck 28 may be based on, for example, an indication 260 (see FIG. 7), such as a cargo compartment fire indication, of a fire event 24 (see FIG. 7), such as a cargo compartment fire 24*a* (see FIG. 7), for example, an inflight cargo compartment fire 24*b* (see FIG. 7) in the cargo compartment 20, such as the forward cargo compartment 20*a*, and/or the aft cargo compartment 20*b*, or another area of the lower lobe compartment area 26 (see FIGS. 1, 7), and also based on related flight crew procedure which directs the flight crew to open the smoke vent valve 102.

As shown in FIGS. 1, 2A-2B, 3A, 4A, 7, the system 10 further comprises the pressure equalization valve 96 installed in the wall 65, for example, the aft endwall 66*b*, of the cargo compartment 20. The pressure equalization valve 96 has the inlet end 220*a* (see FIGS. 2A-2B, 3C, 4C) in the cargo compartment 20, such as the forward cargo compartment 20*a*, and the outlet end 220*b* (see FIGS. 2A-2B, 3C, 4C) external to the cargo compartment 20, such as the forward cargo compartment 20*a*, and in proximity to the smoke vent valve assembly 100.

As shown in FIG. 8, the method 290 further comprises the step of coupling 294 the smoke vent valve assembly 100 to an adjacent compartment 54 (see FIGS. 1, 2A-2B, 5A-5B) in the aircraft 12 adjacent to the cargo compartment 20, such as the forward cargo compartment 20*a*, so that the smoke vent valve assembly 100 is in proximity to the pressure equalization valve 96 and external to the cargo compartment 20, such as the forward cargo compartment 20*a*.

As shown in FIG. 8, the method 290 further comprises the step of using 296 the system 10 to direct smoke 14 (see FIGS. 1, 2A-2B) caused by a fire event 24 (see FIGS. 2A-2B, 7) in the cargo compartment 20, such as the forward cargo compartment 20*a*, to flow in a direct smoke path 34*a* (see FIGS. 1, 2A-2B, 7) directly from the cargo compartment 20, such as the forward cargo compartment 20*a*, through the pressure equalization valve 96 (see FIGS. 1, 2A-2B, 7), and through the smoke vent valve assembly 100 (see FIGS. 1, 2A-2B, 7) which exhausts the smoke 14 directly overboard the aircraft 12, to result in the system 10 evacuating and preventing penetration of the smoke 14 from the cargo compartment 20, such as the forward cargo compartment 20*a*, to the one or more occupied compartments 22.

The method 290 may further comprise sizing 250 (see FIG. 7) the smoke vent valve 102 of the smoke vent valve assembly 100 to an optimum size 252 (see FIG. 7) consisting of a diametrical open area of the orifice 168 (see FIG. 3F) and an effective flow area of the smoke vent valve 102. As discussed above with regard to FIG. 7, the factors in the sizing 250 include the smoke vent valve 102 provides a flow maximization (MAX.) 254 (see FIG. 7) of the flow of the smoke 14 through the smoke vent valve 102 to evacuate the smoke 14 overboard the aircraft 12, the smoke vent valve 102 provides an airflow (AF) balance influence 256 (see FIG. 7) to the overall airflow management, and the smoke vent valve 102 provides a leakage minimization (MIN.) 258 (see FIG. 7), to minimize overall aircraft leakage to prevent depressurizing the occupied compartment 22, such as the cabin 30 and/or the flight deck 28.

Figure 9:
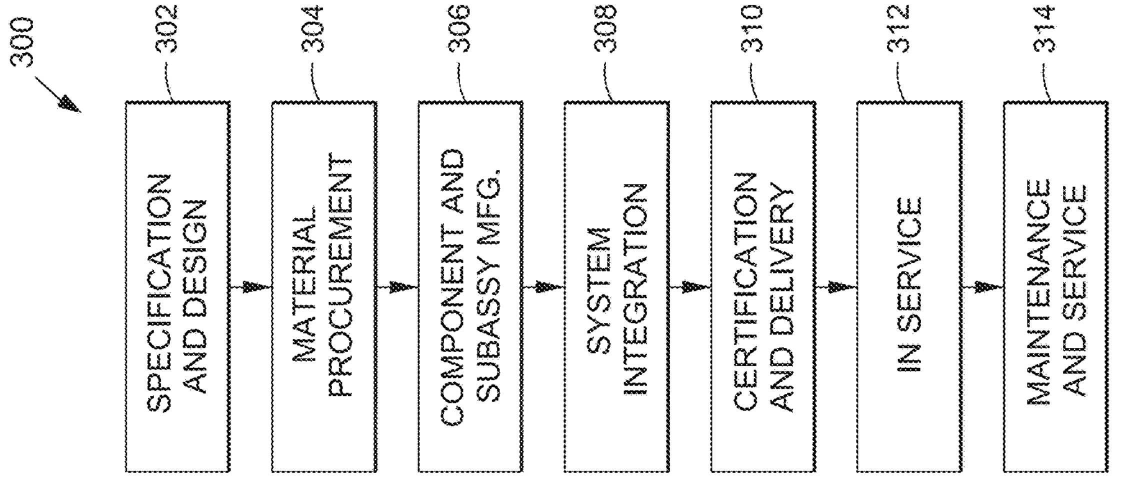
FIG. 9 is an illustration of a flow diagram of an exemplary aircraft manufacturing and service method.
Figure 10:
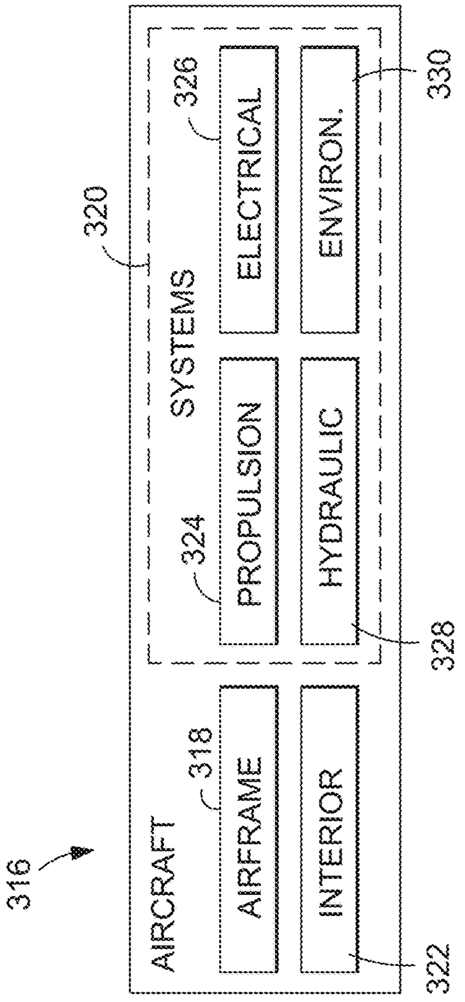
FIG. 10 is an illustration of an exemplary block diagram of an aircraft.

Now referring to FIGS. 9 and 10, FIG. 9 is an illustration of a flow diagram of an exemplary aircraft manufacturing and service method 300, and FIG. 10 is an illustration of an exemplary block diagram of an aircraft 316. Referring to FIGS. 9 and 10, versions of the disclosure may be described in the context of the aircraft manufacturing and service method 300 as shown in FIG. 9, and the aircraft 316 as shown in FIG. 10.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as automotive.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the system 10 (see FIGS. 1, 2A-2B, 3A, 4A, 7), such as the smoke penetration prevention system 10*a* (see FIGS. 2A, 3A, 7), and the smoke penetration prevention system 10*b* (see FIGS. 2B, 4A, 7), and the method 290 (see FIG. 8) provide a unique and novel improved system 10 architecture and improved method 290 of using the same for evacuating smoke 14 (see FIGS. 2A-2B, 7) from the aircraft 12 (see FIGS. 1, 7) and preventing penetration of smoke 14 into occupied compartments 22 or areas, such as the flight deck 28 (see FIG. 1) and the cabin 30 (see FIG. 1), where the smoke 14 is caused by a fire event 24 (see FIGS. 2A-2B, 7), such as a cargo compartment fire 24*a* (see FIGS. 2A-2B, 7), for example, an inflight cargo compartment fire 24*b* (see FIG. 7), in a cargo compartment 20 (see FIGS. 1, 2A-2B, 7), such as a forward cargo compartment 20*a* (see FIGS. 1, 2A-2B, 7), or an aft cargo compartment 20*b* (see FIG. 1), or in another lower lobe compartment area 26 (see FIG. 1). The system 10 and method 290 prevent penetration of smoke 14 (see FIGS. 2A-2B, 7), as well as fire suppression agents 16 (see FIG. 7), and/or fire byproducts 18 (see FIG. 7) caused by a fire event 24 (see FIG. 7) in a cargo compartment 20 (see FIGS. 1, 7), such as a forward cargo compartment 20*a*, or an aft cargo compartment 20*b* (see FIGS. 1, 7), or in another area of the lower lobe compartment area 26 (see FIGS. 1, 7) of the aircraft 12 (see FIG. 1). Thus, the system 10 and method 290 provide smoke penetration prevent 82 (see FIG. 7), as well as fire suppression agents penetration prevention 246 (see FIG. 7), and fire byproducts penetration prevention 248 (see FIG. 7).

As shown in FIGS. 3A, 4A, the system 10 comprises the smoke vent valve assembly 100 with the smoke vent valve 102 that is controllable, the mounting assembly 154, the coupling assembly 186, such as the first coupling assembly 186*a*, coupling the smoke vent valve 102 and the mounting assembly 154 together, and the first duct 126*a*, such as the smoke evacuation duct 126*b*. In another version, the smoke vent valve assembly 100 comprises an additional second duct 126*c* (see FIG. 4A), such as a smoke intake duct 126*d* (see FIG. 4A), and an additional coupling assembly 186, such as a second coupling assembly 186*b*, coupling the smoke intake duct 126*d* and the smoke vent valve 102 together. The system 10 further comprises the pressure equalization valve 96 in proximity to the smoke vent valve assembly 100 to create the intentional leakage path 98 (see FIG. 7) and pressure relief.

The system 10 further comprises the valve control system 104 (see FIGS. 1, 2A-2B, 3A, 4A, 5A-5B), to control the opening 112 (see FIG. 7) and the closing (114) of the smoke vent valve 102. The valve control system 104 may be the automated valve control system 104*a* (see FIG. 7) or the manual valve control system 104*b* (see FIG. 7). In one version, the automated valve control system 104*a* comprises the hardware assembly 208 (see FIGS. 5A-5B) that includes relays 212 (see FIG. 7), wiring 214 (see FIG. 7), switches 215 (see FIG. 7), discrete signals (SIG.) 216 (see FIG. 7), and other suitable hardware and comprises the analog controls 210 (see FIGS. 5A-5B). In another version, the automated valve control system 104*a* comprises the controller 106 (see FIGS. 2A-2B) and the software program 108 (see FIGS. 2A-2B) with the control logic 110 (see FIGS. 2A-2B), such as the simple control logic 110*a* (see FIG. 7) or the advanced control logic 110*b* (see FIG. 7).

The advanced control logic 110*b* minimizes the risk of a cabin fly through event 118 (see FIG. 7). The advanced control logic 110*b* maximize the benefits of additional leakage to vent the smoke 14, while minimizing the risk of the cabin fly through event due to this additional leakage. In one version, the advanced control logic 110*b* comprises the simple control logic 110*a* (see FIG. 7), the first added control logic 110*c* (see FIG. 7), and optionally, the second added control logic 110*d* (see FIG. 7). The simple control logic 110*a* is configured to cause the smoke vent valve 102 to automatically open based on one or more signals 109 (see FIG. 7) triggered by the fire event 24 in the cargo compartment 20, and upon activation of one or more sensors 218 (see FIG. 7) in the cargo compartment 20, such as the forward cargo compartment 20*a*, and/or the aft cargo compartment 20*b*, when there is a fire event 24 (see FIGS. 2A-2B, 7) in the cargo compartment 20, such as the forward cargo compartment 20*a*, and/or the aft cargo compartment 20*b*.

The first added control logic 110*c* (see FIG. 7) is configured to cause the smoke vent valve 102 to automatically close, when an aircraft descent rate 205 (see FIG. 7) of the aircraft 12 is detected that is greater than, or faster than, a predetermined aircraft descent rate 205*a* (see FIG. 7) of the aircraft 12 for a predetermined time duration 203 (see FIG. 7), i.e., "x" feet per minute for "x" seconds. The second added control logic 110*d* (see FIG. 7) is configured to cause the smoke vent valve 102 to automatically reopen, when the aircraft descent rate 205 of the aircraft 12 is detected that is less than, or slower than, the predetermined aircraft descent rate 205*a* of the aircraft 12 for the predetermined time duration 203, i.e., "x" feet per minute for "x" seconds.

The first added control logic 110*c* (see FIGS. 6, 7) may also use the parameters of the landing altitude (LA) 206 (see FIG. 7) and the cabin altitude 207 (see FIG. 7), in addition to the aircraft descent rate 205. For example, in one version, the first added control logic 110*c* is configured to cause the smoke vent valve 102 to automatically close, when the aircraft descent rate 205 of the aircraft 12 is detected that is greater than, or faster than, the predetermined aircraft descent rate 205*a* for the predetermined time duration 203, and when the cabin altitude 207 (see FIG. 7) of the aircraft 12 is detected that is greater than or equal to the landing altitude 206 (see FIG. 7), such as a selected landing altitude. The second added control logic 110*d* may also use the parameter of the aircraft descent rate 205. For example, in one version, the second added control logic 110*d* is configured to cause the smoke vent valve 102 to automatically reopen, when the aircraft descent rate 205 of the aircraft 12 is detected that is less than, or slower than, the predetermined aircraft descent rate 205*a* for the predetermined time duration 203.

In addition, disclosed versions of the system 10 (see FIGS. 1, 2A-2B, 3A, 4A, 7), such as the smoke penetration prevention system 10*a* (see FIGS. 2A, 3A, 7), and the smoke penetration prevention system 10*b* (see FIGS. 2B, 4A, 7), and the method 290 (see FIG. 8) provide a smoke vent valve 102 that is designed and sized to maximize flow of the smoke 14 outside of the aircraft 12 and to evacuate the smoke 14 directly outside of the aircraft 12, and in particular, outside the fuselage skin 76 of the aircraft 12, is designed to improve airflow balance in the aircraft 12, and is designed to maintain appropriate cabin pressurization and minimize overall aircraft leakage. Although the smoke vent valve can be used to assist with some aspects of pressurization, such as cabin pressurization, it is unique compared to an outflow valve 94 (see FIG. 1), which is typically used to control cabin pressure. Moreover, the smoke vent valve 102 is simple and inexpensive to make, install, and use, and may be installed in locations where an outflow valve 94 may not fit. Further, the smoke vent valve 102 may be in the form of an open-close smoke vent valve 102*b* (see FIG. 7), a modulating smoke vent valve 102*c* (see FIG. 7), or another suitable type of smoke vent valve 102.

In addition, disclosed versions of the system 10 (see FIGS. 1, 2A-2B, 3A, 4A, 7), such as the smoke penetration prevention system 10*a* (see FIGS. 2A, 3A, 7), and the smoke penetration prevention system 10*b* (see FIGS. 2B, 4A, 7), and the method 290 (see FIG. 8) provide a direct path 33 (see FIG. 7), such as a direct smoke path 34*a* (see FIGS. 1, 2A-2B, 7), for the smoke 14 (see FIGS. 1, 2A-2B, 7), as well as the fire suppression agents 16 (see FIG. 7) and the fire byproducts 18 (see FIG. 7), caused by a fire event 24 (see FIGS. 2A-2B, 7) in the cargo compartment 20, or another area of the lower lobe compartment area 26 (see FIG. 1), to flow directly from the cargo compartment 20, or the other area, through the pressure equalization valve 96, and through the smoke vent valve assembly 100 which exhausts the smoke 14, as well as the fire suppression agents 16 and the fire byproducts 18, directly overboard the aircraft 12. This results in the system 10 and the method 290 evacuating and preventing penetration of the smoke 14, as well as the fire suppression agents 16 and the fire byproducts 18, from the cargo compartment 20 to the one or more occupied compartments 22, such as the flight deck 28 and the cabin 30. The smoke vent valve 102 is specifically designed and optimized to evacuate smoke 14, as well as fire suppression agents 16, and fire byproducts 18, and the smoke vent valve 102 is installed in a location adjacent to the pressure equalization valve 96, to create the direct smoke path 34*a* to exhaust the smoke 14, as well as the fire suppression agents 16 and the fire byproducts 18, overboard the aircraft 12. The direct path 33, for example, the direct smoke path 34*a*, creates an intentional path and an improved leakage path for the smoke 14, as well as the fire suppression agents 16 and the fire byproducts 18, to exit the cargo compartment 20, or other lower lobe compartment area 26, and flow directly overboard the aircraft 12, rather than relying solely on the lining system 80 (see FIGS. 2A-2B, 7), tapes, seals, and sealing features in the cargo compartment 20, and the airflow management system 242 (see FIG. 7), to prevent smoke 14, as well as the fire suppression agents 16 and the fire byproducts 18, from penetrating into the occupied compartments 22, such as the cabin 30 and the flight deck 28, and to avoid any exposure to occupants 23 in the occupied compartments 22.

Moreover, disclosed versions of the system 10 (see FIGS. 1, 2A-2B, 3A, 4A, 7), such as the smoke penetration prevention system 10*a* (see FIGS. 2A, 3A, 7), and the smoke penetration prevention system 10*b* (see FIGS. 2B, 4A, 7), may be adapted for use on an aircraft 12 of any size and type which has cargo compartments 20 adjacent to occupied compartments 22, such as the flight deck 28 with flight crew and the cabin 30 with cabin passengers. For example, disclosed versions of the system 10 (see FIGS. 1, 2A-2B, 3A, 4A, 7), such as the smoke penetration prevention system 10*a* (see FIGS. 2A, 3A, 7), and the smoke penetration prevention system 10*b* (see FIGS. 2B, 4A, 7), may be installed in commercial transport aircraft 12*a* (see FIG. 1), freighter aircraft 12*b* (see FIG. 7), or other suitable aircraft 12 or air vehicles.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A system for evacuating and preventing penetration of smoke from a cargo compartment to one or more occupied compartments in an aircraft, the system comprising:

a smoke vent valve assembly installed in a location in the aircraft external to the cargo compartment, the smoke vent valve assembly comprising:

a smoke vent valve;

a mounting assembly attached to the smoke vent valve;

a first coupling assembly coupling the smoke vent valve and the mounting assembly together; and a first duct coupled to the smoke vent valve, and the first duct terminating at an exhaust opening through an exterior portion of the aircraft;

a valve control system coupled to the smoke vent valve, to control opening and closing of the smoke vent valve; and a pressure equalization valve installed in a wall of the cargo compartment, the pressure equalization valve having an inlet end in the cargo compartment, and an outlet end external to the cargo compartment and in proximity to the smoke vent valve assembly, wherein the system provides a direct smoke path for the smoke caused by a fire event in the cargo compartment, to flow the smoke directly from the cargo compartment, through the pressure equalization valve, and through the smoke vent valve assembly which exhausts the smoke directly overboard the aircraft, to result in the system evacuating and preventing the penetration of the smoke from the cargo compartment to the one or more occupied compartments.

2. The system of claim 1, wherein the smoke vent valve is an electromechanical smoke vent valve comprising:

a smoke vent valve inlet flange;

a smoke vent valve outlet flange;

a smoke vent valve housing;

a torque motor actuator assembly; and a locking lever configured to lock the smoke vent valve in an open position or in a closed position.

3. The system of claim 1, wherein the smoke vent valve comprises one of:

an open-close smoke vent valve; or a modulating smoke vent valve.

4. The system of claim 1, wherein the mounting assembly comprises a mounting pedestal assembly comprising:

an inlet flange with an O-ring seal coupled to the inlet flange;

an outlet flange;

an orifice positioned between the inlet flange and the outlet flange;

a support pedestal portion; and a mounting flange member attached to the support pedestal portion.

5. The system of claim 1, wherein the first coupling assembly comprises a T-bolt duct clamp comprising:

a metal band having a V-shaped profile;

a T-shaped bolt attached to the metal band; and a locking nut coupled to the T-shaped bolt.

6. The system of claim 1, wherein the first duct comprises a smoke evacuation duct having a first duct inlet end and a first duct outlet end, and further wherein the first duct inlet end is coupled to the smoke vent valve, via the mounting assembly, and the first duct outlet end terminates at the exhaust opening through the exterior portion of the aircraft.

7. The system of claim 1, wherein the smoke vent valve assembly further comprises a second duct comprising a smoke intake duct, the second duct having a second duct inlet end and a second duct outlet end, and further wherein the second duct inlet end is in proximity to the outlet end of the pressure equalization valve, and the second duct outlet end is coupled to a smoke vent valve inlet flange of the smoke vent valve, via a second coupling assembly.

8. The system of claim 1, wherein the valve control system comprises one or more of:

an automated valve control system; and a manual valve control system.

9. The system of claim 8, wherein the automated valve control system comprises one of:

a hardware assembly and analog controls; or a controller and a software program with a control logic.

10. The system of claim 9, wherein the control logic comprises an advanced control logic comprising:

a simple control logic configured to cause the smoke vent valve to automatically open based on one or more signals triggered by the fire event in the cargo compartment;

a first added logic configured to cause the smoke vent valve to automatically close, when an aircraft descent rate of the aircraft is detected that is greater than a predetermined aircraft descent rate of the aircraft for a predetermined time duration; and a second added logic configured to cause the smoke vent valve to automatically reopen, when the aircraft descent rate of the aircraft is detected that is less than the predetermined aircraft descent rate of the aircraft for the predetermined time duration.

11. An aircraft comprising:

a fuselage;

a plurality of occupied compartments located in an interior upper portion of the fuselage;

a lower lobe compartment area located in an interior lower portion of the fuselage, the lower lobe compartment area separated from, and positioned below, the plurality of occupied compartments, and the lower lobe compartment area comprising at least one cargo compartment and an adjacent compartment adjacent to the at least one cargo compartment; and a system for evacuating and preventing penetration of smoke caused by a fire event in the at least one cargo compartment, wherein the system evacuates the smoke from the at least one cargo compartment and prevents the penetration of the smoke into one or more of the plurality of occupied compartments, the system comprising:

a smoke vent valve assembly installed in the adjacent compartment external to the at least one cargo compartment, the smoke vent valve assembly comprising:

a smoke vent valve;

a mounting assembly attached to the smoke vent valve;

a first coupling assembly coupling the smoke vent valve and the mounting assembly together; and a first duct coupled to the smoke vent valve, and the first duct terminating at an exhaust opening through an exterior portion of the aircraft;

a valve control system coupled to the smoke vent valve, to control opening and closing of the smoke vent valve; and a pressure equalization valve installed in a wall of the at least one cargo compartment, the pressure equalization valve having an inlet end in the at least one cargo compartment, and an outlet end in the adjacent compartment and in proximity to the smoke vent valve assembly, wherein the system provides a direct smoke path for the smoke to flow directly from the at least one cargo compartment, through the pressure equalization valve, and through the smoke vent valve assembly which exhausts the smoke directly overboard the aircraft, to result in the system evacuating and preventing the penetration of the smoke from the at least one cargo compartment to one or more of the plurality of occupied compartments.

12. The aircraft of claim 11, wherein the aircraft comprises one of:

a commercial transport aircraft; or a freighter aircraft.

13. The aircraft of claim 11, wherein the first duct of the smoke vent valve assembly comprises a smoke evacuation duct having a first duct inlet end and a first duct outlet end, and further wherein the first duct inlet end is coupled to the smoke vent valve, via a mounting assembly, and the first duct outlet end terminates at the exhaust opening through the exterior portion of the aircraft.

14. The aircraft of claim 11, wherein the smoke vent valve assembly further comprises a second duct comprising a smoke intake duct, the second duct having a second duct inlet end and a second duct outlet end, and further wherein the second duct inlet end is in proximity to the outlet end of the pressure equalization valve, and the second duct outlet end is attached to a smoke vent valve inlet flange of the smoke vent valve, via a second coupling assembly.

15. The aircraft of claim 11, wherein the valve control system of the system comprises an automated valve control system comprising one of:

a hardware assembly and analog controls; or a controller and a software program with a control logic, wherein the control logic comprises an advanced control logic comprising:

a simple control logic configured to cause the smoke vent valve to automatically open based on one or more signals triggered by the fire event in the cargo compartment;

a first added control logic configured to cause the smoke vent valve to automatically close, when an aircraft descent rate of the aircraft is detected that is greater than a predetermined aircraft descent rate of the aircraft for a predetermined time duration; and a second added control logic configured to cause the smoke vent valve to automatically reopen, when the aircraft descent rate of the aircraft is detected that is less than the predetermined aircraft descent rate of the aircraft for the predetermined time duration.

16. A method of using a system installed in an aircraft for evacuating and preventing penetration of smoke from a cargo compartment to one or more occupied compartments in the aircraft, the method comprising the steps of:

providing the system comprising:

a smoke vent valve assembly comprising:

a smoke vent valve;

a mounting assembly attached to the smoke vent valve;

a first coupling assembly coupling the smoke vent valve and the mounting assembly together; and a first duct coupled to the smoke vent valve, and the first duct terminating at an exhaust opening through an exterior portion of the aircraft;

a valve control system coupled to the smoke vent valve, to control opening and closing of the smoke vent valve; and a pressure equalization valve installed in a wall of the cargo compartment, the pressure equalization valve having an inlet end in the cargo compartment, and an outlet end external to the cargo compartment and in proximity to the smoke vent valve assembly;

coupling the smoke vent valve assembly to an adjacent compartment in the aircraft adjacent to the cargo compartment, so that the smoke vent valve assembly is in proximity to the pressure equalization valve and external to the cargo compartment; and using the system to direct smoke caused by a fire event in the cargo compartment, to flow in a direct smoke path directly from the cargo compartment, through the pressure equalization valve, and through the smoke vent valve assembly which exhausts the smoke directly overboard the aircraft, to result in the system evacuating and preventing the penetration of the smoke from the cargo compartment to the one or more occupied compartments.

17. The method of claim 16, wherein the step of providing the system further comprises providing the system wherein:

the first duct of the smoke vent valve assembly comprises a smoke evacuation duct having a first duct inlet end and a first duct outlet end, and further wherein the first duct inlet end is coupled to the smoke vent valve, via the mounting assembly, and the first duct outlet end terminates at the exhaust opening through the exterior portion of the aircraft.

18. The method of claim 16, wherein the step of providing the system further comprises providing the system wherein:

the smoke vent valve assembly further comprises a second duct comprising a smoke intake duct, the second duct having a second duct inlet end and a second duct outlet end, and further wherein the second duct inlet end is in proximity to the outlet end of the pressure equalization valve, and the second duct outlet end is attached to a smoke vent valve inlet flange of the smoke vent valve, via a second coupling assembly.

19. The method of claim 16, wherein the step of providing the system further comprises providing the system wherein:

the valve control system of the system comprises an automated valve control system comprising one of:

a hardware assembly and analog controls; or a controller and a software program with a control logic, wherein the control logic comprises an advanced control logic comprising:

a simple control logic configured to cause the smoke vent valve to automatically open based on one or more signals triggered by the fire event in the cargo compartment;

a first added control logic configured to cause the smoke vent valve to automatically close, when an aircraft descent rate of the aircraft is detected that is greater than a predetermined aircraft descent rate of the aircraft for a predetermined time duration; and a second added control logic configured to cause the smoke vent valve to automatically reopen, when the aircraft descent rate of the aircraft is detected that is less than the predetermined aircraft descent rate of the aircraft for the predetermined time duration.

20. The method of claim 16, wherein the step of providing the system further comprises providing the system wherein:

the smoke vent valve comprises one of:

an open-close smoke vent valve; or a modulating smoke vent valve.

* * * * *